United States Patent
Konishi et al.

(10) Patent No.: US 11,858,164 B2
(45) Date of Patent: Jan. 2, 2024

(54) LOG FEEDING APPARATUS, LOG PROCESSING APPARATUS HAVING THE SAME, AND METHOD OF CONTROLLING THE SAME

(71) Applicant: Meinan Machinery Works, Inc., Obu (JP)

(72) Inventors: Keita Konishi, Obu (JP); Naruhito Kanahara, Obu (JP); Kiyoshi Morimoto, Obu (JP)

(73) Assignee: Meinan Machinery Works, Inc, Obu (JP)

( * ) Notice: Subject to any disclaimer, the term of this patent is extended or adjusted under 35 U.S.C. 154(b) by 342 days.

(21) Appl. No.: 17/294,168

(22) PCT Filed: Nov. 6, 2019

(86) PCT No.: PCT/JP2019/043398
§ 371 (c)(1),
(2) Date: May 14, 2021

(87) PCT Pub. No.: WO2020/158089
PCT Pub. Date: Aug. 6, 2020

(65) Prior Publication Data
US 2022/0009120 A1    Jan. 13, 2022

(30) Foreign Application Priority Data
Jan. 30, 2019   (JP) ................................. 2019-013895

(51) Int. Cl.
*B27B 31/06*     (2006.01)
*B27L 5/02*      (2006.01)
*B27B 25/04*     (2006.01)

(52) U.S. Cl.
CPC .............. *B27B 25/04* (2013.01); *B27B 31/06* (2013.01); *B27L 5/022* (2013.01); *G05B 2219/45037* (2013.01)

(58) Field of Classification Search
CPC . B27L 5/002; B27L 5/02; B27L 5/022; B27B 25/08; B27B 29/04; B27B 31/06;
(Continued)

(56) References Cited

U.S. PATENT DOCUMENTS 3,152,626 A * 10/1964 Nicholson ............... B27L 5/022
                                                     82/170
4,197,888 A *  4/1980 McGee ................ G05B 19/402
                                                     700/192
(Continued)

FOREIGN PATENT DOCUMENTS

EP         1127666 A2      8/2001
JP      S61217207 A   *   9/1986
(Continued)

OTHER PUBLICATIONS

The Search Report from the corresponding International Patent Application No. PCT/JP2019/043398 dated Feb. 14, 2020.

*Primary Examiner* — Adam J Eiseman
*Assistant Examiner* — Jared O Brown
(74) *Attorney, Agent, or Firm* — United IP Counselors, LLC

(57) ABSTRACT

A log feeding apparatus for feeding a log to first and second cutting spindles is provided, in which a log is fed to a second receiving position when centering spindles have reached a second delivery position that is away from the second receiving position downstream in the direction of log transport by a distance equal to or greater than an assumed maximum diameter of the log. That is, a new log is transported to the second receiving position by placing sections when the log held between the centering spindles reaches a (Continued)

position that will avoid contact with the new log. As a result, the time can be reduced for transporting the log to the cutting spindles.

14 Claims, 38 Drawing Sheets

(58) Field of Classification Search
CPC ....... B27C 7/04; Y10T 82/2514; Y10T 82/27; G05B 2219/45037; G05B 2219/45229
See application file for complete search history.

(56) References Cited

U.S. PATENT DOCUMENTS

| | | | |
|---|---|---|---|
| 4,378,829 A | 4/1983 | Sohn | |
| 4,384,601 A * | 5/1983 | Richert | B27L 5/022 82/170 |
| 4,965,734 A * | 10/1990 | Edwards | B27L 5/022 702/167 |
| 5,582,224 A * | 12/1996 | Mutsuura | B23Q 15/22 144/365 |
| 6,116,306 A * | 9/2000 | Ely | B27L 5/022 702/167 |
| 6,305,448 B1 * | 10/2001 | Ota | B27L 5/022 144/365 |
| 8,805,052 B2 * | 8/2014 | Hiraoka | G01B 11/2522 382/141 |
| 9,597,817 B2 * | 3/2017 | Dezellem | B27L 5/02 |
| 2001/0016050 A1 * | 8/2001 | Koike | B27L 5/022 382/100 |

FOREIGN PATENT DOCUMENTS

| | | | |
|---|---|---|---|
| JP | 2005343117 A | * | 12/2005 |
| JP | 2012016938 A | * | 1/2012 |

* cited by examiner

[Fig. 1]
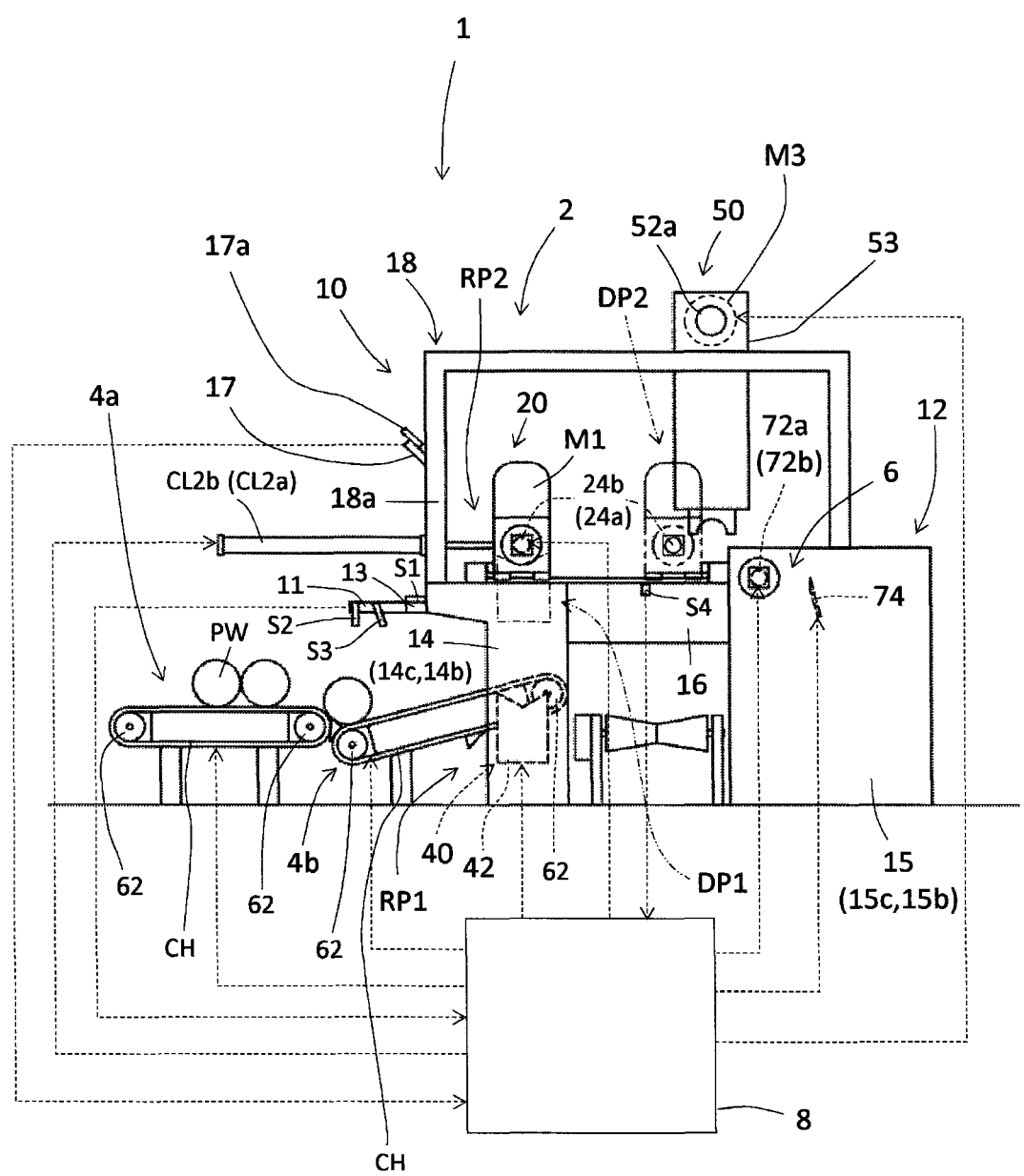

[Fig. 2]
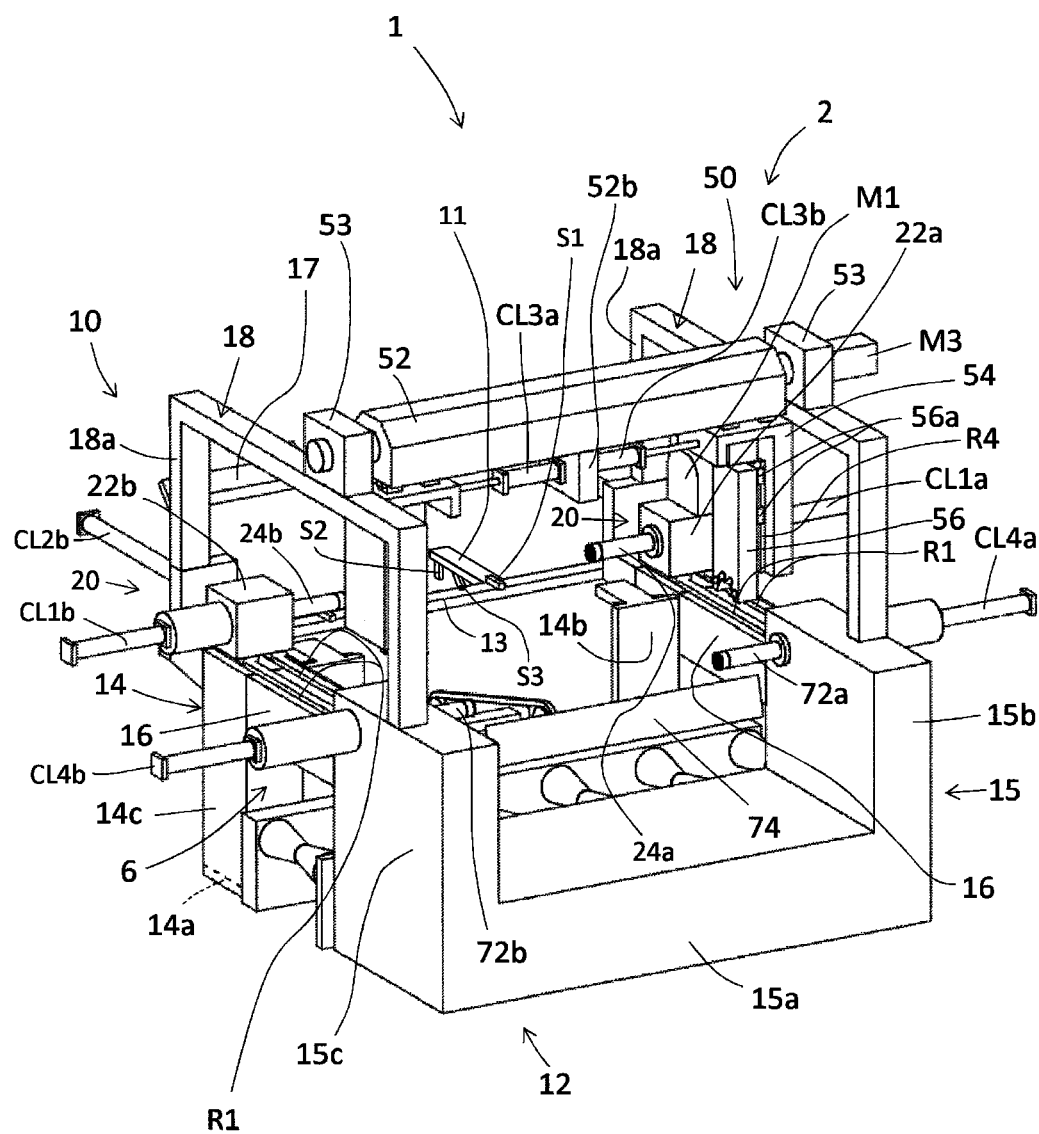

[Fig. 3]
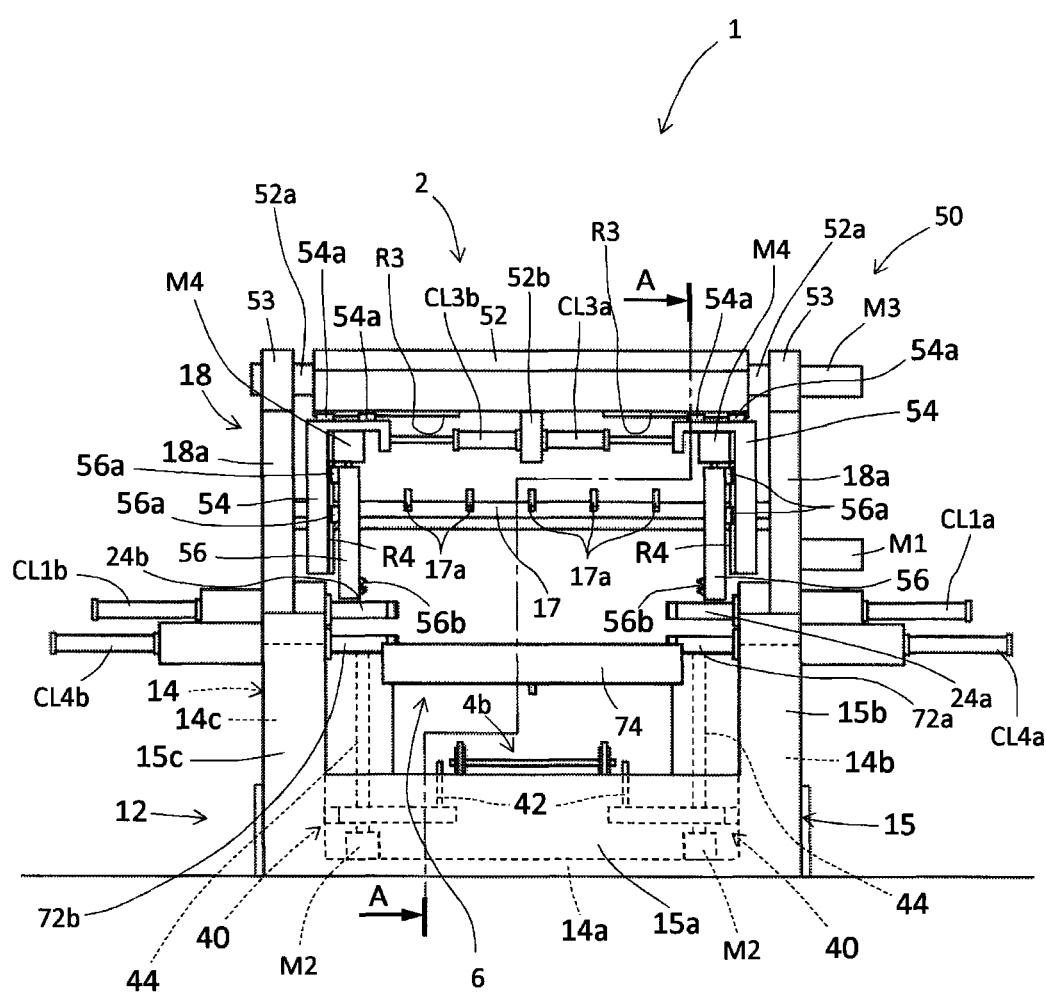

[Fig. 4]
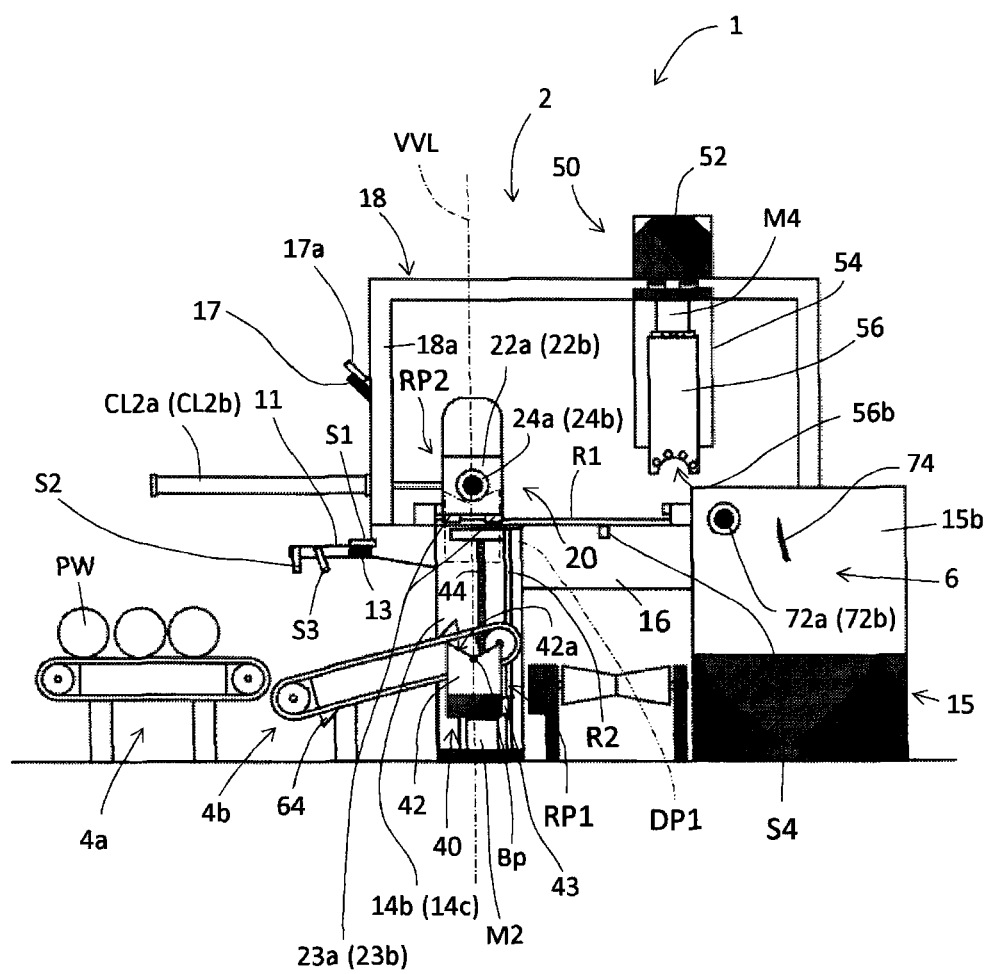

[Fig. 5]
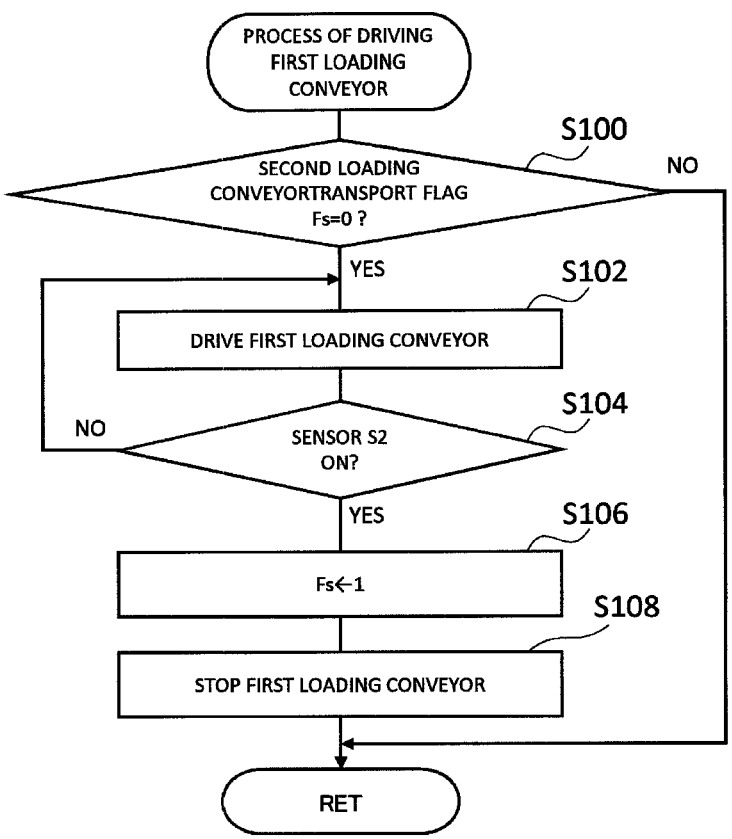

[Fig. 6]
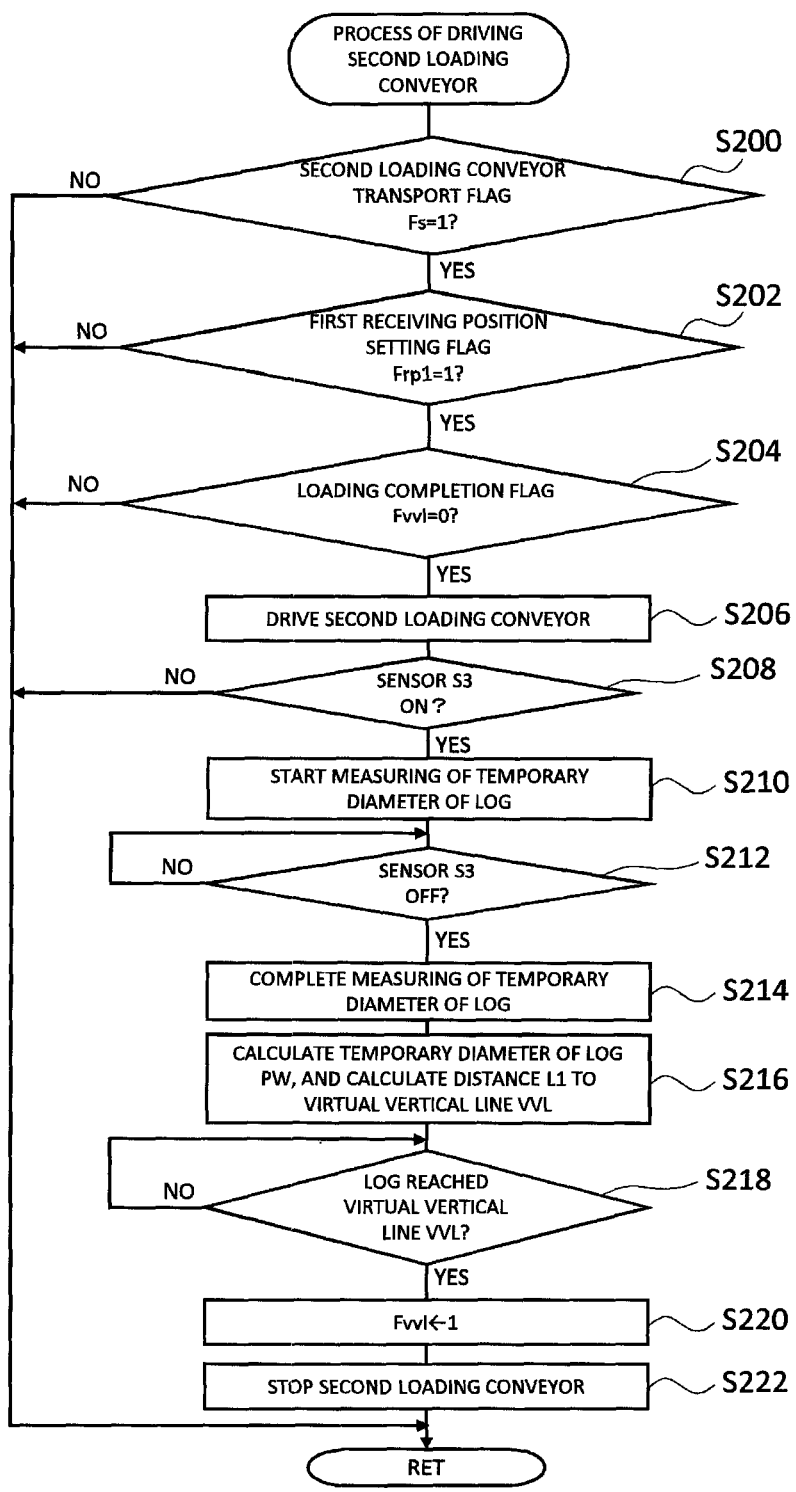

[Fig. 7]
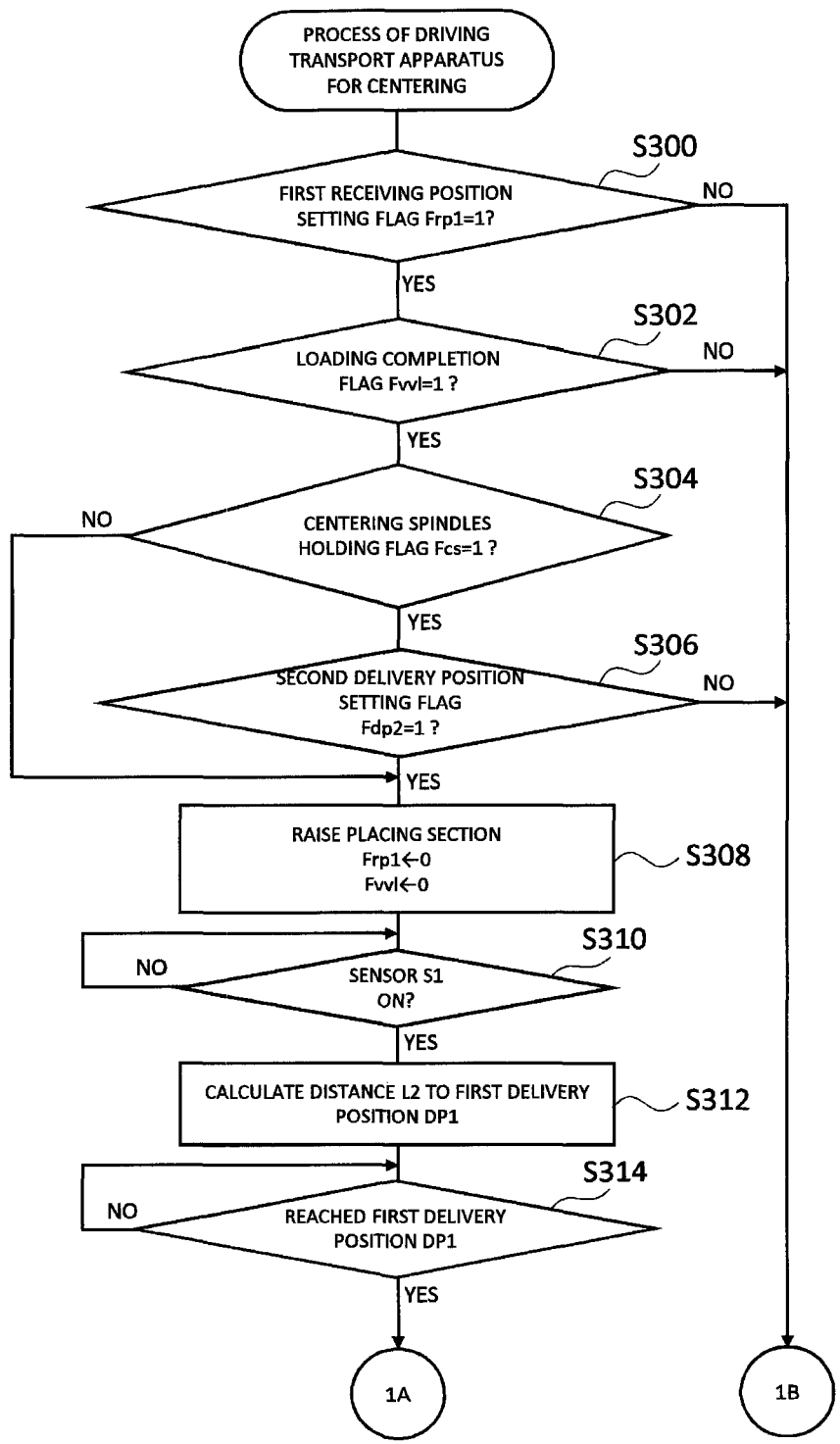

[Fig. 8]
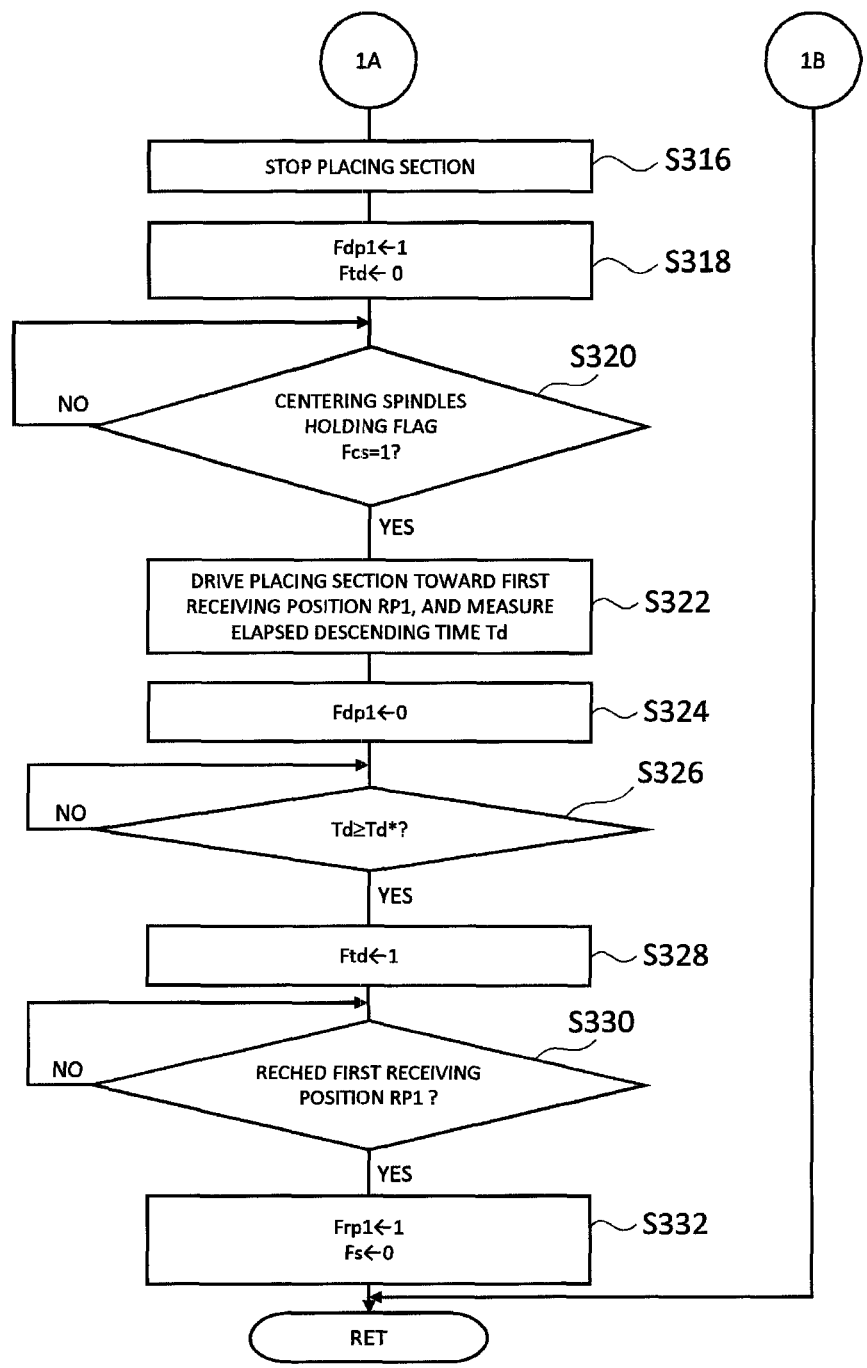

[Fig. 9]
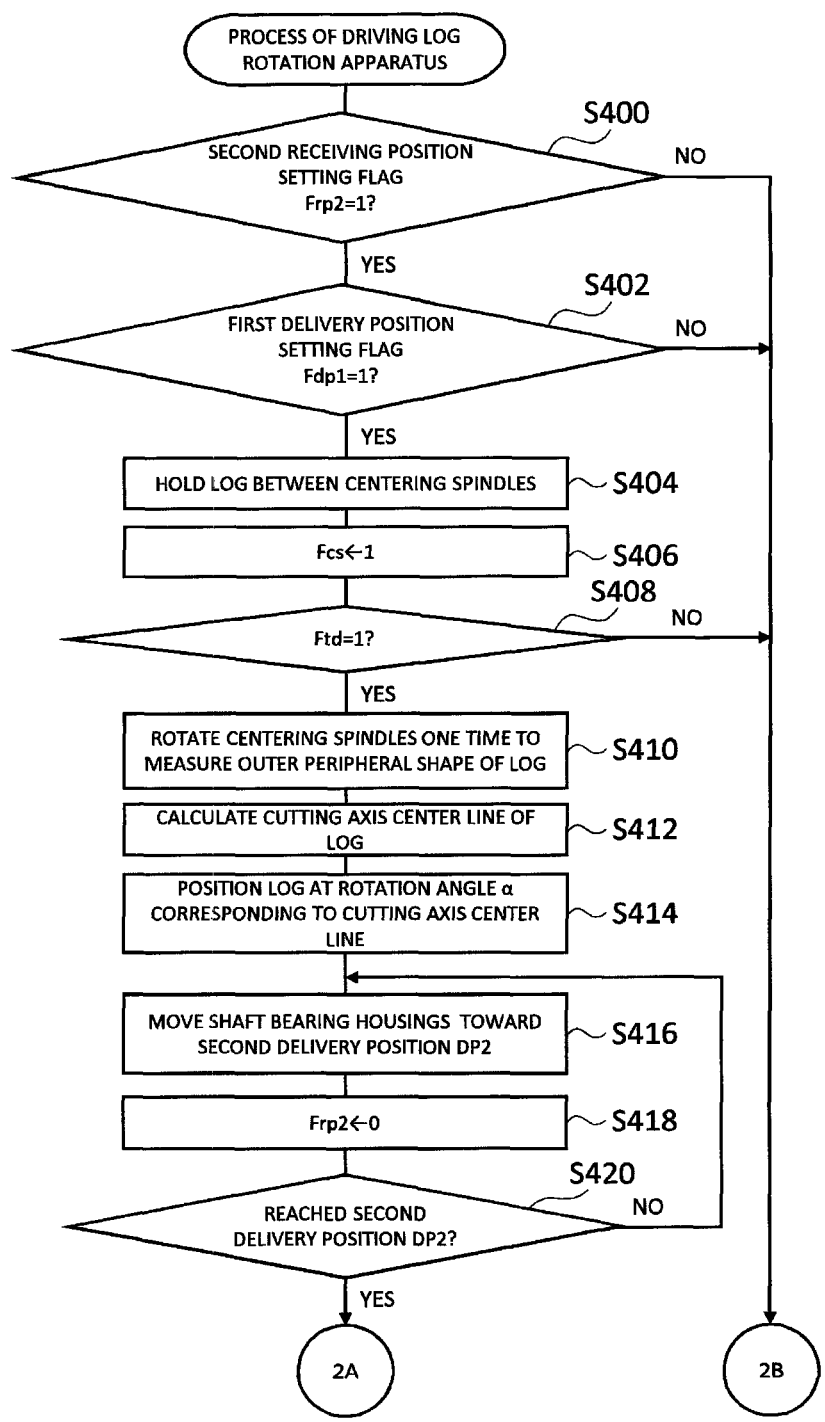

[Fig. 10]
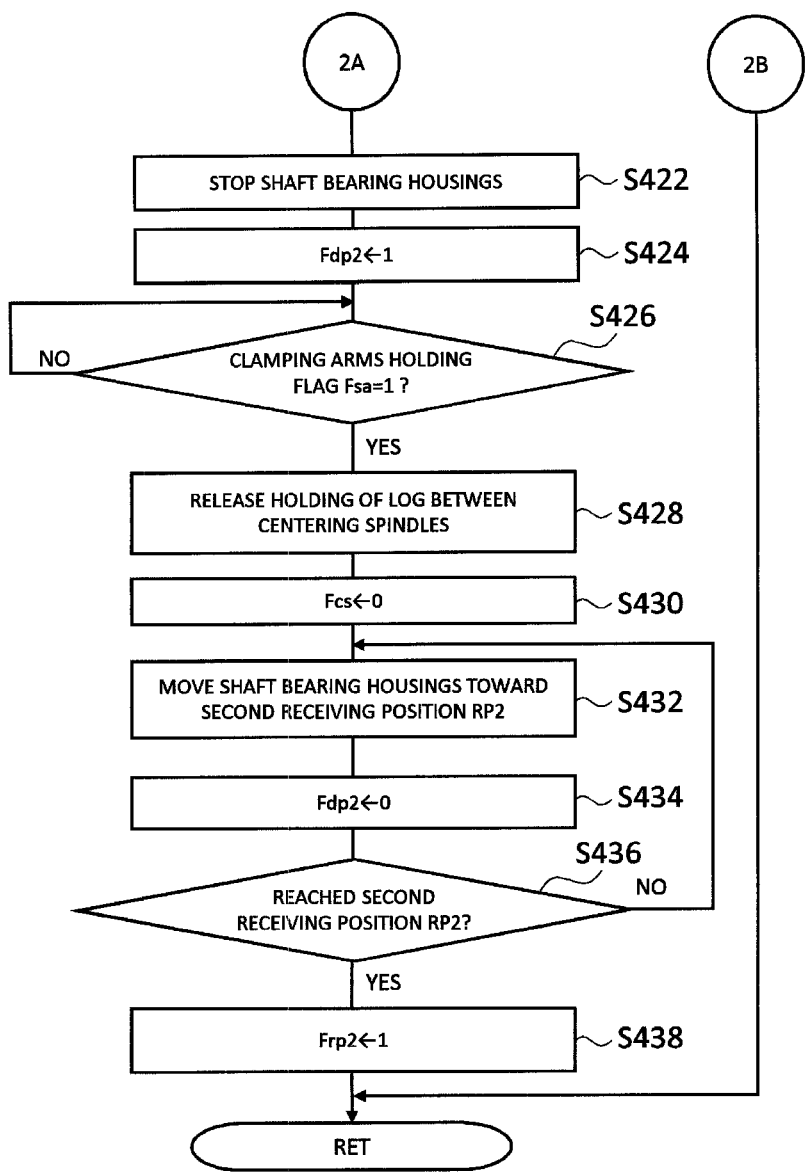

[Fig. 11]
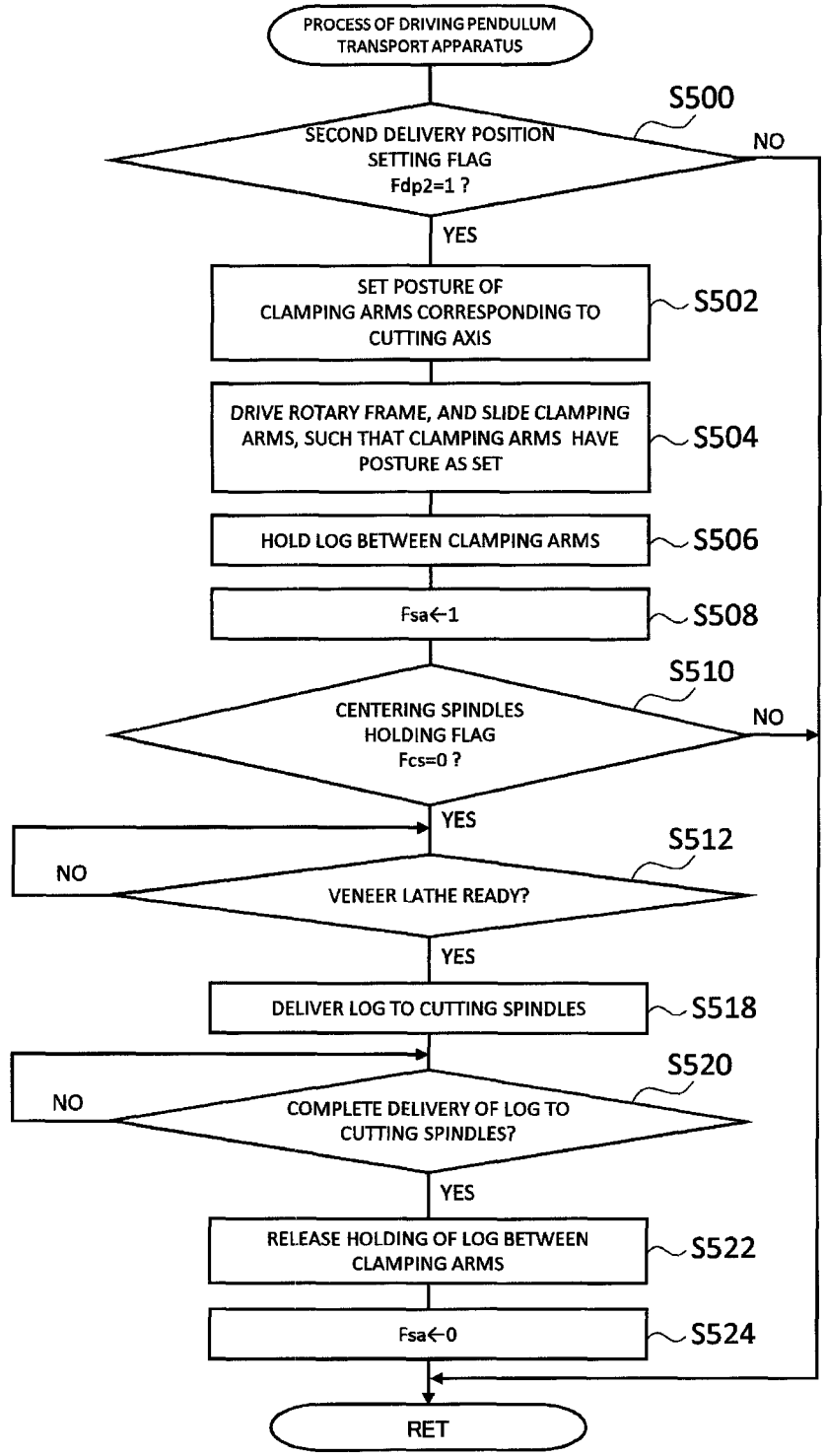

[Fig. 12]
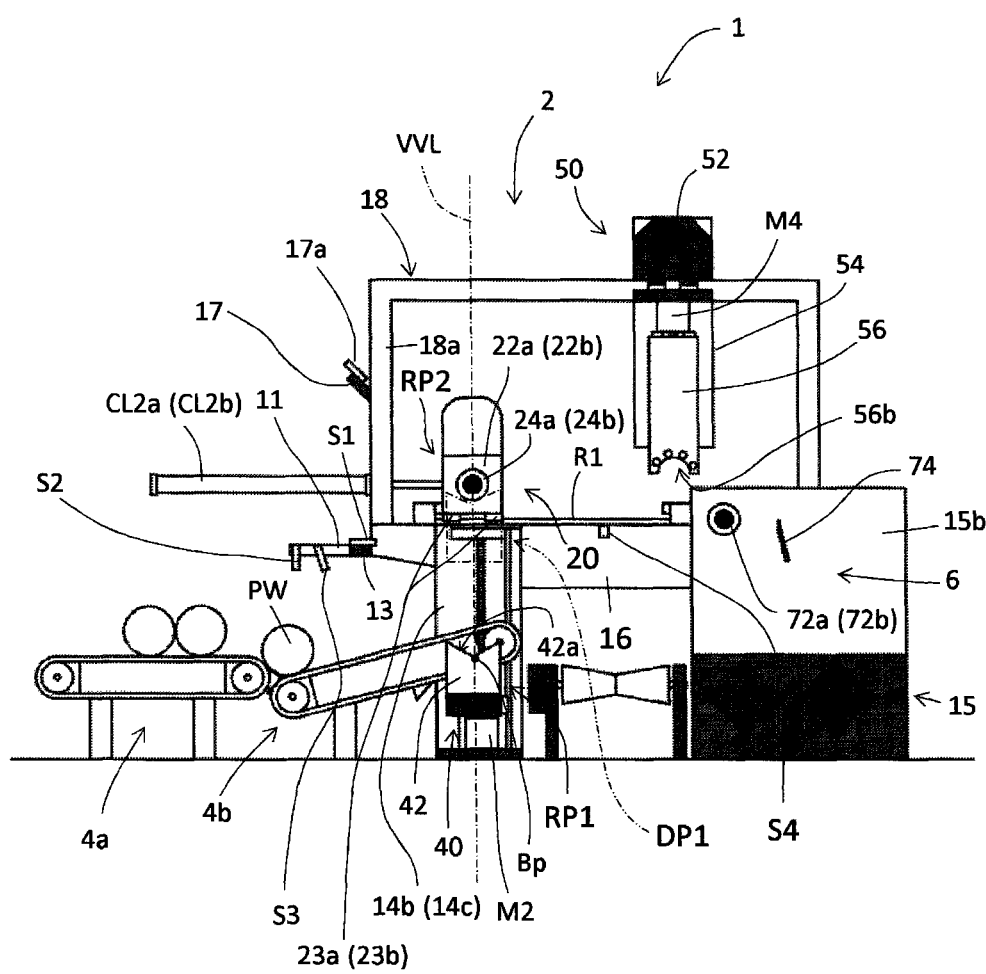

[Fig. 13]
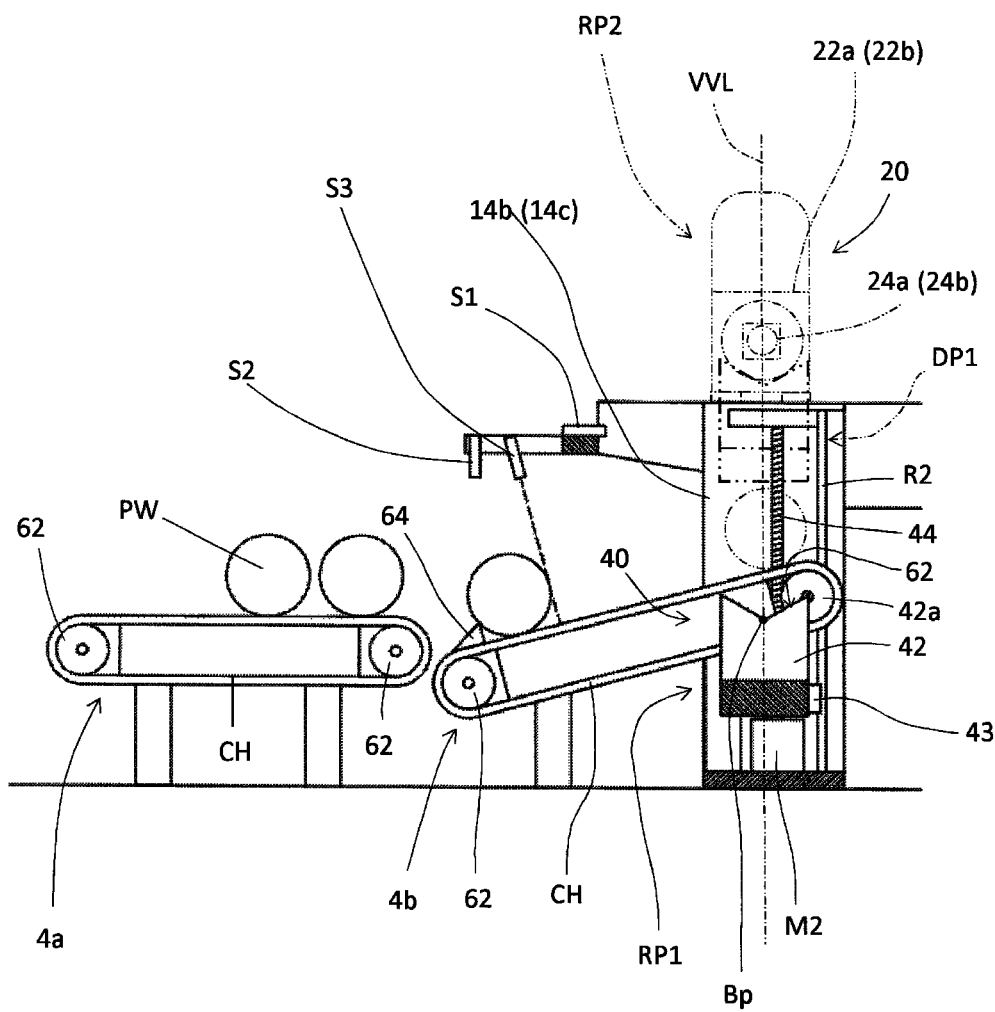

[Fig. 14]
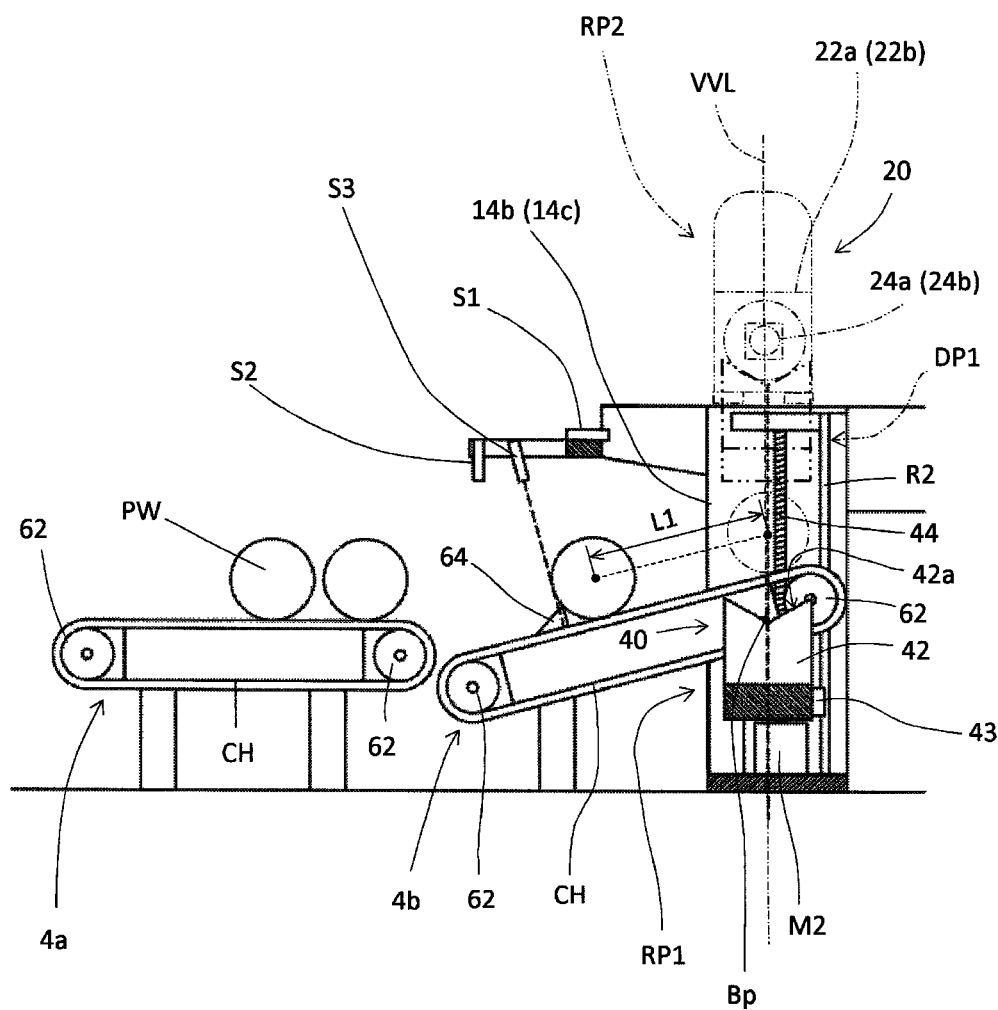

[Fig. 15]
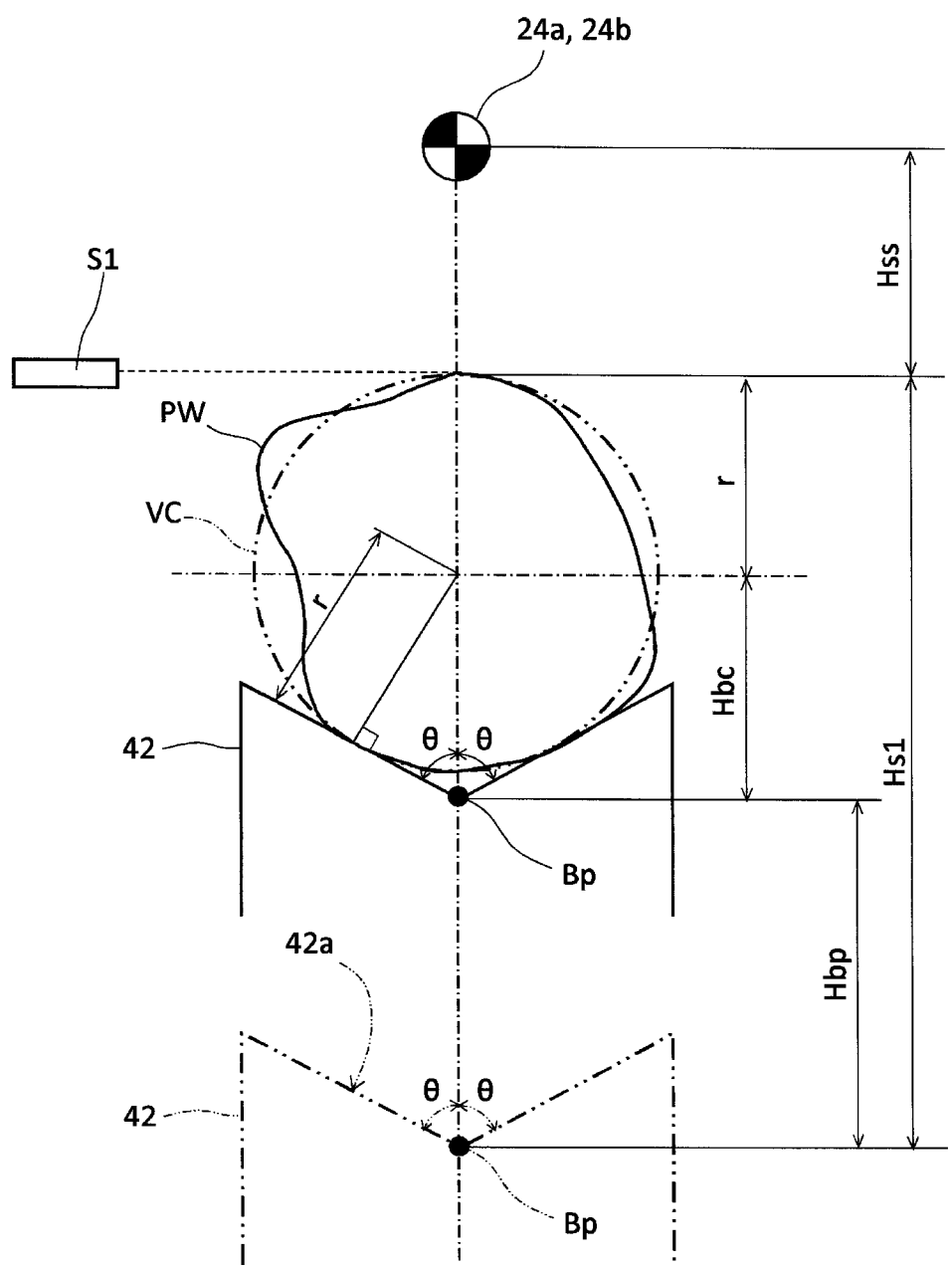

[Fig. 16]
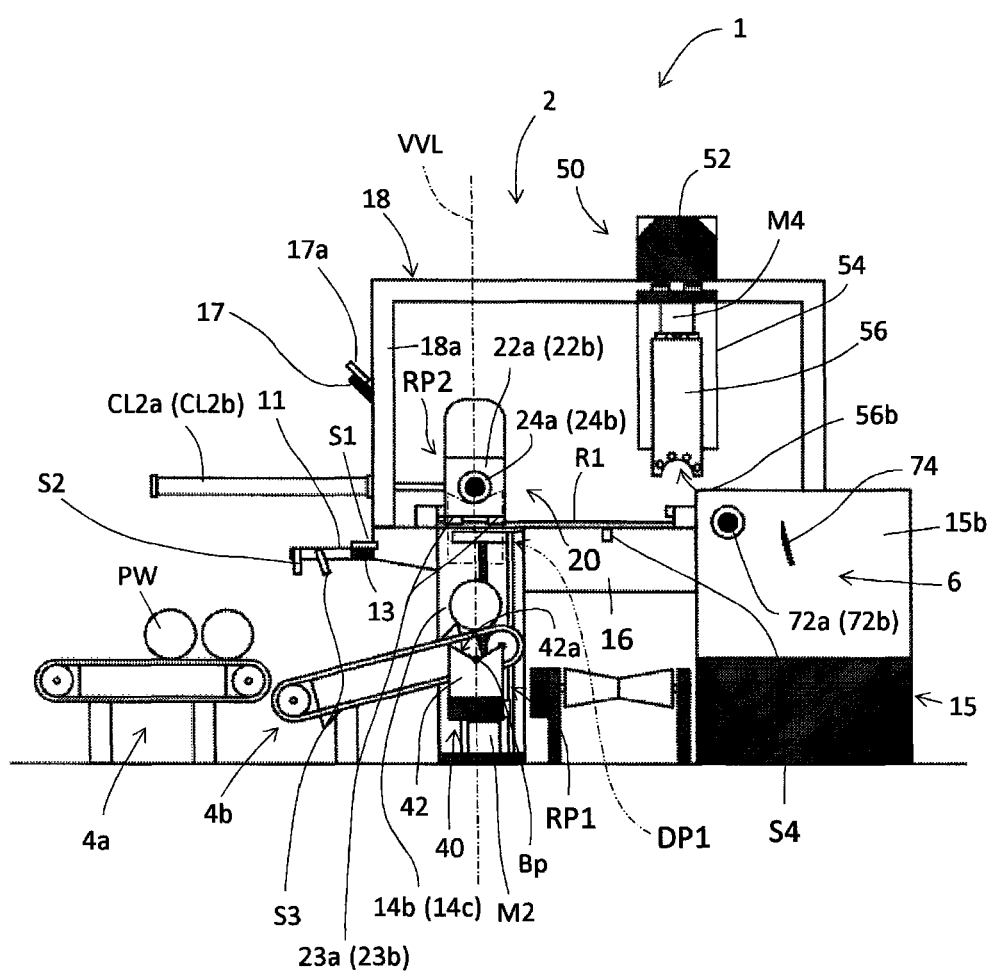

[Fig. 17]
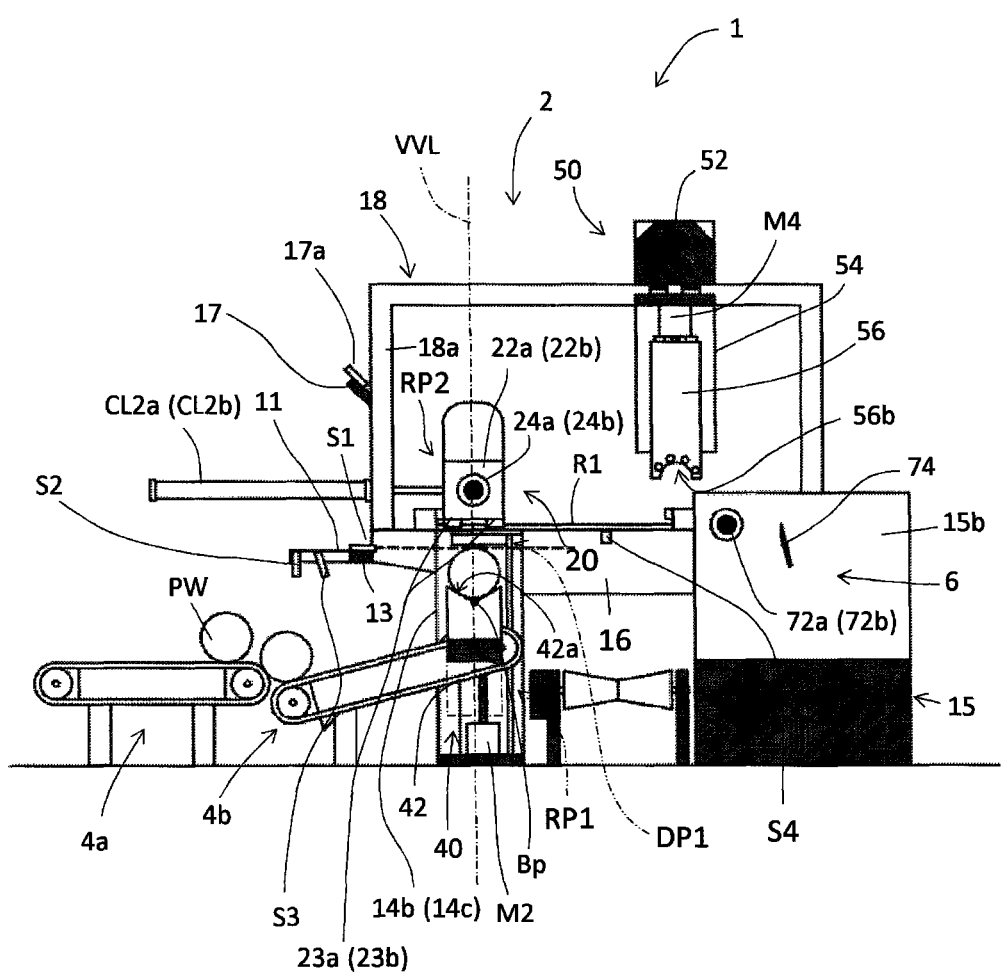

[Fig. 18]
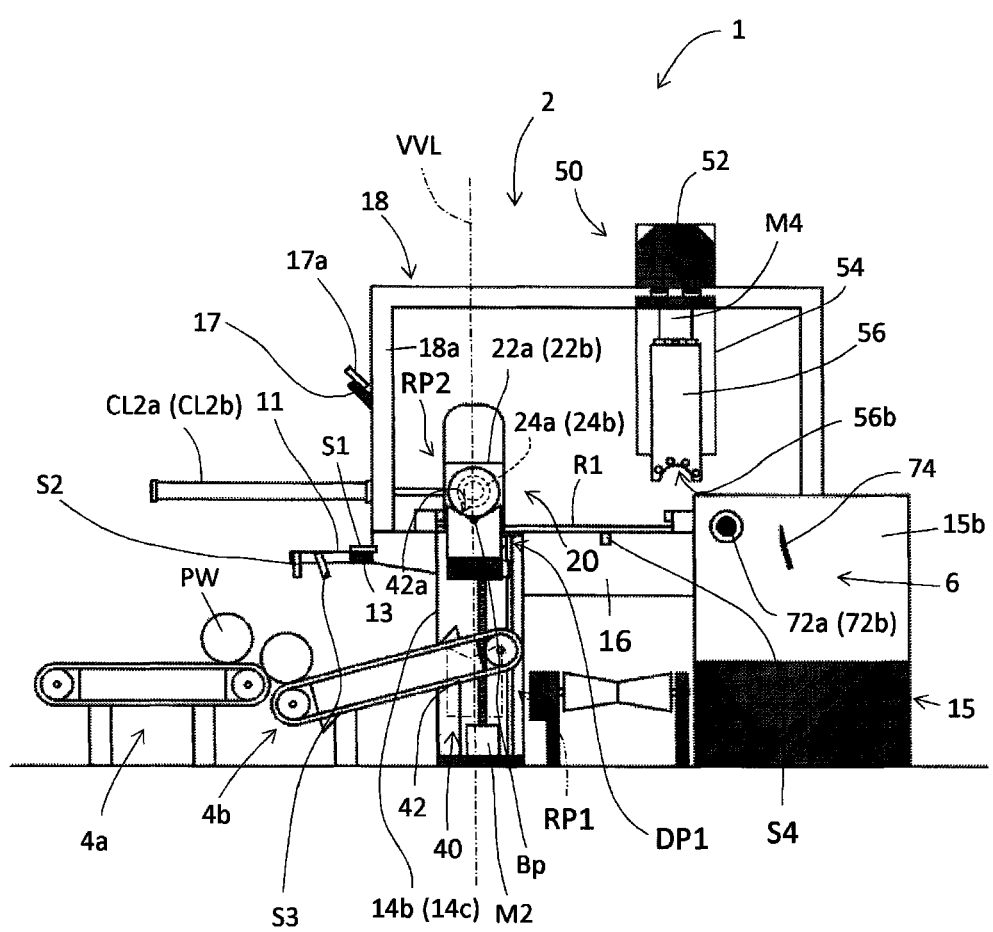

[Fig. 19]
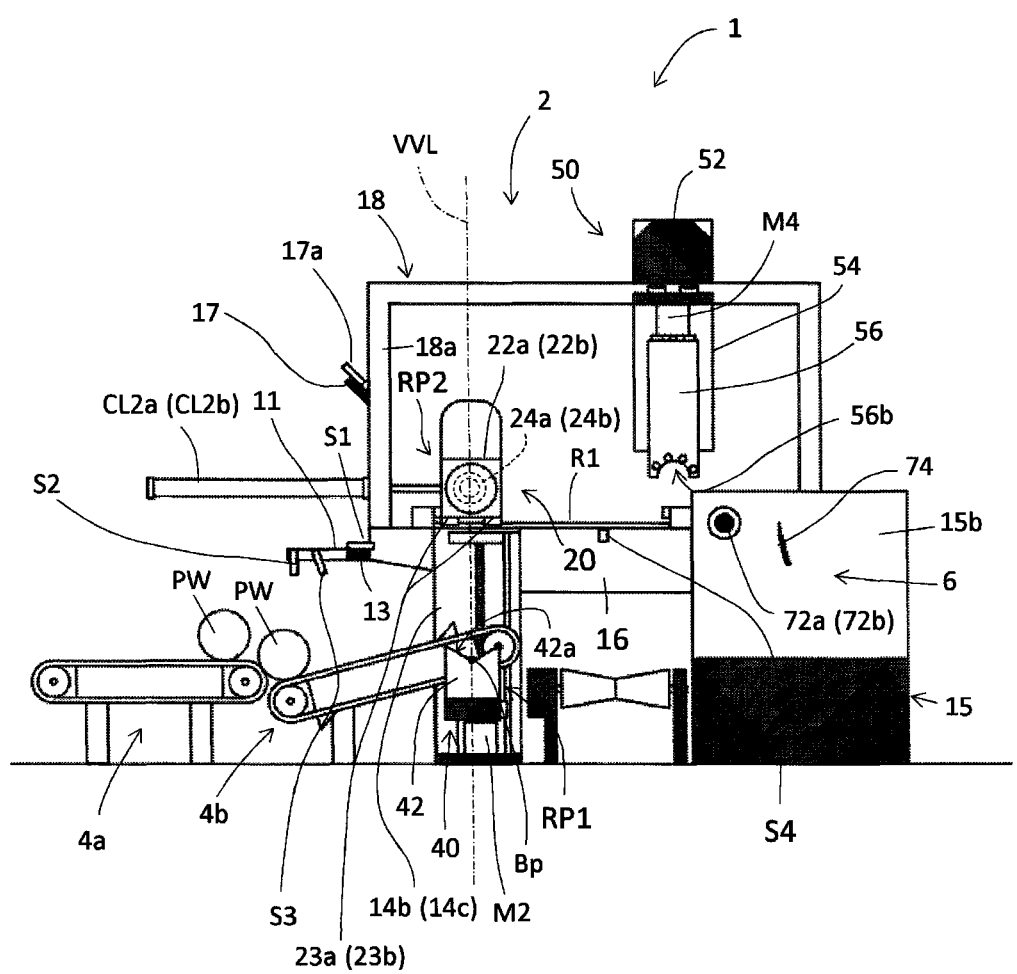

[Fig. 20]
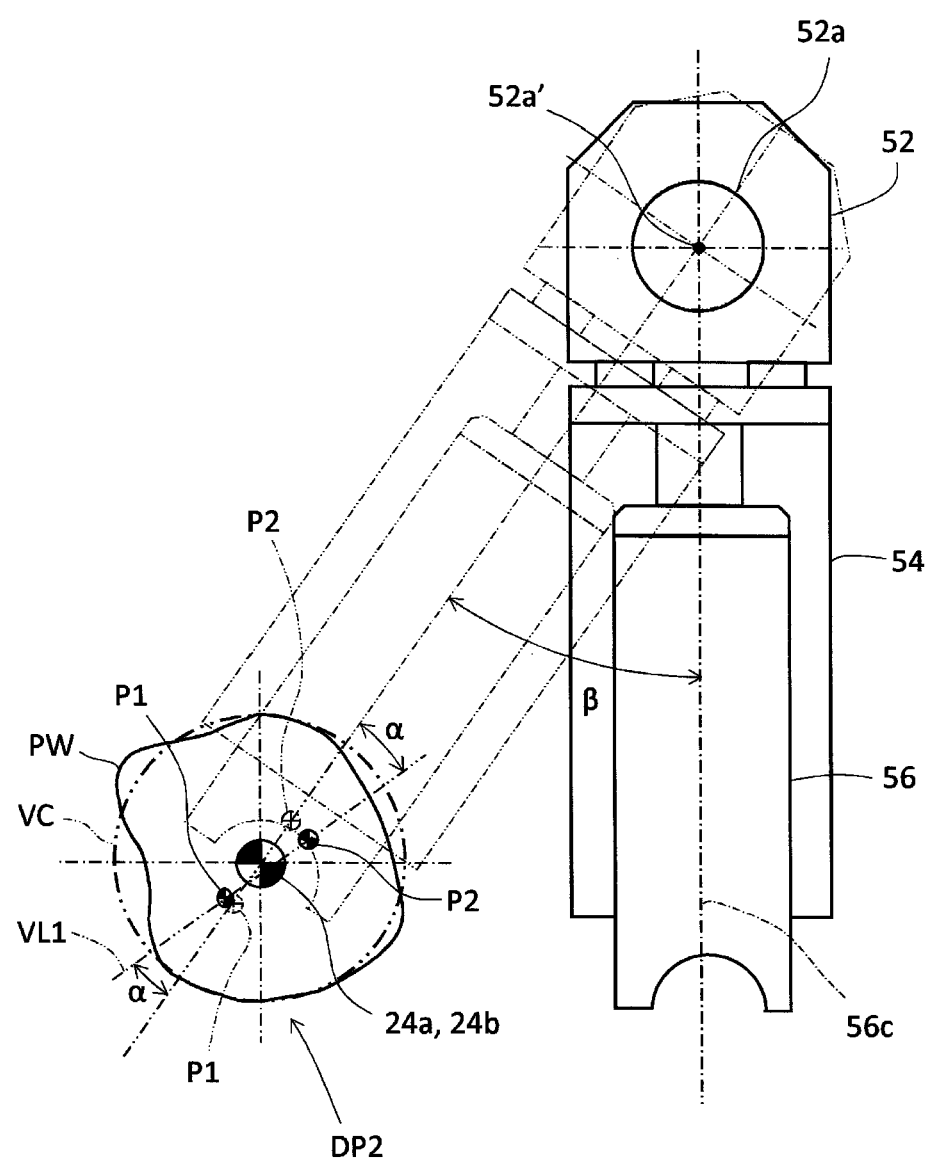

[Fig. 21]
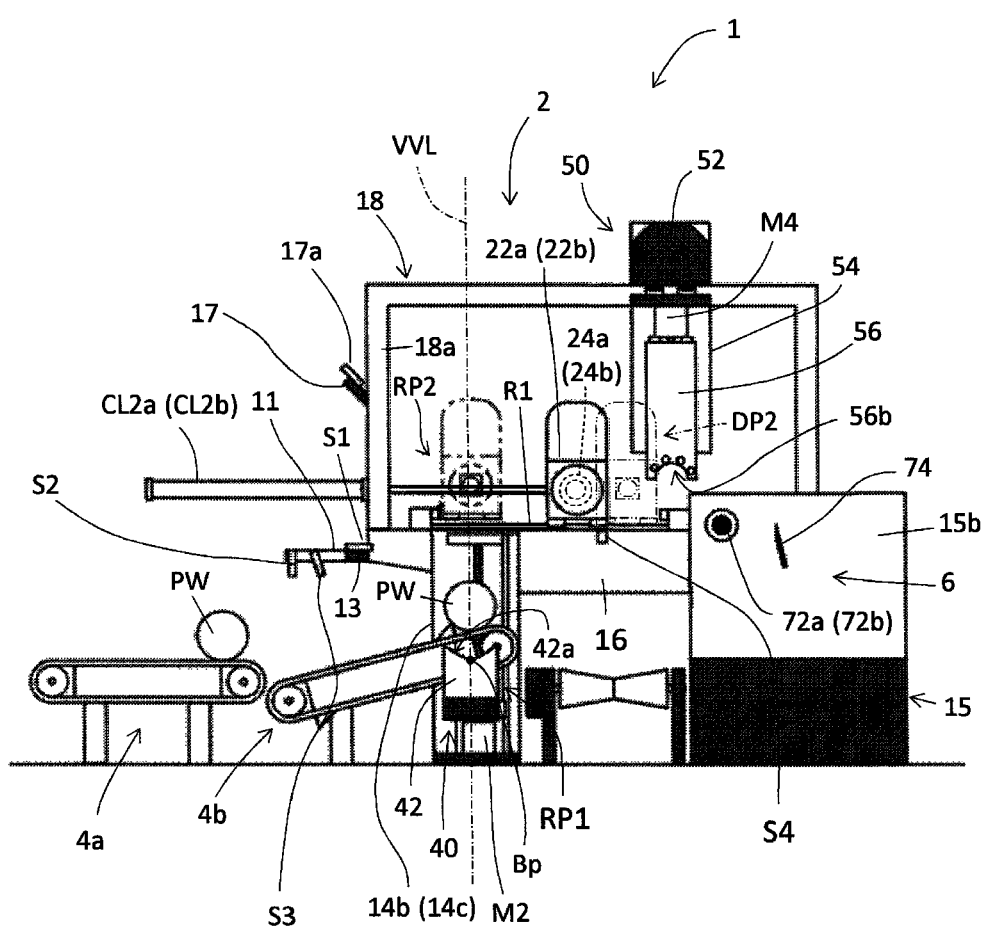

[Fig. 22]
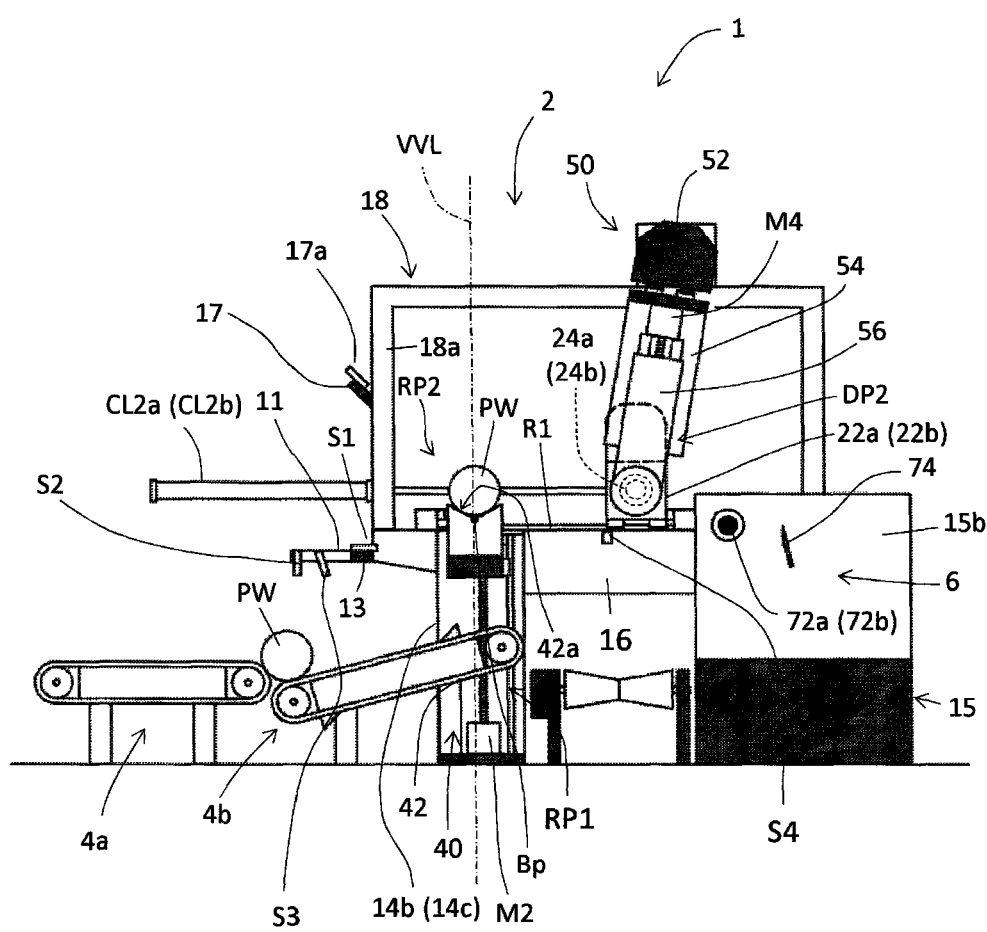

[Fig. 23]
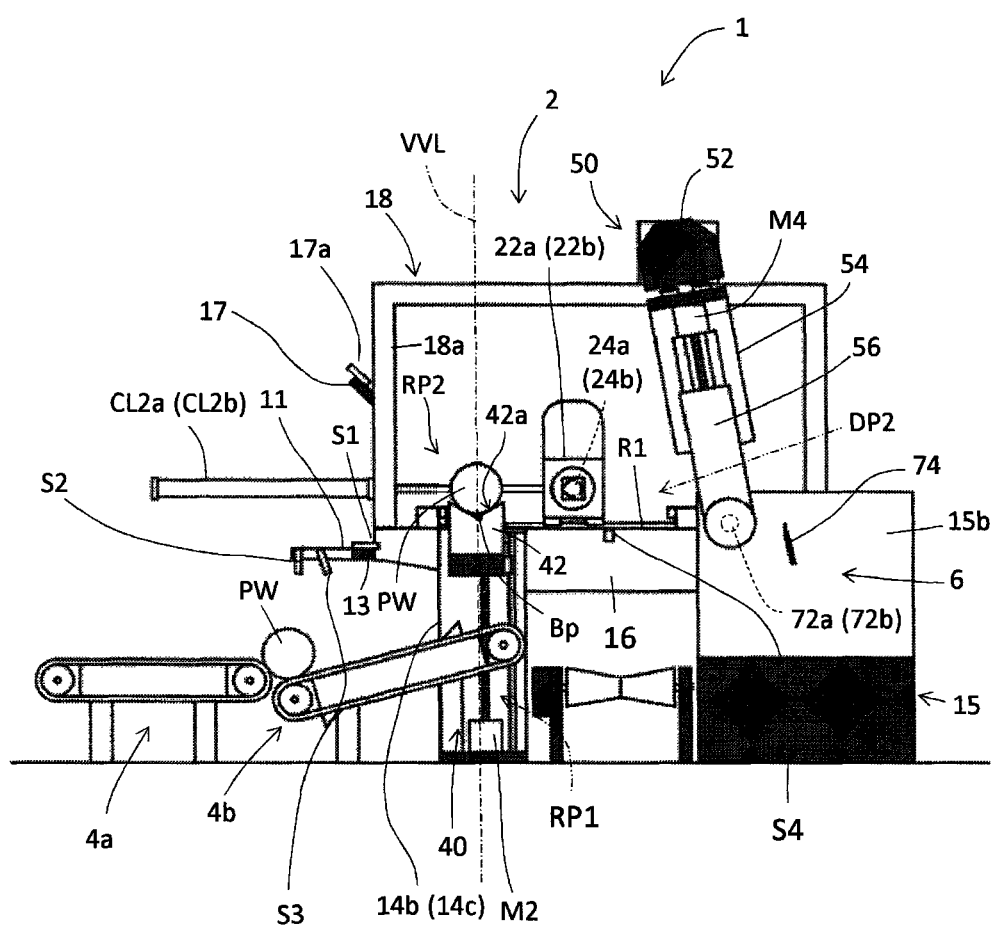

[Fig. 24]
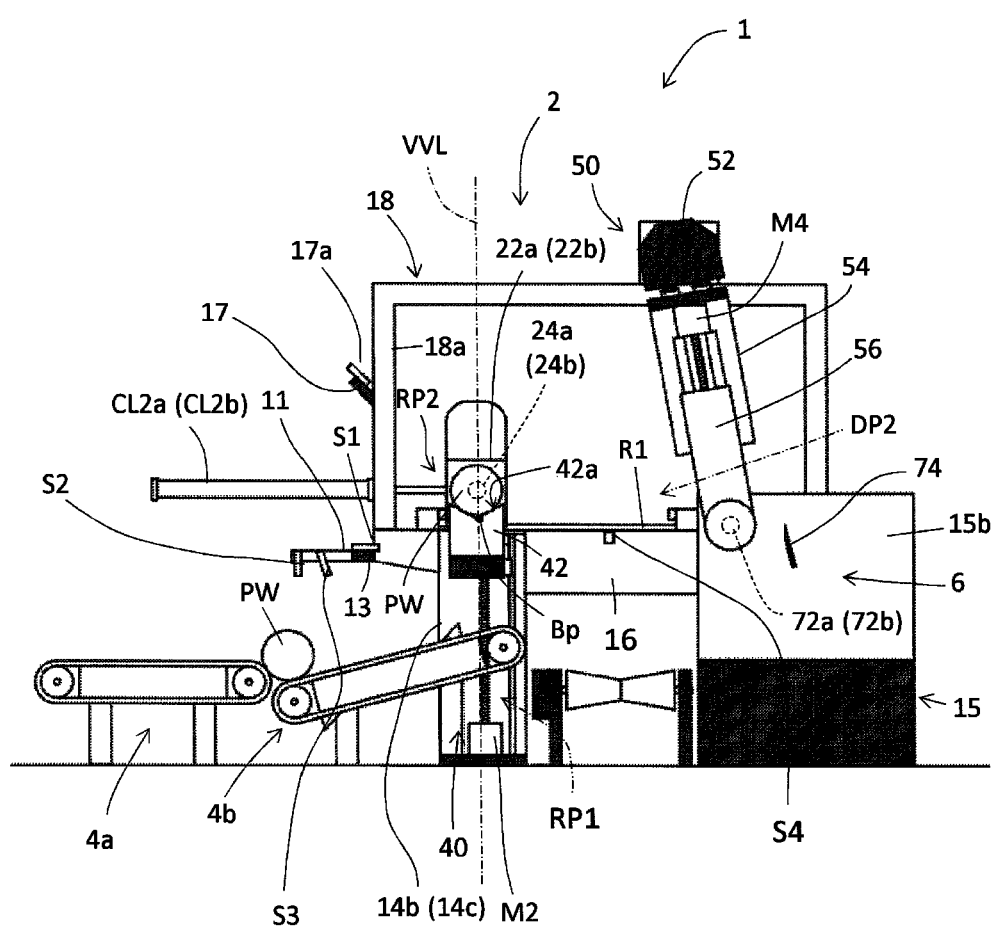

[Fig. 25]
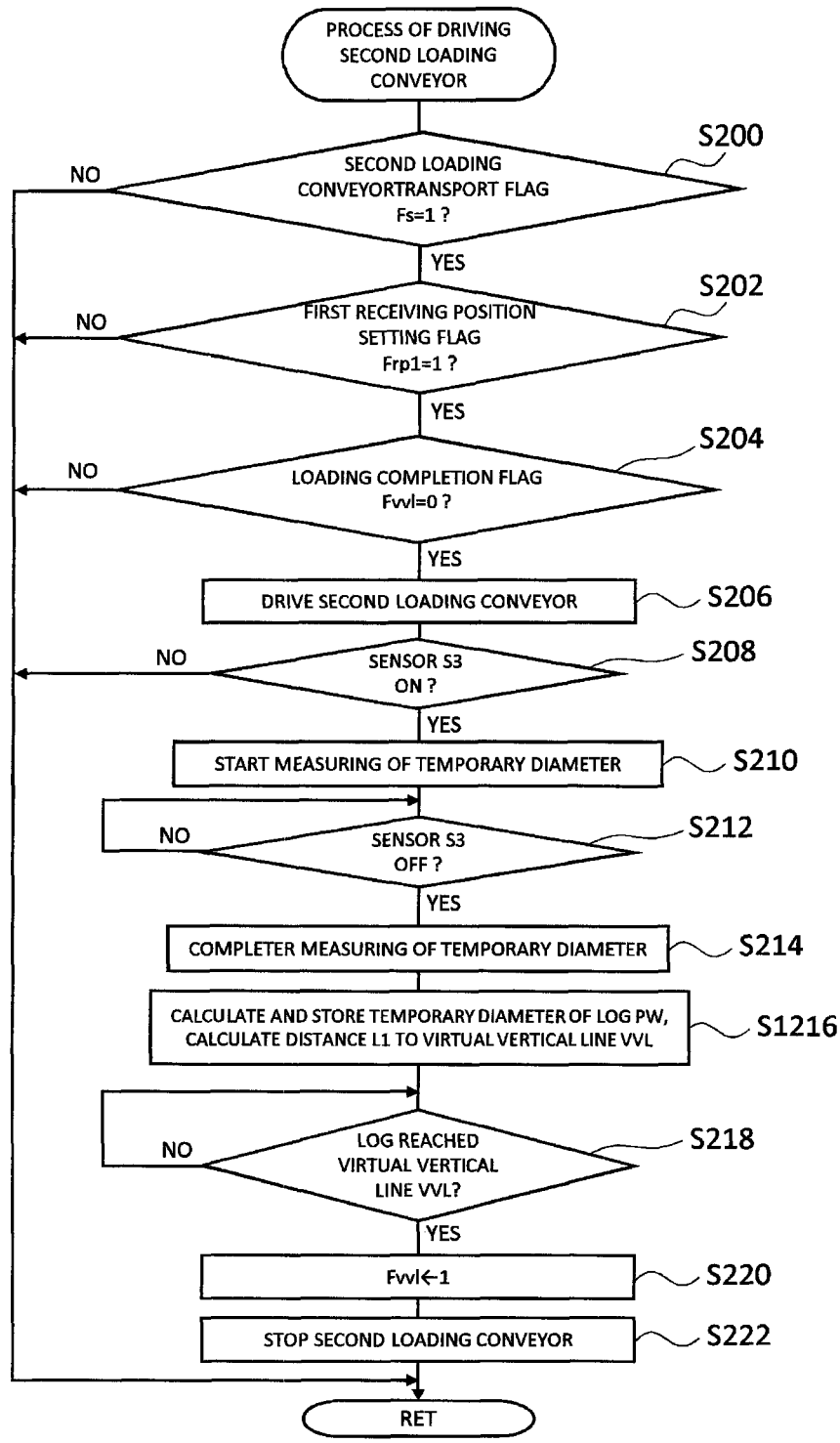

[Fig. 26]
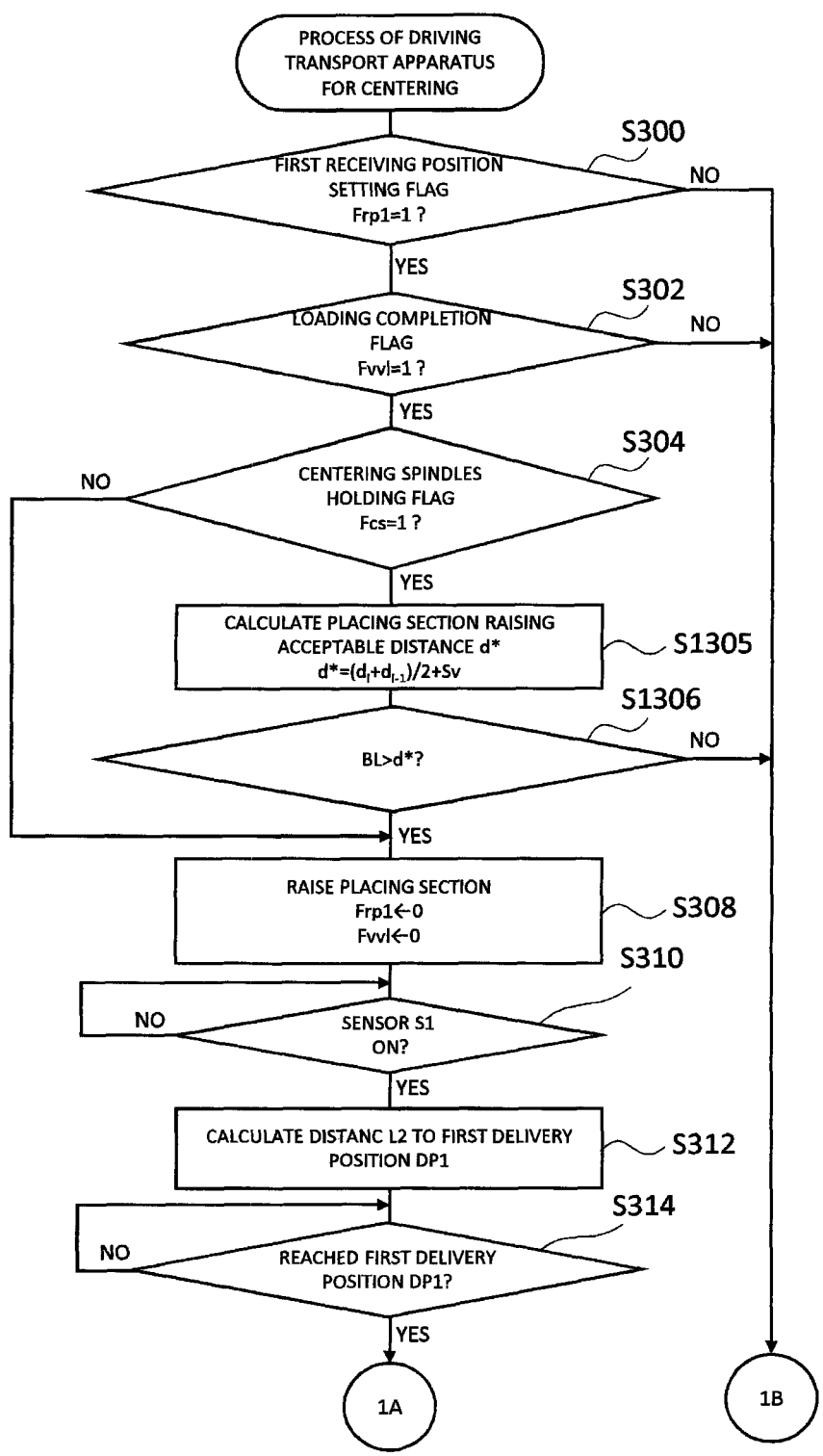

[Fig. 27]
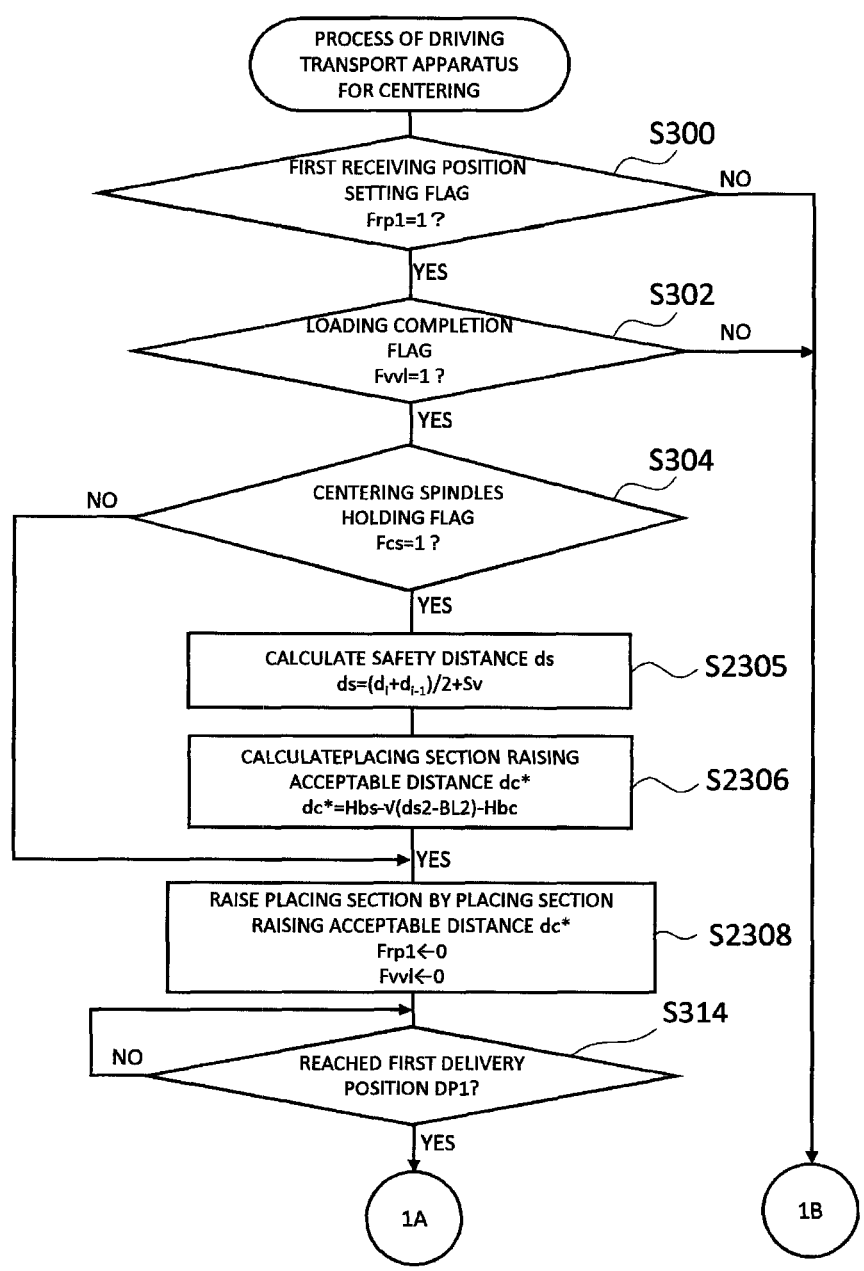

[Fig. 28]
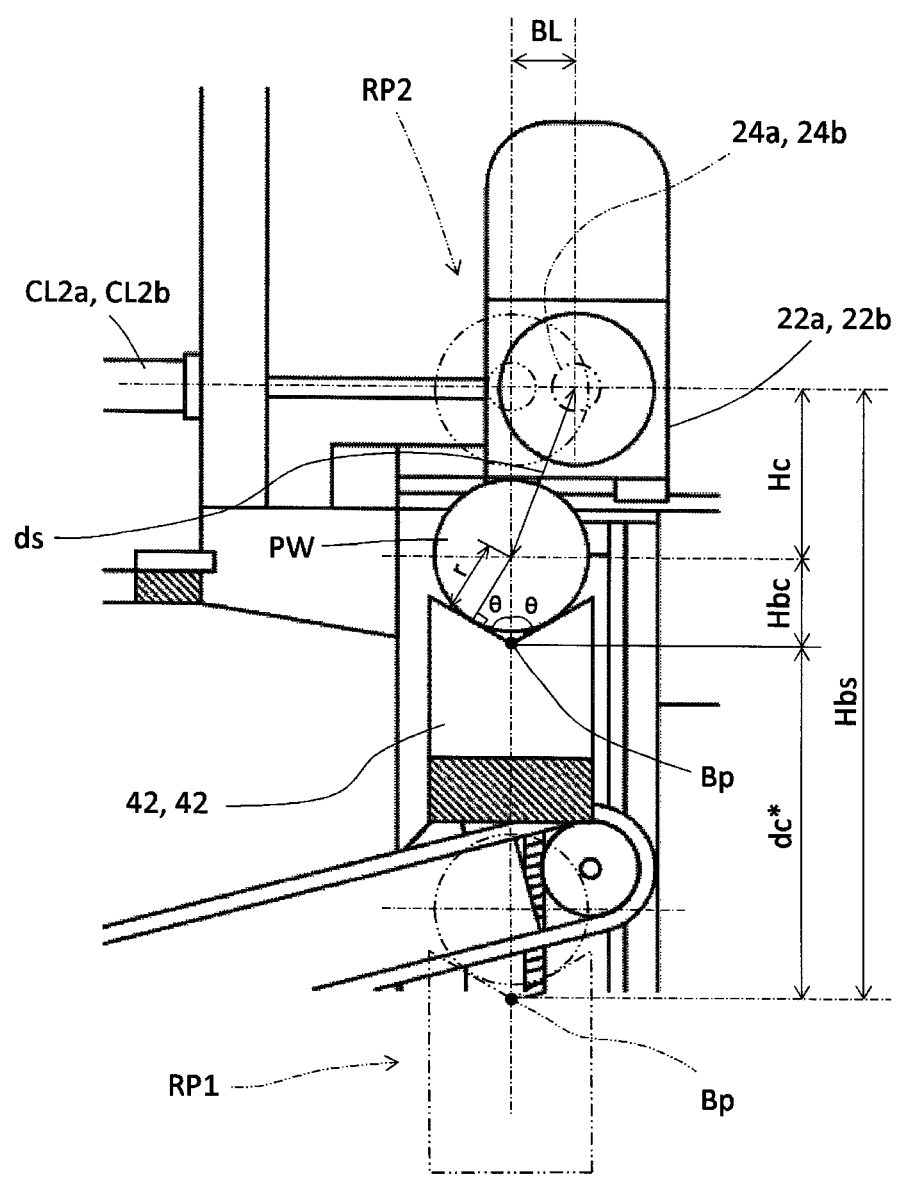

[Fig. 29]
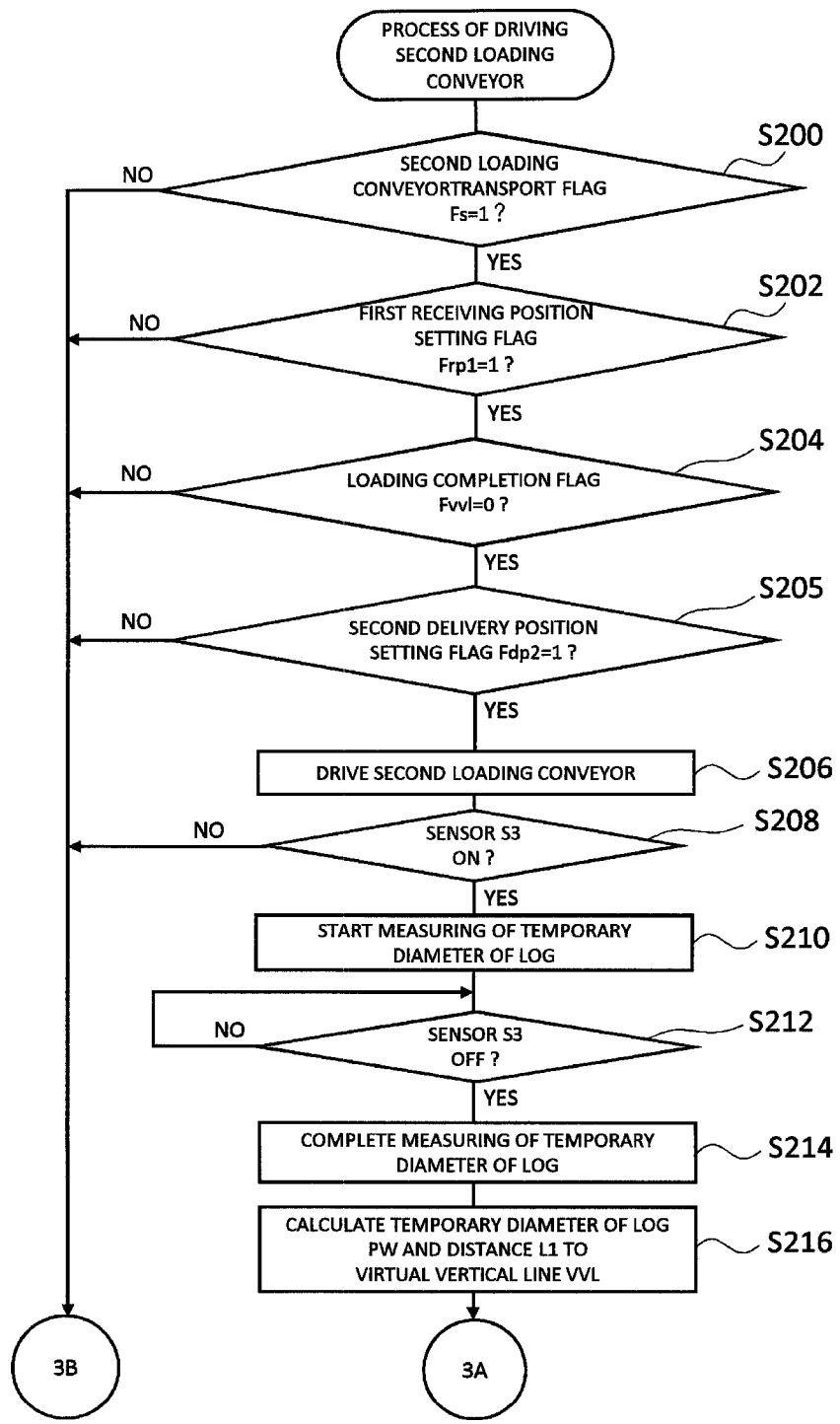

[Fig. 30]
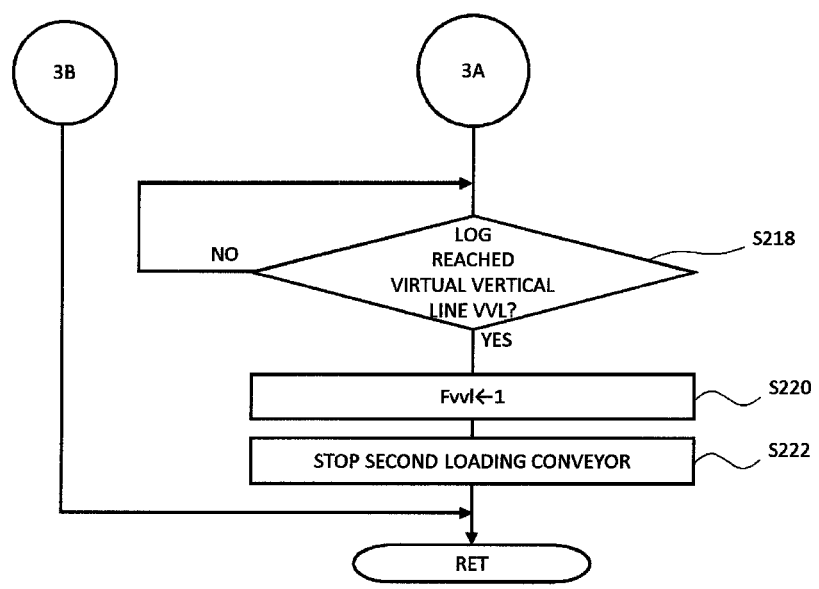

[Fig. 31]
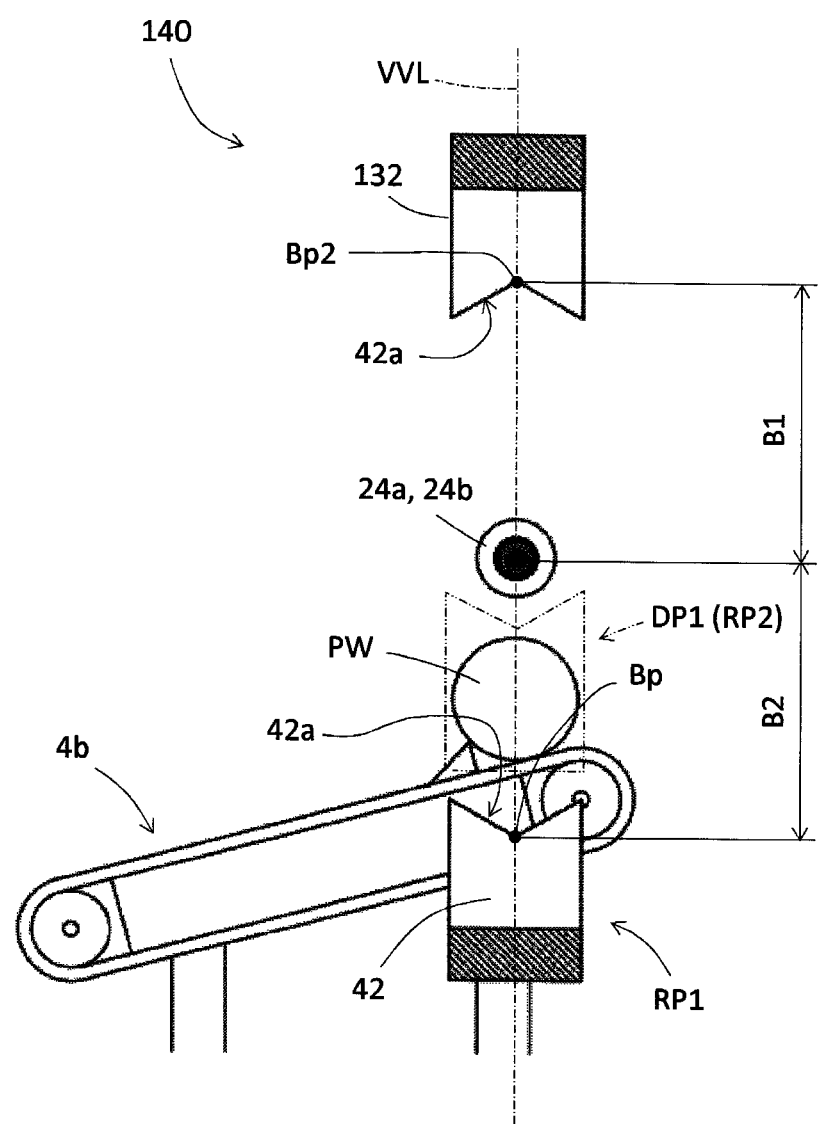

[Fig. 32]
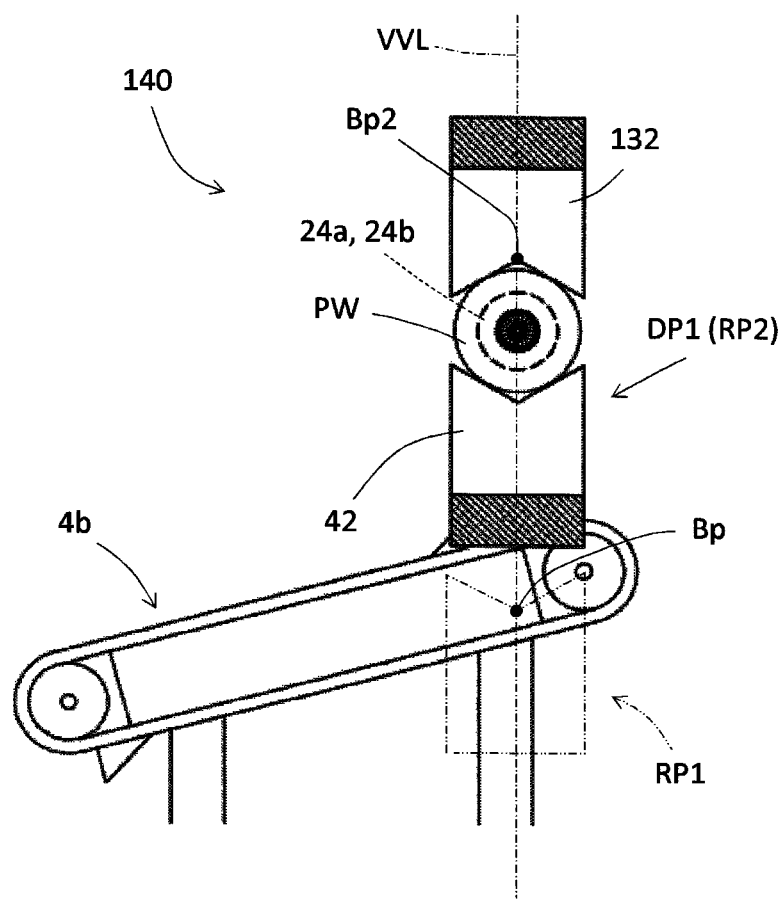

[Fig. 33]
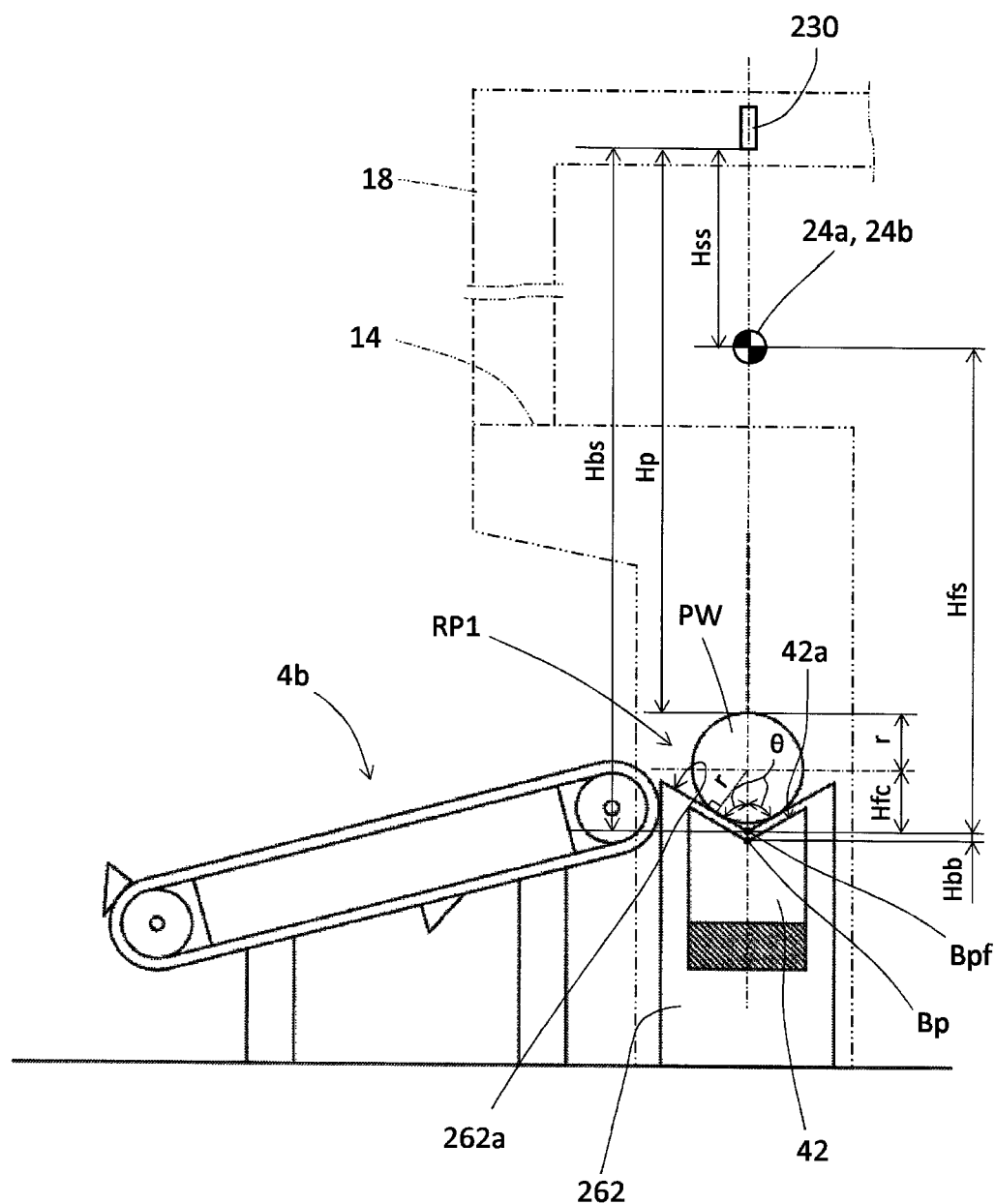

[Fig. 34]
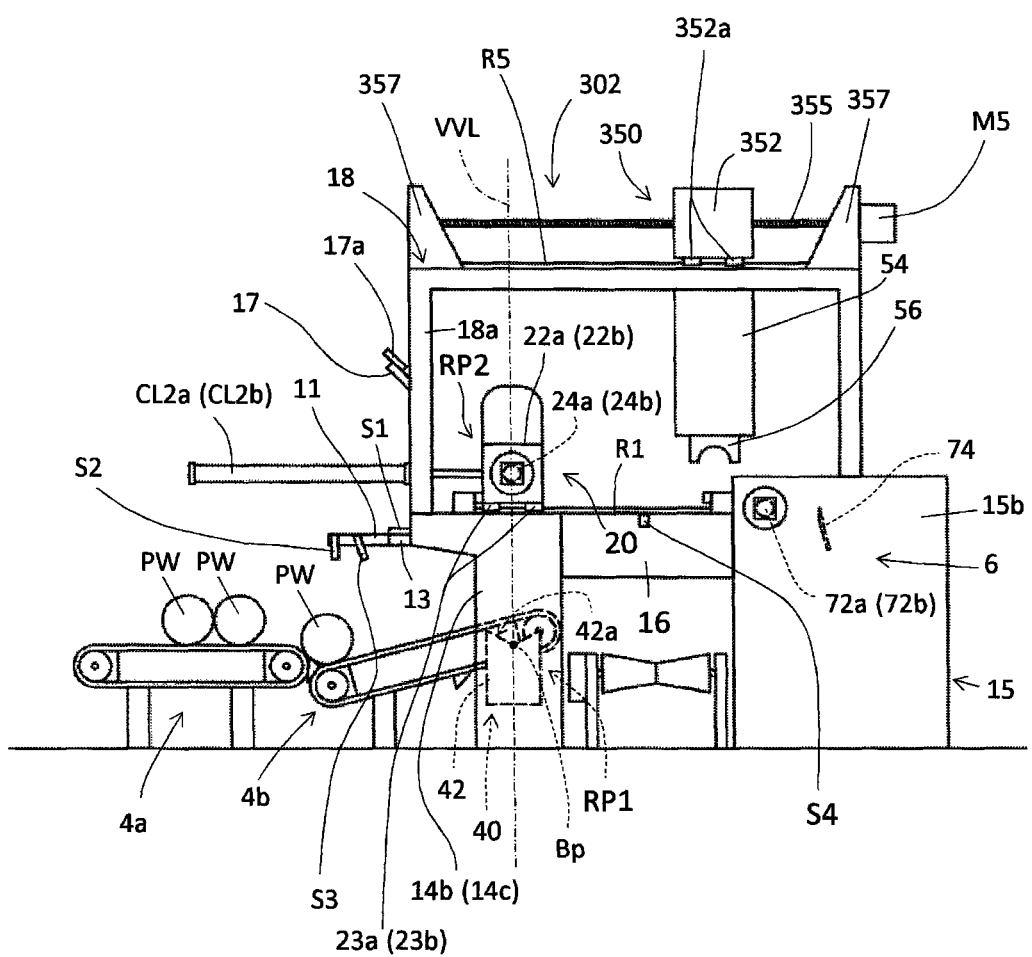

[Fig. 35]
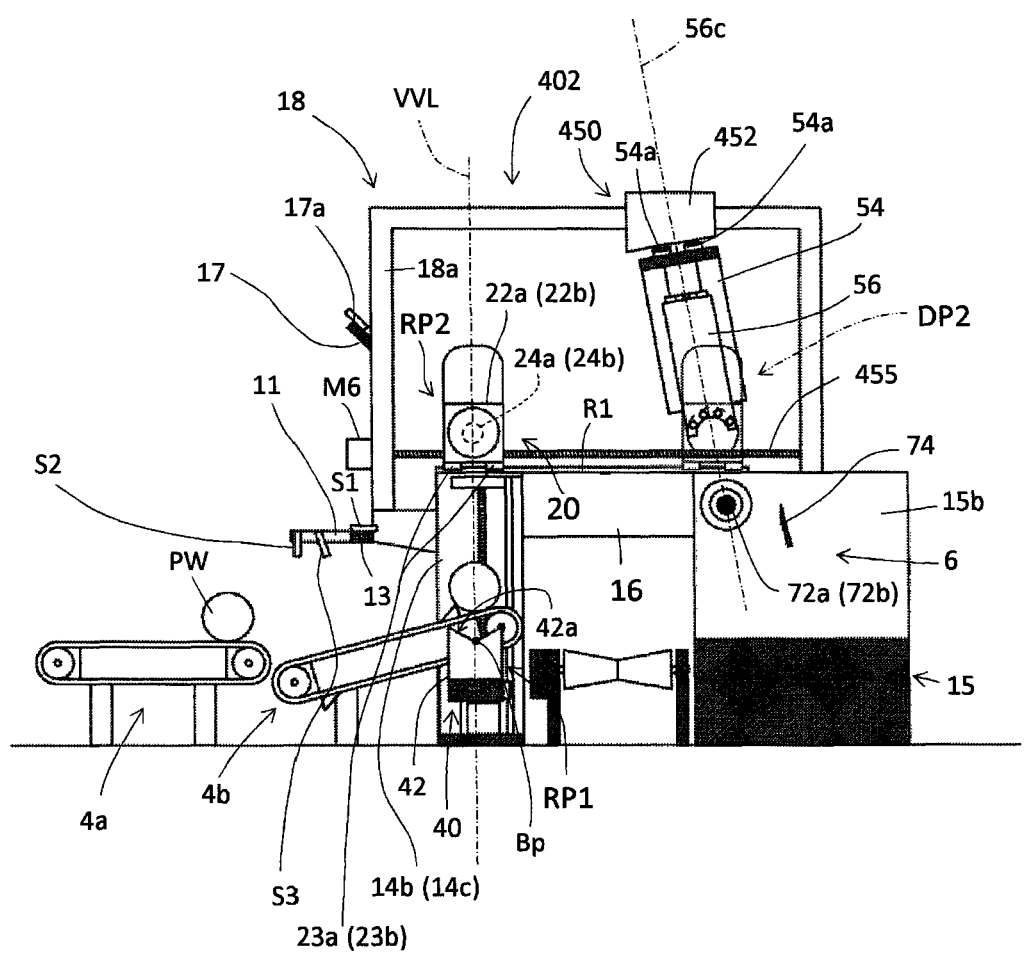

[Fig. 36]
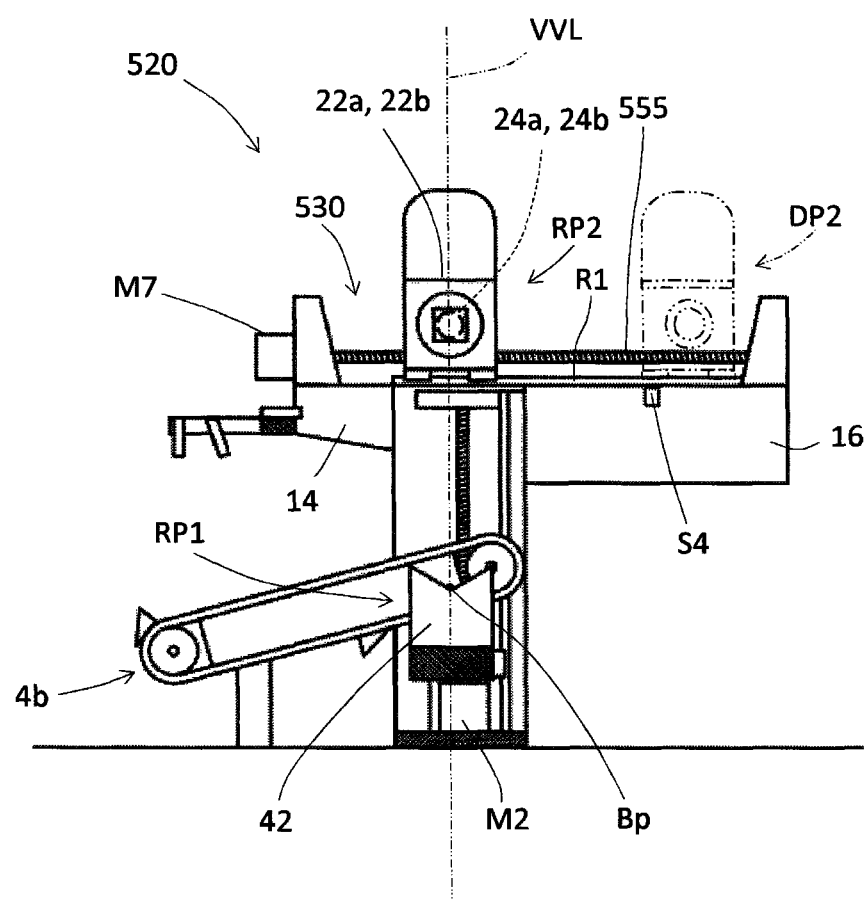

[Fig. 37]
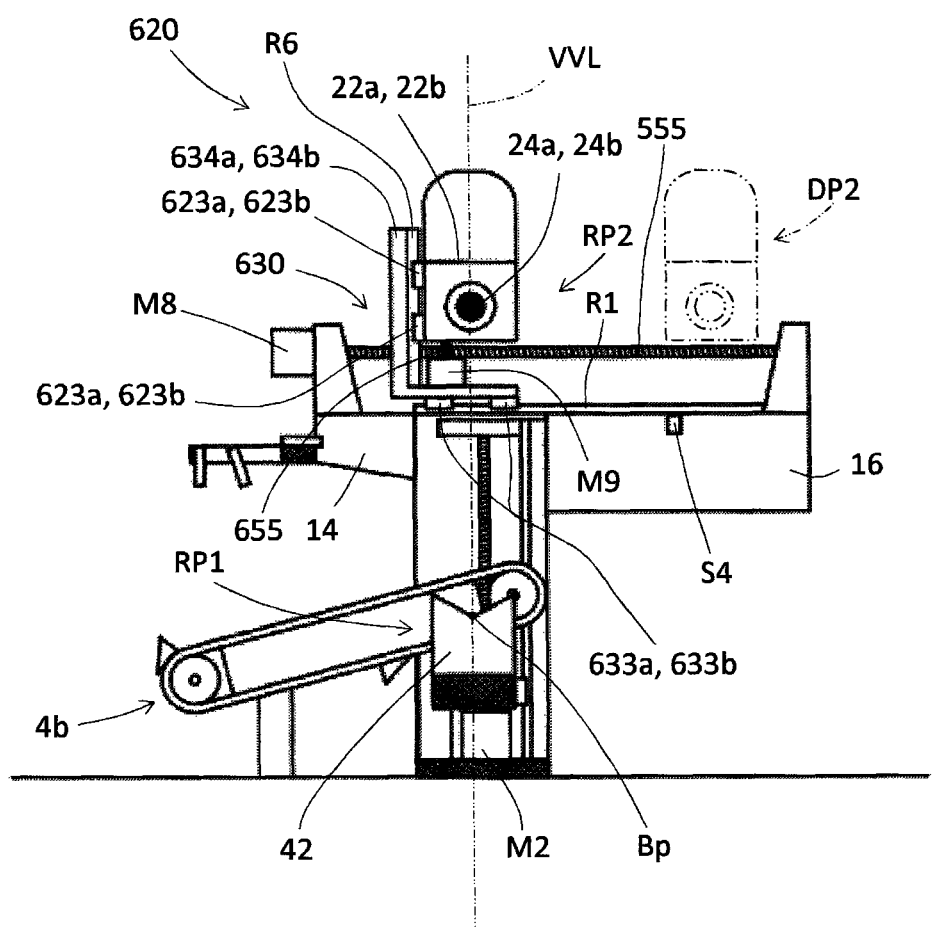

[Fig. 38]
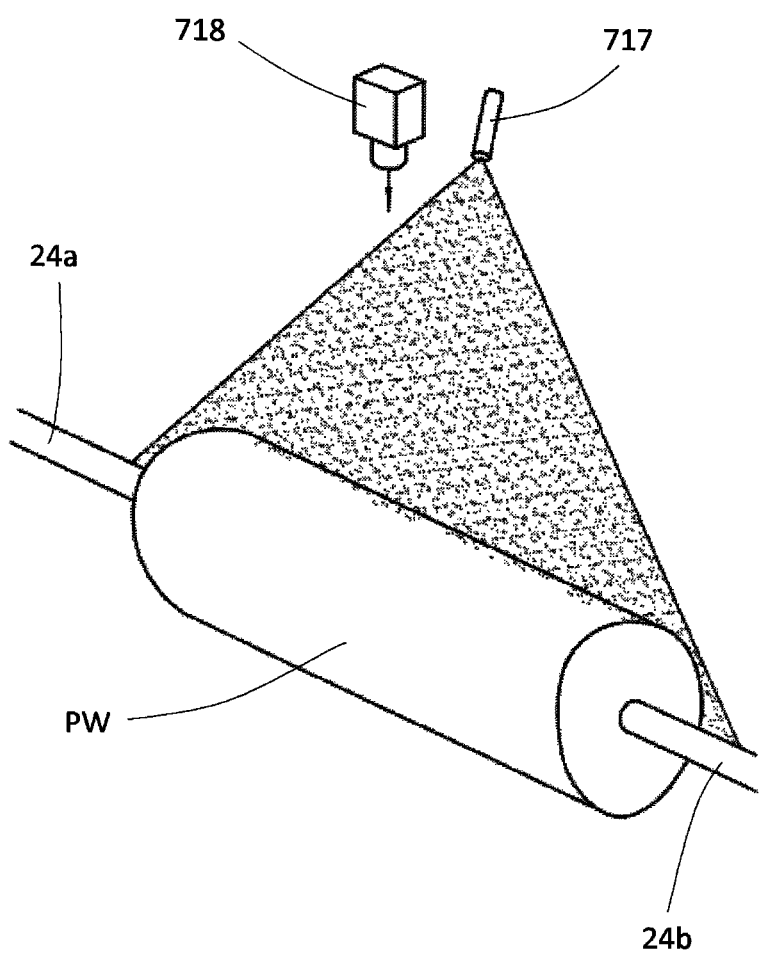

LOG FEEDING APPARATUS, LOG PROCESSING APPARATUS HAVING THE SAME, AND METHOD OF CONTROLLING THE SAME

CROSS-REFERENCE TO RELATED APPLICATIONS

This application is the U.S. National Phase of International Application No. PCT/JP2019/043398, filed Nov. 6, 2019, which claims priority to Japanese Patent Application No. 2019-013895, filed Jan. 30, 2019. The contents of both of those applications are incorporated by reference herein in their entirety.

TECHNICAL FIELD

The present disclosure relates to a log feeding apparatus for feeding a log to first and second cutting spindles that are capable of holding the log therebetween at the first and second end surfaces of the log in the longitudinal direction, a log processing apparatus including the same, and a method for controlling the log feeding apparatus.

BACKGROUND ART

Japanese Patent Publication No. 4-60001 describes a log feeding apparatus. The log feeding apparatus includes first and second shaft bearing housings that respectively have first and second spindles capable of holding the cut surfaces of a log and that are movable in the transport direction of the log. The log feeding apparatus also includes a handling device having first and second transporting claws that are capable of holding the log. The handling device is disposed downstream of the first and second shaft bearing housings in the transport direction of the log. The log feeding apparatus measures the outer peripheral shape of a log by rotating the log held between the first and second spindles, calculates the deviation between the rotation axis center line of the log and the cutting axis center line of the log based on the measured outer peripheral shape of the log. The log feeding apparatus then moves the first and second shaft bearing housings downstream of the transport direction of the log so as to correct the deviation, and delivers the log with the corrected deviation from the first and second spindles to the first and second transporting claws, so that the transporting claws outfeed the log to a chuck for cutting.

In the log feeding apparatus, the first and second transporting claws receive the log from the first and second spindles, with the deviation between the rotation axis center line of the log and the cutting axis center line of the log being corrected, that is, the relative centering being finished. Hence the first and second transporting claws can supply the log to the cutting chuck, with the cutting axis center line of the log being aligned with the rotation axis center line of the cutting chuck. Note that the first and second shaft bearing housings are moved to the handling device side while the deviation is corrected. As a result, the time can be reduced that is required for delivery of the log from the first and second spindles to the first and second transporting claws.

BRIEF SUMMARY

From the viewpoint of improving productivity, it is desirable to shorten the log transport time from the first and second spindles to the cutting chuck and to increase the number of logs fed to the cutting chuck per unit time.

Therefore, in the log feeding apparatus described in the above-mentioned publication, there is still room for improvement in terms of productivity. Here, as a method of shortening the log transport time, it is conceivable to increase the operation speed of the first and second shaft bearing housings and that of the handling device. However, this measure leads to an increase in workload applied to the first and second shaft bearing housings and the handling device, or an increase in workload on an actuator that drives the first and second shaft bearing housings and the handling device. Furthermore, there is a possibility that the stability during log transport may be lowered due to disordered movement of logs under transport for example.

The present disclosure has been made in view of the above, and an objective is to provide a log feeding apparatus that is capable of increasing the number of logs to be fed to first and second cutting spindles per unit time, with no increase in workload applied to each part of the log feeding apparatus and no decrease in stability during the log transport, a log processing apparatus including the same, and a method for controlling the log feeding apparatus.

The log feeding apparatus, the log processing apparatus including the same, and the method for controlling the same according to the present disclosure employ the following means in order to achieve the above-mentioned objective.

A log feeding apparatus according to a first embodiment of the present disclosure feeds a log to a first and second cutting spindles that are capable of holding the log therebetween at the first and second end surfaces of the log in the longitudinal direction. The log feeding apparatus includes a centering unit, a log feeding unit, a transport unit, a driving unit, and a controller. The centering unit has first and second centering spindles capable of holding the log at the first and second end surfaces. Further, the centering unit is disposed upstream of the first and second cutting spindles in the transport direction of the log. The log feeding unit is disposed upstream of the centering unit in the transport direction of the log. Also, the log feeding unit is reciprocally movable between a first receiving position to receive the log and a first delivery position that is located downstream of the first receiving position in the transport direction of the log to deliver the received log to the first and second centering spindles. The transport unit has first and second clamping arms capable of holding the log therebetween. In addition, the transport unit is located between the first and second centering spindles and the first and second cutting spindles so as to transport the log from the first and second centering spindles to the first and second cutting spindles. The driving unit is connected to the centering unit and causes the centering unit to be reciprocated between a second receiving position and a second delivery position. The second receiving position is where the centering unit receives the log from the log feeding unit. In addition, the second delivery position is a downstream position where the first and second centering spindles delivers the log to the first and second clamping arms, the second delivery position being away from the second receiving position by a distance equal to or greater than a maximum diameter of the log in the transport direction. The controller, when the first and second centering spindles are holding no log, drive controls the log feeding unit toward the first delivery position to feed a new log to the first and second centering spindles regardless of the position of the centering unit. In contrast, when the first and second centering spindles are holding the log, the controller drive controls the log feeding unit toward the first delivery position to feed a new log to the first and second centering spindles after the centering unit has moved a distance equal to or greater than the maximum diameter of the log from the second receiving position downstream in the transport direction of the log. Here, the "maximum diameter of a log" in the present disclosure is defined as the assumed largest diameter of the diameters of logs to be fed to the first and second cutting spindles by the log feeding apparatus of the present disclosure.

According to the present disclosure, when the first and second centering spindles are holding no log, the log feeding unit is moved toward the first delivery position to feed a new log from the log feeding unit to the second receiving position regardless of the position of the centering unit. In contrast, in the case where the first and second centering spindles are holding a log, the log feeding unit is moved toward the first delivery position to prepare a new log at the second receiving position before the centering unit returns to the second receiving position, after the centering unit has moved a distance equal to or greater than the assumed maximum diameter of the diameters of logs from the second receiving position downstream in the transport direction of the log. Accordingly, the number of logs to be fed to first and second cutting spindles per unit time can be increased with no increase in workload applied to each part of the log feeding apparatus and no decrease in stability during the log transport. The new log to be fed from the log feeding unit to the second receiving position will not contact with the log located at or downstream of the second receiving position, because the centering unit has moved a distance equal to or greater than an assumed maximum diameter of logs when the new log is fed to the second receiving position in both cases where the first and second centering spindles are holding a log or no log. It is also possible to move a new log to the second delivery position by the centering unit while the log that is held between the first and second clamping arms is delivered to the first and second cutting spindles, so as to prepare the delivery of the new log to the first and second clamping arms. This enables further increase in the number of the logs to be fed to the first and second cutting spindles per unit time.

According to another embodiment of the present disclosure, the log feeding apparatus further includes a log loading unit for loading a log onto the log feeding unit. The controller controls the log loading unit to load a log onto the log feeding unit located at the first receiving position, regardless of the position of the centering unit, when the first and second centering spindles are holding no log; and controls the log loading unit to load a log onto the log feeding unit located at the first receiving position after the centering unit has moved a distance equal to or greater than the assumed maximum diameter of the diameters of logs from the second receiving position downstream in the transport direction of the log when the first and second centering spindles are holding the log.

According to the embodiment, in the case where the first and second centering spindles are holding a log, after the centering unit has moved a distance equal to or greater than the assumed maximum diameter of the diameters of logs from the second receiving position downstream in the transport direction of the log, a new log is loaded into the log feeding unit at the first receiving position. Thus, when a new log is carried in at the first receiving position, it is possible to avoid the new log from contacting the log that is held between the first and second centering spindles.

A log feeding apparatus according to a second embodiment of the present disclosure feeds a log to a first and second cutting spindles that are capable of holding the log therebetween at the first and second end surfaces of the log in the longitudinal direction. The log feeding apparatus includes a centering unit, a log feeding unit, a transport unit, a driving unit, a measuring unit, and a controller. The centering unit has first and second centering spindles capable of holding the log at the first and second end surfaces. Further, the centering unit is disposed upstream of the first and second cutting spindles in the transport direction of the log. The log feeding unit is disposed upstream of the centering unit in the transport direction of the log. Also, the log feeding unit is reciprocally movable between a first receiving position to receive the log and a first delivery position that is located downstream of the first receiving position in the transport direction of the log to deliver the received log to the first and second centering spindles. The transport unit has first and second clamping arms capable of holding the log. The transport unit is located between the first and second centering spindles and the first and second cutting spindles so as to transport the log from the first and second centering spindles to the first and second cutting spindles. The driving unit is connected to the centering unit and causes the centering unit to be reciprocated between a second receiving position and a second delivery position. The second receiving position is where the centering unit receives the log from the log feeding unit. In addition, the second delivery position is a downstream position where the first and second centering spindles delivers the log to the first and second clamping arms, the second delivery position being away from the second receiving position by a distance equal to or greater than a maximum diameter of the log in the transport direction. The measuring unit is disposed upstream of the first receiving position in the transport direction of the log and configured to measure a temporary diameter of a log. The controller includes a storage unit and a calculation unit. The storage unit stores the temporary diameter of the measured log. The calculating unit calculates a safe distance equal to or greater than the value obtained by dividing by two the sum of the first temporary diameter of a log currently held between the first and second centering spindles among the stored temporary diameters and a second temporary diameter of the new log to be fed to the first receiving position. The controller, when the first and second centering spindles are holding no log, drive controls the log feeding unit toward the first delivery position to feed a new log to the first and second centering spindles regardless of the position of the centering unit. In contrast, in the case where the first and second centering spindles are holding a log, the controller drive controls the log feeding unit toward the first delivery position based on the distance the centering unit has moved from the second receiving position to the second delivery position and the safe distance. Here, the "maximum diameter of a log" in the present disclosure is defined as the assumed maximum diameter of the diameters of logs to be fed to the first and second cutting spindles by the log feeding apparatus of the present disclosure. In addition, the "temporary diameter of log" in the present disclosure typically corresponds to the diameter of a log in the direction along the transport direction of the log.

According to the present disclosure, when the first and second centering spindles are holding no log, the log feeding unit is moved toward the first delivery position to feed a new log from the log feeding unit to the second receiving position regardless of the position of the centering unit. In contrast, in the case where the first and second centering spindles are holding a log, the log feeding unit is moved toward the first delivery position based on the distance the centering unit has moved from the second receiving position to the second delivery position and the safe distance, so as to feed a new log from the log feeding unit to the second receiving position. Therefore, while well avoiding the new log, which is fed from the log feeding unit to the second receiving position, from contacting the log located at or downstream of the second receiving position, the new log can be placed at the second receiving position before the centering unit returns to the second receiving position. As a result, the number of logs to be fed to first and second cutting spindles per unit time can be increased with no increase in workload applied to each part of the log feeding apparatus and no decrease in stability during the log transport. It is also possible to move a new log to the second delivery position by the centering unit while the log that is held between the first and second clamping arms is delivered to the first and second cutting spindles, so as to prepare the delivery of the new log to the first and second clamping arms. This enables further increase in the number of the logs to be fed to the first and second cutting spindles per unit time.

In a log feeding apparatus according to another embodiment of the present disclosure, a controller drive controls the log feeding unit toward the first delivery position after the centering unit has move a safe distance from the second receiving position to the second delivery position, in the case where the first and second centering spindles are holding a log.

According to the embodiment, a new log is fed to the second receiving position when the centering unit has moved a safe distance. Thus, it is surely possible to avoid the new log to be fed from the log feeding unit to the second receiving position from contacting the log that is located at or downstream of the second receiving position.

In a log feeding apparatus according to another embodiment of the present disclosure, the log feeding unit includes a placing section on which a log is placed. The placing section has a reference portion that serves as a reference for calculating a temporary rotation axis center line of a log. In the case where the first and second centering spindles are holding a log, the controller calculates a first distance from the reference portion to the temporary rotation axis center line of the new log placed on the placing section, using the second temporary diameter and the geometry of the placing section. The controller then uses the safe distance and the second distance by which the centering unit has moved from the second receiving position toward the second delivery position, so as to calculate a third distance from a temporary rotation axis center line of a new log to the rotation axis center line of the first and second centering spindles with the centering unit being located at the second receiving position, in the case where the axial distance between the rotation axis center line of the first and second centering spindles while the centering unit is moving from the second receiving position toward the second delivery position and the temporary rotation axis center line of the new log is the safe distance. Subsequently, the controller calculates a fifth distance by subtracting the first and third distances from a fourth distance, so as to cause the log feeding unit to move by the fifth distance, the fourth distance being a distance from the reference portion when the log feeding unit is at the first receiving position to the rotation axis center line of the first and second centering spindles when the centering unit is at the second receiving position.

According to the embodiment, in the case where the first and second centering spindles are holding a log, the log feeding unit is moved toward the first delivery position while the distance between the temporary rotation axis center line of the log and the rotation axis center line of the first and second centering spindles when moving from the second receiving position to the second delivery position is maintained to be the safe distance. That is, the log feeding unit is moved toward the first delivery position before the first and second centering spindles move by the safe distance from the second receiving position to the second delivery position. For this reason, while the log transported by the log feeding unit toward the first delivery position is well prevented from coming into contact with the log at or downstream of the second receiving position, a new log can be prepared at the second receiving position before the centering unit returns to the second receiving position. This further increases the number of logs to be fed to the first and second cutting spindles per unit time without increasing the workload on each part of the log feeding apparatus and lowering the stability of log transport.

According to another embodiment of the log feeding apparatus according to the present disclosure, the log feeding apparatus further includes a log loading unit for loading a log into the log feeding unit.

The controller controls the log loading unit to load a log to the log feeding unit located at the first receiving position, regardless of the position of the centering unit when the first and second centering spindles are holding no log. In contrast, in the case where the first and second centering spindles are holding a log therebetween, controller controls the log loading unit to load a new log to the log feeding unit located at the first receiving position when the centering unit has moved by the safe distance from the second receiving position downstream in the direction of log transport.

According to the embodiment, in the case where the first and second centering spindles are holding a log, a new log is loaded to the log feeding unit located at the first receiving position when the centering unit has moved by the safe distance from the second receiving position downstream in the direction of log transport. Thus, when the log is loaded into the first receiving position, it is possible to well prevent the new loaded log from coming into contact with the log held between the first and second centering spindles.

According to another embodiment of the present disclosure, the log feeding apparatus further includes a log detection sensor disposed between the first receiving position and the first delivery position. The control unit calculates the position of the temporary rotation axis center line of log based on detection of a log by the log detection sensor, sets the first delivery position as the position where the temporary rotation axis center line is aligned with the rotation axis center line of the first and second centering spindles located at the second receiving position, and causes the log feeding unit to move accordingly.

According to the embodiment, before the process of measuring the exact cutting axis centerline of the log at the centering unit, that is, before deliver of the log to the first and second centering spindles, the temporary rotation axis center line is obtained to align it with the rotation axis center lines of the first and second centering spindles. Thus, the deviation (misalignment between the axis centerlines) can be reduced between the cutting axis center line of log and the rotation axis center line of the first and second centering spindles when a log is clamped by the first and second centering spindles. Accordingly, this can reduce the fluctuation of the log when the log is rotated by the first and second centering spindles in order to measure the cutting axis center line of the log. The "cutting axis center line of a log" is the rotation axis center line of the log that is held between the cutting spindles, and is defined as the rotation axis centerline of a log with which a veneer sheet can be obtained with the highest yield when a veneer is cut from the log.

According to another embodiment of the log feeding apparatus according to the present disclosure, the log feeding unit has a placing section for placing a log thereon. In addition, the placing section has a reference portion that serves as a reference for calculating the temporary rotation axis center line of the log. The controller calculates a virtual radius of the log along the direction from the first receiving position to the first delivery position, using a sixth distance from the reference portion to the log detection sensor when the log feeding unit is at the first receiving position, the displacement of the reference portion when the log feeding unit moves from the first receiving position to the position where the log is detected by the log detection sensor, and the geometric shape of the placing section. Also the controller calculates an eighth distance from the sum of the virtual radius and a seventh distance from the log detection sensor to the rotation axis center line of the first and second centering spindles when the centering unit is at the second delivery point, so as to cause the log feeding unit to move by the eighth distance after the log detection sensor has detected the log.

According to the embodiment, the temporary rotation axis center line of a log can be easily set, and the temporary rotation axis center line of the log can be easily aligned with the rotation axis center lines of the first and second centering spindles.

According to another embodiment of the log feeding apparatus according to the present disclosure, the first receiving position and the first delivery position are arranged below the second receiving position in the vertical direction.

According to the embodiment, since the total length of the apparatus in the log transport direction can be decreased, the apparatus in the log transport direction can be downsized.

According to an embodiment of the present disclosure, a log processing apparatus includes the log feeding apparatus according to any one of the above embodiments in the direction of log transport, a loading apparatus disposed upstream of the log feeding apparatus and configured to load a log to the log feeding apparatus, and a processor disposed downstream of the log feeding apparatus in the direction of log transport. The processor includes first and second cutting spindles and a blade for processing a log.

According to the present disclosure, the log processing apparatus includes the log feeding apparatus according to any one of the above embodiments, and thereby the same effects obtained by the log feeding apparatus according to the present disclosure can be achieved in the log processing apparatus, such as an increase in the number of logs to be fed to the first and second cutting spindles per unit time with no increase in the workload applied to each part of the log feeding apparatus and no decrease in stability during the log transport.

According to a first embodiment of the present disclosure, a method for controlling a log feeding apparatus is provided, the apparatus including a centering unit having first and second centering spindles that are capable of holding a log therebetween at the first and second end faces of the log in a longitudinal direction of the log, and a transport unit including first and second clamping arm that are capable of holding the log therebetween, wherein the log fed to the centering unit is fed to the first and second cutting spindles by the log transport unit. The method for controlling a log feeding apparatus includes: (a) feeding a log to the centering unit located at a receiving position; (b) holding the log between the first and second centering spindles; (c) calculating a cutting axis center line of the log by rotating the first and second centering spindles, and positioning the log at a rotational angle corresponding to the calculated cutting axis center line; (d) moving the centering unit from the receiving position to a delivery position where the log is delivered from the first and second centering spindles to the first and second clamping arms, the delivery position being away from the receiving position downstream in a transport direction of the log by a distance equal to or greater than a maximum diameter of the log; (e) feeding a new log to the receiving position after the centering unit has moved from the receiving position by the distance that is equal to or greater than the maximum diameter of the log; (f) when the centering unit has reached the delivery position, delivering the log from the first and second centering spindles to the first and second clamping arms; and (g) feeding the log from the first and second clamping arms to the first and second cutting spindles. Here, the "maximum diameter of a log" in the present disclosure is defined as the possible maximum diameter among the diameters of logs to be fed to the first and second cutting spindles by the log feeding apparatus of the present disclosure. In the present disclosure, the "cutting axis center line of a log" is defined as the rotation axis center line of the log from which a veneer sheet can be obtained with the highest yield from the log when cutting a veneer from the log.

According to the present disclosure, a new log is fed at the receiving position after the centering unit holding the log between the first and second centering spindles has moved by a distance that is equal to or greater than the assumed maximum diameter of diameters of logs downstream in the direction of log transport. Thus, a new log can be prepared at the receiving position before the centering unit reaches the delivery position. As a result, the number of logs to be fed to the first and second cutting spindles per unit time can be increased without increasing the workload on each part of the log feeding apparatus or lowering the stability of log transport. Note that a new log is fed to the receiving position when the centering unit has moved a distance that is greater than or equal to a assumed maximum diameter of logs, and thereby the new log fed to the receiving position does not come into contact with the log held between the first and second centering spindles.

According to another embodiment of the method for controlling a log feeding apparatus according to the present disclosure, the method further includes, while executing the step (g), moving the centering unit from the delivery position to the receiving position, and holding the new log that was fed to the receiving position between the first and second centering spindles, and calculating a cutting axis center line of the log by rotating the first and second centering spindles.

According to the embodiment, during the transfer of a log from the first and second clamping arms to the first and second cutting spindles, the log is held between the first and second centering spindles and the cutting axis center line of the log is calculated. Thus, the time can be reduced that is required for delivery of the log from the first and second spindles to the first and second clamping arms. As a result, the number of logs to be fed to the first and second cutting spindles per unit time can be further increased.

According to another embodiment of the present disclosure, the method for controlling a log feeding apparatus further includes moving a new log to the delivery position by the centering unit while executing the step (g).

According to the embodiment, during the delivery of the log from the first and second clamping arms to the first and second cutting spindles, a new log is moved to the delivery position by the centering unit so as to be delivered to the first and second clamping arms. Thus, the time can be reduced that is required for the log to be delivered from the first and second centering spindles to the first and second clamping arms. As a result, the number of logs to be fed to the first and second cutting spindles per unit time can be further increased. Note that the movement of the new log to the delivery position by the centering unit may be performed during the calculation of the cutting axis center line of the log is calculated or after the calculation.

According to a second embodiment of the present disclosure, a method for controlling a log feeding apparatus is provided, the apparatus including a centering unit having first and second centering spindles that are capable of holding a log therebetween at the first and second end faces of the log in a longitudinal direction of the log, and a transport unit having first and second clamping arms to hold the log therebetween, wherein the log fed to a centering unit is fed to first and second cutting spindles by a transport unit. The method for controlling a log feeding apparatus includes: (h) measuring a temporary diameter of the log and storing the measured temporary diameter; (i) feeding the log to the centering unit located at a receiving position; (j) holding the fed log between first and second centering spindles; (k) calculating a cutting axis center line of the log by rotating the first and second centering spindles, and positioning the log at a rotational angle corresponding to the calculated cutting axis center line; (l) moving the centering unit from the receiving position to a delivery position where the log is delivered from the first and second centering spindles to the first and second clamping arms, the delivery position being away from the receiving position by a distance equal to or greater than a maximum diameter of the log downstream in the direction of log transport; (m) calculating a safe distance that is equal to or greater than a value obtained by dividing by two the sum of the temporary diameter of the log currently held between the first and second centering spindles among the stored temporary diameters and a temporary diameter of a new log to be fed to the receiving position; (n) feeding the new log to receiving position based on the movement distance by which the centering unit has moved from the receiving position to the delivery position and also based on the safe distance; (o) when the centering unit has reached the delivery position, delivering the log from the first and second centering spindles to the first and second clamping arms; and (p) feeding the log from the first and second clamping arms to first and second cutting spindles.

According to the present disclosure, a new log is fed to the receiving position by the first and second centering spindles based on the distance the centering unit holding the log has moved from the receiving position toward the delivery position and the safety distance. For this reason, a new log can be prepared at the receiving position before the centering unit returns to the receiving position, while the log newly fed to the receiving position is well prevented from coming into contact with the log located at or downstream of the receiving position. As a result, the number of logs to be fed per unit time to the first and second cutting spindles can be increased without increasing the workload on each part of the log feeding apparatus or lowering the stability of log transport. Further, during delivery of the log from the first and second clamping arms to the first and second cutting spindles, a new log can be moved to the delivery position by the centering unit, so as to prepare the new log for delivery to the first and second clamping arms. As a result, the number of logs to be fed per unit time to the first and second cutting spindles can be further increased.

According to the present disclosure, the number of logs to be fed to the first and second cutting spindles per unit time can be increased without increasing the workload on each part of the log feeding apparatus and lowering the stability of log transport.

BRIEF DESCRIPTION OF THE DRAWINGS

FIG. 1 is a schematic configuration view showing an outline of a configuration of a log processing apparatus 1 according to an embodiment of the present disclosure.

FIG. 2 is a perspective view of a log processing apparatus 1 according to an embodiment of the present disclosure.

FIG. 3 is a front view of a log processing apparatus 1 according to an embodiment of the present disclosure, from the downstream side of a transport direction of a log PW.

FIG. 4 is a cross-sectional view showing a cross section A-A of FIG. 3.

FIG. 5 is a flowchart illustrating a processing routine for driving a first loading conveyor that is executed by an electronic control unit 8 of an embodiment of the present disclosure.

FIG. 6 is a flowchart illustrating a processing routine for driving a second loading conveyor that is executed by an electronic control unit 8 of an embodiment of the present disclosure.

FIG. 7 is a flowchart illustrating a processing routine for driving a transport apparatus for temporary centering, the routine being executed by an electronic control unit 8 of an embodiment of the present disclosure.

FIG. 8 is a flowchart of the part branched from the processing routine for driving a transport apparatus for temporary centering of FIG. 7.

FIG. 9 is a flowchart illustrating a processing routine for driving a log rotation apparatus that is executed by the electronic control unit 8 of an embodiment of the present disclosure.

FIG. 10 is a flowchart of the part branched from the processing routine for driving a log rotation apparatus of FIG. 9.

FIG. 11 is a flowchart illustrating a processing routine for driving a pendular transport apparatus that is executed by the electronic control unit 8 of an embodiment of the present disclosure.

FIG. 12 is an explanatory diagram showing a log PW loaded in from a first loading conveyor 4a to a second loading conveyor 4b.

FIG. 13 is an explanatory diagram showing the log PW detected by a sensor S3 during loading by the second loading conveyor 4b.

FIG. 14 is an explanatory diagram showing completion of the detection of the log PW by the sensor S3 during loading by the second loading conveyor 4b.

FIG. 15 is an explanatory diagram showing in detail the calculation of a distance L2 by which placing sections 42, 42 are required to move so that the temporary rotation axis center line of the log PW is aligned with the rotation axis center line of centering spindles 24a, 24b when the log PW is assumed to be at a second receiving position RP2.

FIG. 16 is an explanatory diagram showing the log PW loaded into a first receiving position RP1.

FIG. 17 is an explanatory diagram showing a placing section 42 moving toward a first delivery position DP1 with the log PW being placed thereon.

FIG. 18 is an explanatory diagram showing the log PW that is fed to a second receiving position RP2 by a placing section 42.

FIG. 19 is an explanatory diagram showing the log PW that is held between the centering spindles 24a, 24b at the second receiving position RP2.

FIG. 20 is an explanatory diagram showing a state where the log PW is positioned at a rotational angle α corresponding to the cutting axis center line of the log PW and where clamping arms 56, 56 are set at a posture corresponding to the cutting axis center line of the log PW.

FIG. 21 is an explanatory diagram showing the centering spindles 24a, 24b that are holding the log PW and moving from the second receiving position RP2 to a second delivery position DP2.

FIG. 22 is an explanatory diagram showing a state where a new log PW is prepared at the second receiving position RP2 while the log PW is being delivered from the centering spindles 24a, 24b to the clamping arms 56, 56.

FIG. 23 is an explanatory diagram showing a state where a new log PW is delivered from the centering spindles 24a, 24b to the clamping arms 56, 56, and the centering spindles 24a, 24b are moving from the second delivery position DP2 toward the second receiving position RP2.

FIG. 24 is an explanatory diagram showing a state where a log PW is delivered at the second receiving position RP2 from a placing section 42a to the centering spindles 24a, 24b while the log PW is being delivered from the clamping arms 56, 56 to cutting spindles 72a, 72b.

FIG. 25 is a flowchart illustrating a processing routine for driving a second loading conveyor that is executed by the electronic control unit 8 of the present embodiment.

FIG. 26 is a flowchart illustrating a second processing routine for driving a transport apparatus for temporary centering that is executed by the electronic control unit 8 of the present embodiment.

FIG. 27 is a flowchart illustrating a second processing routine for driving a transport apparatus for temporary centering that is executed by the electronic control unit 8 of the present embodiment.

FIG. 28 is an explanatory diagram showing the detail for calculating a placing section raising acceptable distance dc* by which the placing sections 42, 42 are moved so that the temporary rotation axis center line of the log PW is aligned with the rotation axis center line of the centering spindles 24a, 24b that are assumed to be at the second receiving position RP2 while maintaining a safe distance ds.

FIG. 29 is a flowchart illustrating another example of the processing routine for driving a second loading conveyor that is executed by the electronic control unit 8 of the present embodiment.

FIG. 30 is a flowchart of the part branched from the processing routine for driving a second loading conveyor FIG. 29.

FIG. 31 is a diagram showing an outline of a configuration of a modified transport apparatus for temporary centering 140.

FIG. 32 is an explanatory diagram showing a state where a modified transport apparatus for temporary centering 140 aligns the temporary rotation axis center line of the log PW with the rotation axis center line of the centering spindles 24a, 24b.

FIG. 33 is another explanatory diagram showing calculation of a distance L2 by which the placing sections 42, 42 are moved so that the temporary rotation axis center line of the log PW is aligned with the rotation axis center line of the centering spindles 24a, 24b that are assumed to be at the second receiving position RP2.

FIG. 34 is a diagram showing an outline of a configuration of a lathe charger 302 having a modified running transport apparatus 350.

FIG. 35 is a diagram showing an outline of a configuration of a lathe charger 402 having a modified running transport apparatus 450.

FIG. 36 is a diagram showing an outline of a configuration of a modified log rotation apparatus 520.

FIG. 37 is a diagram showing an outline of a configuration of a modified log rotation apparatus 620.

FIG. 38 is an explanatory diagram showing another example of measurement of the outer peripheral shape of a log PW.

DETAILED DESCRIPTION

Next, the best mode for carrying out the present disclosure will be described using embodiments.

A log processing apparatus 1 according to the present disclosure manufactures a veneer sheet having a predetermined thickness by rotating and cutting a log PW. As shown in FIG. 1, the log processing apparatus 1 includes a lathe charger 2, first and second loading conveyors 4a, 4b arranged upstream (on the left side in FIG. 1) of the lathe charger 2 in the transport direction of the log PW (in the right-left direction in FIG. 1), a veneer lathe 6 arranged downstream (on the right side in FIG. 1) of the lathe charger 2 in the transport direction of the log PW, and an electronic control unit 8 for controlling the entire apparatus 1. The lathe charger 2 and the first and second loading conveyors 4a, 4b correspond to the "log feeding apparatus" of the present disclosure, and the veneer lathe 6 corresponds to the "processing machine" of the present disclosure, each being an example an implementation configuration.

As shown in FIG. 1, the lathe charger 2 according to an embodiment of the present disclosure mainly includes a frame 10, a log rotation apparatus 20 supported by the frame 10, a transport apparatus for temporary centering 40 supported by the frame 10 and located upstream of the log rotation apparatus 20 in the transport direction of the log PW, and a pendular transport apparatus 50 supported by the frame 10 and located downstream of the log rotation apparatus 20 in the transport direction of the log PW. The transport apparatus for temporary centering 40 corresponds to the "log feeding unit" of the present disclosure, and the pendular transport apparatus 50 corresponds to the "transport unit" of the present disclosure, each being an example an implementation configuration.

As shown in FIG. 1, the frame 10 includes a lower frame 12 and upper frames 18, 18 located on the lower frame 12. The lower frame 12 includes a front frame 14 located upstream in the direction along the horizontal direction among the transport directions of the log PW, a rear frame 15 located downstream in the direction along the horizontal direction among the transport directions of the log PW, and an intermediate frame 16 connecting between the front and rear frames 14 and 15. The front and rear frames 14 and 15 includes, as shown in FIGS. 2 and 3, bottom walls 14a and 15a to be set on a floor, a pair of vertical walls 14b, 14c and a pair of vertical walls 15b, 15c extending vertically from the front and rear frames 14 and 15 respectively, and is generally U-shaped when seen in the direction along the horizontal direction among the transport directions of the log PW. The vertical walls 15b, 15c have a height greater than the vertical walls 14b, 14c.

On the upstream end surfaces of upper portions of the vertical walls 14b, 14c of the front frame 14, a coupling beam 13 is located horizontally, as shown in FIGS. 1 and 2, in the direction along the horizontal direction among the transport directions of the log PW. In other words, the coupling beam 13 joins between the vertical walls 14b, 14c. Sensors S1, S1 are set on the coupling beam 13, as shown in FIG. 2, for sensing the log PW (only the sensor S1 is shown in FIG. 2). As shown in FIG. 1, the sensors S1, S1 are set between a first receiving position RP1 and a first delivery position DP1. At the first receiving position RP1, the transport apparatus for temporary centering 40 receives the log PW from the second loading conveyor 4b, and at the first delivery position DP1, the transport apparatus for temporary centering 40 delivers the log PW to later-described centering spindles 24a, 24b of the log rotation apparatus 20. Note that the sensors S1, S1 are set at a position where the optical axis of light to be emitted from the sensors S1, S1 intersects with virtual vertical lines VVL, VVL passing through respective reference lines Bp, Bp set on later-described placing sections 42, 42. The sensors S1, S1 are also set to face downward in the direction along the horizontal direction among the transport directions of the log PW. The sensors S1, S1 is an example an implementation configuration corresponding to the "log detection sensor" of the present disclosure.

As shown in FIG. 2, an extension piece 11 extending toward the upstream in the direction along the horizontal direction among the transport directions of the log PW is integrally attached to a substantially central portion of the coupling beam 13 in the longitudinal direction. Sensors S2, S3 for detecting the log PW are attached to the extension piece 11. As shown in FIG. 4, the extension piece 11 has a length that reaches the boundary between the first loading conveyor 4a and the second loading conveyor 4b.

As shown in FIG. 4, the sensor S2 is disposed in the vicinity of the tip of the extension piece 11 so that the detection unit faces downward in the vertical direction. As such, delivery of the log PW from the first loading conveyor 4a to the second loading conveyor 4b is recognized when the sensor S2 detects the log PW. The sensor S3 is located closer to the coupling beam 13 than to the sensor S2 so the detection unit faces in the direction orthogonal to the plane containing the placement surface of the second loading conveyor 4b where the log PW is placed. By measuring the transport distance from the sensor S3 starts to detect the log PW until it completes the detection, the diameter of the log PW in the transport direction of the log PW by the second loading conveyor 4b can be obtained.

As shown in FIG. 2, the intermediate frame 16 connects the upper portions of the vertical walls 14b, 14c of the front frame 14 to the upper portions of the vertical walls 15b, 15c of the rear frame 15. As such, the lower frame 12 is generally U-shaped when viewed from the side (in the direction perpendicular to both the horizontal direction and the vertical direction in the transport direction of the log PW). The upper surface of the intermediate frame 16 is flush with the upper surfaces of the vertical walls 14b, 14c of the front frame 14. As shown in FIG. 2, rails R1 are installed on the upper surface of the intermediate frame 16. As shown in FIG. 1, the rails R1 extend from the vertical walls 14b, 14c of the front frame 14 to the downstream end of the intermediate frame 16 (connected portions with the vertical walls 15b, 15c of the rear frame 15). That is, the rails R1 extend in a direction along the horizontal direction in the transport direction of the log PW. Note that the vertical walls 15b, 15c are higher than the vertical walls 14b, 14c, and thereby the upper surface of the intermediate frame 16 is lower than the upper surfaces of the vertical walls 15b, 15c.

A sensor S4 is attached to the intermediate frames 16 as shown in FIG. 1. The sensor S4 is a sensor for detecting that the shaft bearing housings 22a, 22b to be described later have moved a predetermined distance downstream in the transport direction of the log PW. The sensor S4 is located at a position downstream of the second receiving position RP2 where the centering spindles 24a, 24b receive the log from the transport apparatus for temporary centering 40 in the transport direction of the log PW, the position being close to the later-described rails R1. The predetermined distance according to the present embodiment of the present disclosure is set as a value slightly greater than the assumed maximum diameter among diameters of logs PW to be fed to the log processing apparatus 1. The position away from the second receiving position RP2 by a predetermined distance downstream in the transport direction of the log PW is set to be a second delivery position DP2 where the log PW is delivered from the centering spindles 24a, 24b to the clamping arms 56, 56 (to be described later) of the pendular transport apparatus 50. In the present embodiment, when the sensor S4 starts to detect the shaft bearing housings 22a, 22b and completes the detection, it is determined that the shaft bearing housings 22a, 22b have moved the predetermined distance.

The upper frames 18, 18 are generally U-shaped when the lower frame 12 is viewed from the side (in the direction perpendicular to both the horizontal direction and the vertical direction in the transport direction of the log PW). As shown in FIG. 2, one ends of the upper frames 18, 18 are integrally connected to the upper surfaces of the vertical walls 14b, 14c of the front frame 14, and the other ends are integrally connected to the upper surfaces of the vertical walls 15b, 15c of the rear frame 15. The ends of the upper frames 18, 18 on one side are disposed on the uppermost stream side of the upper surfaces of the vertical walls 14b, 14c in the direction along the horizontal direction in the transport direction of the log PW.

As shown in FIGS. 1 to 4, a coupling beam 17 is horizontally attached to a substantially intermediate portion in the height direction of vertical column portions 18a, 18a of the upper frames 18, 18. In other words, the vertical column portions 18a and 18a are connected by the coupling beam 17. The coupling beam 17 is attached to the vertical column portions 18a and 18a in a state where a normal line of a mounting surface of a later-described laser measuring instrument 17a of the coupling beam 17 is inclined with respect to the vertical direction. More specifically, the coupling beam 17 is inclined such that the upper mounting surface of the coupling beam 17 faces downstream in the direction along the horizontal direction among the transport directions of the log PW. A plurality of laser measuring instruments 17a for measuring the shape of the log PW are installed on the upper mounting surface of the coupling beam 17. As shown in FIG. 3, the plurality of laser measuring instruments 17a are arranged at equal intervals along the longitudinal direction of the coupling beam 17. The inclination angle of the coupling beam 17 with respect to the vertical column portions 18a and 18a is set such that, when the laser measuring instruments 17a are installed on the coupling beam 17, laser beams emitted from the laser measuring instruments 17a are orthogonal to the rotation axis center line of the centering spindles 24a, 24b, with the later-described shaft bearing housings 22a, 22b of the log rotation apparatus 20 being located at the second receiving position RP2.

As shown in FIG. 2, the log rotation apparatus 20 includes shaft bearing housings 22a, 22b arranged on the rails R1, and centering spindles 24*a*, 24*b* supported by the shaft bearing housings 22*a*, 22*b* so as to be rotatable and slidable in the axial center line direction, a motor M1 connected to the centering spindle 24*a* via a timing belt (not shown), fluid cylinders CL1*a*, CL1*b* having respectively cylinder rods (not shown) connected to one ends of the centering spindles 24*a*, 24*b* in the axial center line direction, and fluid cylinders CL2*a*, CL2*b* (only the fluid cylinder CL2*b* is shown in FIG. 2) having cylinder rods (not shown) connected to shaft bearing housings 22*a*, 22*b*. The shaft bearing housings 22*a*, 22*b* correspond to the "centering unit" in the present disclosure, and the centering spindles 24*a*, 24*b* correspond to the "first centering spindle" and the "second centering spindle" respectively in the present disclosure, each being an example an implementation configuration. The fluid cylinders CL2*a*, CL2*b* are examples of an implementation configuration corresponding to the "drive unit" in the present disclosure.

As shown in FIG. 4, the shaft bearing housings 22*a*, 22*b* have guided sliding portions 23*a* and 23*b* that engage with the rails R1 respectively. As shown in FIG. 1, the shaft bearing housings 22*a*, 22*b* are reciprocated between the second receiving position RP2 and the second delivery position DP2 on the rails R1 by the fluid cylinders CL2*a*, CL2*b* respectively. Here, as shown in FIG. 4, the second receiving position RP2 is defined as the position where the rotation axis center lines of the centering spindles 24*a*, 24*b* intersects the virtual vertical line VVL passing through the reference line Bp set on placing sections 42, 42 (to be described later) of the transport apparatus for temporary centering 40. The second receiving position RP2 is also defined as a position where the centering spindles 24*a*, 24*b* receive the log PW from the transport apparatus for temporary centering 40. Further, the second delivery position DP2 is defined as a position located on the virtual vertical line VVL side, that is, downstream from the second receiving position RP2 in the transport direction of the log PW by a distance slightly greater than the assumed maximum diameter among the diameters of the log PW that is supplied to the log processing apparatus 1 according to an embodiment of the present disclosure. The second delivery position DP2 is also defined as a position where the log PW is delivered from the centering spindles 24*a*, 24*b* to the later described clamping arms 56, 56 of the pendular transport apparatus 50. The second receiving position RP2 corresponds to the "second receiving position" and the "receiving position" in the present disclosure, and the second delivery position DP2 is an example of an implementation configuration corresponding to the "second delivery position" and the "delivery position" in the present disclosure. The reference line Bp is an example of an implementation configuration corresponding to the "reference portion" in the present disclosure.

As shown in FIGS. 2 and 3, the centering spindles 24*a*, 24*b* are supported by the shaft bearing housings 22*a*, 22*b* in a state of facing each other, and each have a chuck (not shown) to hold the log PW between them at the cut end faces (both end faces of the log PW in the longitudinal direction). The centering spindles 24*a*, 24*b* are reciprocated in the axial center line direction by the fluid cylinders CL1*a* and CL1*b*. The log PW can be clamped by movement of the centering spindles 24*a*, 24*b* toward each other, and the clamping of the log PW can be released by movement of the centering spindles 24*a*, 24*b* away from each other. In the present embodiment, only the centering spindle 24*a* is rotationally driven by the motor M1. While the log PW is held between the centering spindles 24*a*, 24*b*, when the centering spindle 24*a* is rotated by the motor M1, the centering spindles 24*a*, 24*b* and the log PW rotate integrally. The motor M1 has a rotary encoder (not shown) which enables detection of a rotation angle of the centering spindle 24*a*, that is, the rotation angle of the log PW. This makes it possible to control the position of the log PW at a desired rotation angle.

As shown in FIG. 4, the transport apparatus for temporary centering 40 is disposed downward in the vertical direction of the log rotation apparatus 20. More specifically, the transport apparatus for temporary centering 40 is disposed directly below the shaft bearing housings 22*a*, 22*b* disposed at the second receiving position RP2. The configuration in which the transport apparatus for temporary centering 40 is disposed downward in the vertical direction of the log rotation apparatus 20 can well prevent the log processing apparatus 1 from increasing the size thereof in the transport direction of the log PW.

As shown in FIG. 3, the transport apparatus for temporary centering 40 includes: placing sections 42, 42 where the log PW loaded in from the second loading conveyor 4*b* is received and placed; male thread rods 44, 44 supported by the vertical walls 14*b*, 14*c* of the front frame 14 so as to extend in the vertical direction and threadedly engaged with the placing sections 42, 42; and motors M2, M2 connected to lower ends of the male thread rods 44, 44. As the motors M2 and M2 rotate the male thread rods 44, 44 forward and backward, the placing sections 42, 42 are reciprocated between the first receiving position RP1 and the first delivery position DP1. The motors M2 and M2 have a rotary encoder (not shown) and can detect the amount of movement of the placing sections 42, 42 in the vertical direction. Accordingly, the placing sections 42, 42, that is, the log PW can be controlled to a desired vertical position.

As shown in FIG. 4, the placing sections 42, 42 have substantially V-shaped placement surfaces 42*a*, 42*a* that open upward in the vertical direction, and the log PW is brought into contact with the placement surfaces 42*a*, 42*a* to be held. In the present embodiment, the intersection line of two planes constituting the V-shape of the placement surfaces 42*a*, 42*a* is used as a reference line Bp for obtaining a temporary rotation axis center line of the log PW which is described later. The placing sections 42, 42 have guided sliding portions 43, 43 that engage with rails R2 disposed on the vertical walls 14*b*, 14*c* of the front frame 14 in the vertical direction. Thereby, the stability when the placing sections 42, 42 are reciprocated in the vertical direction is improved.

As shown in FIG. 3, the pendular transport apparatus 50 includes: a long rotary frame 52 that is rotatably supported by the upper frames 18, 18; holders 54, 54 that are attached to the rotary frame 52 integrally and rotatably and also slidably in the longitudinal direction of the rotary frame 52; and clamping arms 56, 56 slidably supported by the holders 54, 54. The clamping arms 56, 56 are an example of an implementation configuration corresponding to the "first clamping arm" and the "second clamping arm" in the present disclosure.

As shown in FIG. 3, the rotary frame 52 has rotation shafts 52*a*, 52*a* at both ends in the longitudinal direction, and is supported by the shaft receiving houses 53, 53, where the rotation shafts 52*a*, 52*a* are fixed to the upper surfaces of the upper frames 18, 18. As shown in FIG. 1, the rotation axis center lines of the rotation shafts 52*a*, 52*a* are aligned between the rotation axis center line of the centering spindles 24*a*, 24*b* at the second delivery position DP2 and the rotation axis center line of later-described cutting spindles 72a, 72a of the veneer lathe 6, in the direction along the horizontal direction among the transport directions of the log PW.

A rotation shaft (not shown) of the motor M3 is connected to the shaft end portion of the one rotation shaft 52a, and the rotary frame 52 is rotated as the motor M3 is driven. The motor M3 has a rotary encoder (not shown) and can detect the rotation angle of the rotary frame 52. Thereby, the position of the rotary frame 52 can be controlled to a desired rotation angle.

Further, as shown in FIG. 3, the rotary frame 52 has rails R3 and R3 on the lower surfaces (lower surfaces in FIGS. 2 and 3) of both end portions other than the central portion in the longitudinal direction. The rails R3 and R3 extend along the longitudinal direction of the rotary frame 52. Further, as shown in FIGS. 2 and 3, the rotary frame 52 has a support wall 52b for supporting the fluid cylinders CL3a, CL3b on the lower surface (the lower surface in FIGS. 2 and 3) that is located generally in the center in the longitudinal direction. The support wall 52b protrudes in the vertical direction with respect to the lower surface of the rotary frame 52. Note that the fluid cylinders CL3a, CL3b are supported by the support wall 52b so that the axial center line direction thereof is parallel to the longitudinal direction of the rotary frame 52. The distal ends of the cylinder rods of the fluid cylinders CL3a, CL3b are connected to holders 54, 54, respectively.

As shown in FIG. 3, the holders 54, 54 have sliding portions 54a, 54a with guides on the upper surfaces, and are slidably supported in the longitudinal direction of the rotary frame 52 by engaging the guided sliding portions 54a, 54a with the rails R3, R3 of the rotary frame 52. The holders 54, 54 have rails R4, R4 that extend in a direction perpendicular to the upper surfaces of the holders 54, 54, respectively.

As shown in FIG. 3, the clamping arms 56, 56 have guided sliding portions 56a, 56a, and are slidably supported by engaging the guided sliding portions 56a, 56a with the rails R4 and R4 of the holders 54, 54. The clamping arms 56, 56 are connected to motors M4 and M4 fixed to the holders 54, 54, and slide on the rails R4 and R4 by driving the motors M4 and M4. More specifically, the clamping arms 56, 56 have a female thread portions (not shown) and are slid back and forth along the rails R4 and R4 when the motors M4 and M4 rotate the male thread rod (not shown) forward and backward. The clamping arms 56, 56 slide in a direction perpendicular to the upper surfaces of the holders 54, 54, that is, the lower surface of the rotary frame 52. Further, the clamping arms 56, 56 have claws 56b, 56b at the distal end portions for holding the log PW at the cut surfaces (both end surfaces in the longitudinal direction) of the log PW.

The clamping arms 56, 56 supported by the holders 54, 54 in this way can swing together with the holders 54, 54 around the rotation shafts 52a, 52a as the rotary frame 52 rotates. The clamping arms 56, 56 also are slidable back and forth with respect to the holders 54, 54 in the direction approaching and moving away from the rotation shafts 52a, 52a. Note that the motors M4 and M4 have a rotary encoder (not shown) and can control the position of a rotation shaft (not shown) of the motors M4 and M4, that is, a male thread rod (not shown) to a desired rotation angle. As a result, the clamping arms 56, 56 can be each controlled to a desired position.

As shown in FIG. 1, the first and second loading conveyors 4a, 4b are constituted as chain conveyors to load in the log PW to the transport apparatus for temporary centering 40 by winding an endless annular chain CH around a pair of sprockets 62, 62, rotating one of the sprockets 62 by a motor (not shown), and moving the chain CH in the rotation direction of the sprockets 62, 62.

As shown in FIG. 4, the first loading conveyor 4a is installed so that the placement surface where the log PW is placed is parallel to the floor surface. The second loading conveyor 4b has a length between the downstream end portion of the first loading conveyor 4a and the transport apparatus for temporary centering 40.

The second loading conveyor 4b is also installed to be inclined upward from the first-loading-conveyor-4a side thereof toward the transport apparatus for temporary centering 40. Specifically, the sprocket 62 on the first-loading-conveyor-4a side of the second loading conveyor 4b is located lower than the sprocket 62 of the first loading conveyor 4a, and the sprocket 62 on the transport-apparatus-for-temporary centering 40 side of the second loading conveyor 4b is located higher than the placement surfaces 42a, 42a (see FIG. 4) of the placing sections 42, 42 of the transport apparatus for temporary centering 40 at the first receiving position RP1. The chain CH of the second loading conveyor 4b has a plurality of claws 64. The plurality of claws 64 prevent the log PW from dropping off from the second loading conveyor 4b while the second loading conveyor 4b is transporting the log PW. The motor (not shown) for rotating the sprocket 62 of the second loading conveyor 4b has a rotary encoder (not shown), and thereby the position of the log PW can be controlled to a desired position, and the transport distance of the log PW can be calculated by counting pulses output from the rotary encoder.

As shown in FIGS. 1 to 3, the veneer lathe 6 includes: cutting spindles 72a, 72b rotatably supported by vertical walls 15b, 15c of the rear frame 15; fluid cylinders CL4a, CL4b having cylinder rods (not shown) attached to the vertical walls 15b, 15c and connected to axial ends of the cutting spindles 72a, 72b on one side thereof; and a knife 74 disposed on the rear frame 15 so as to be movable forward and backward toward the log PW held between the cutting spindles 72a, 72b. The cutting spindles 72a, 72b correspond to the "first cutting spindle" and the "second cutting spindle" in the present disclosure, and the knife 74 is an example of an implementation configuration corresponding to the "blade" in the present disclosure.

As shown in FIGS. 2 and 3, the cutting spindles 72a, 72b are supported by the vertical walls 15b, 15c so as to face each other and also to be parallel to the centering spindles 24a, 24b. Further, the cutting spindles 72a, 72b have chucks (not shown) at the distal end portions for holding the log PW at the cut surfaces (both end surfaces in the longitudinal direction) of the log PW. The cutting spindles 72a, 72b are reciprocated in the axial center line direction by the fluid cylinders CL4a and CL4b. The cutting spindles 72a, 72b are moved in a direction approaching each other to hold the log PW at the cut surfaces (both end surfaces in the longitudinal direction), and the cutting spindles 72a, 72b are moved in a direction away from each other to disengage the holding of the log PW at the cut surfaces (both end surfaces in the longitudinal direction). In the present embodiment, only the cutting spindle 72a is driven to rotate by a motor (not shown), and the cut surfaces (both end surfaces in the longitudinal direction) of the log PW are held between the cutting spindles 72a, 72b. Thus, when the cutting spindle 72a is rotationally driven by a motor (not shown), the cutting spindles 72a, 72b and the log PW rotate integrally.

The knife 74 is attached to a knife carriage (not shown) that is reciprocally movable in the horizontal direction with respect to the rear frame 15. A veneer sheet having a desired thickness is peeled off from the log PW by approaching the knife carriage to the log PW held between the cutting spindles 72a, 72b at a predetermined speed.

The electronic control unit 8 is configured as a microprocessor centered on a CPU. In addition to the CPU, the electronic control unit 8 includes a ROM for storing processing programs, a RAM for temporarily storing data, an input/output port, and a communication port. The electronic control unit 8 receives, through the input port, detection signals from sensors S1, S2, and S3 that detect the log PW, detection signals from the sensor S4 that detects that the shaft bearing housings 22a, 22b have reached the second delivery position DP2, a distance to the outer surface of the log PW from the laser measuring instruments 17a, and pulses from the motors M1, M2, M3, and M4 and rotary encoders (not shown) of the motors. The electronic control unit 8 outputs, through the output port, driving signals to the first and second loading conveyors 4a, 4b, driving signals to the fluid cylinders CL1a, CL1b, CL2a, CL2b, CL3a, CL3b, CL4a, and CL4b, driving signals to the motors M1, M2, M3, and M4 and other motors (not shown), and driving signals to the knife carriage (not shown).

Next, the operation of the log processing apparatus 1 configured as described above, particularly the operation when a log is fed to the veneer lathe 6 by the lathe charger 2 will be described. FIG. 5 is a flowchart illustrating an example of a processing routine for driving a first loading conveyor that is executed by an electronic control unit 8 of the log processing apparatus 1 according to an embodiment of the present disclosure. FIG. 6 is a flowchart illustrating an example of a processing routine for driving a second loading conveyor that is executed by an electronic control unit 8 of the log processing apparatus 1 according to an embodiment of the present disclosure. FIGS. 7 and 8 are each a flowchart illustrating an example of a processing routine for driving a transport apparatus to obtain a temporary centering, the routine being executed by an electronic control unit 8 of the log processing apparatus 1 according to an embodiment of the present disclosure. FIGS. 9 and 10 are each a flowchart illustrating an example of a processing routine for driving a log rotation apparatus executed by the electronic control unit 8 of the log processing apparatus 1 according to an embodiment of the present disclosure. FIG. 11 is a flowchart illustrating an example of a processing routine for driving a pendular transport apparatus executed by the electronic control unit 8 of the log processing apparatus 1 according to an embodiment of the present disclosure. Note that the process of driving the first loading conveyor, the process of driving the second loading conveyor, the process of driving the log rotation apparatus, and the process of driving the pendular transport apparatus are simultaneously executed in parallel. For ease of description, the process of driving the first loading conveyor, the process of driving the second loading conveyor, the process of driving the log rotation apparatus, and the process of driving the pendular transport apparatus will be described in this order.

[Process of Driving the First Loading Conveyor]

In the process of driving the first loading conveyor, first, the CPU of the electronic control unit 8 executes a process of determining whether or not a transport flag Fs is 0 (Step S100). The transport flag Fs of the second loading conveyor is set by a later-described process of the present routine: it is set to be 1 when the sensor S2 is turned on, that is a log PW is loaded in onto the second loading conveyor 4b; and it is set to be 0 when the second loading conveyor 4b has completed the transport of the log PW and is ready to accept a new log PW.

When the transport flag Fs is 0, that is, when the second loading conveyor 4b is ready to accept a new log PW, the process of driving the first loading conveyor 4a is executed to load in a log PW to the second loading conveyor 4b (Step S102). When it is determined the transport flag Fs is 0 in Step S100, that is, when a log PW has been loaded in onto the second loading conveyor 4b, the present routine ends without doing anything.

Subsequently, a process of determining whether or not the sensor S2 is turned on is executed (Step S104). When the sensor S2 is turned on (see FIG. 12), the second loading conveyor transport flag Fs is set to 1 (Step S106), the first loading conveyor 4a is stopped (Step S108), and the present routine ends. When it is determined in Step S104 that the sensor S2 is not turned on, the processes in steps S102 to S104 are repeatedly executed until the sensor S2 is turned on.

[Process of Driving the Second Loading Conveyor]

In the process of driving the second loading conveyor, the CPU of the electronic control unit 8 executes a process of determining whether or not the transport flag Fs is 1 (Step S200). When the transport flag Fs is 1, that is a log PW has loaded in onto the second loading conveyor 4b, a process of determining whether or not a first receiving position setting flag Frp1 is 1 (Step S202). The first receiving position setting flag Frp1 is set in the process of a routine for driving the transport apparatus for temporary centering which is described later: it is set to 1 when the placing sections 42, 42 of the transport apparatus for temporary centering 40 are at the first receiving position RP1; and it is set to 0 when the placing sections 42, 42 of the transport apparatus for temporary centering 40 leaves the first receiving position RP1.

When the first receiving position setting flag Frp1 is 1, that is, when the placing sections 42, 42 of the transport apparatus for temporary centering 40 are at the first receiving position RP1, a process of determining whether or not a loading completion flag Fvv1 is 0 (Step S204). The loading completion flag Fvv1 is set in the process of the present routine which is described later: it is set to be 1 when the second loading conveyor 4b has completed loading of the log PW so that the placing sections 42, 42 of the transport apparatus for temporary centering 40 can transport it, that is the center point of the temporary diameter of the log PW has reached the virtual vertical line VVL which will be describe later; and it is set to be 0 otherwise.

When it is determined that the loading completion flag Fvv1 is 0, that is, when the center point of the temporary diameter of the log PW has not reached the virtual vertical line VVL to be described later, in other words, when the second loading conveyor 4b has not completed loading of the log PW so that the placing sections 42, 42 of transport apparatus for temporary centering 40 can transport it, a process of driving the second loading conveyor 4b is executed (Step S206), and a process of determining whether or not the sensor S3 is turned on (Step S208).

When the sensor S3 is turned on (see FIG. 13), a process of starting measurement of the temporary diameter of the log PW is executed (Step S210). The "starting measurement of the temporary diameter of the log PW" in the present embodiment means that pulse integration is started, the pulse being to be output by a rotary encoder (not shown) of a motor (not shown) that drives the second loading conveyor 4b. The temporary diameter of the log PW is defined as the diameter of the log PW transported by the second loading conveyor 4b in the direction along the transport direction.

Subsequently, a process of determining whether or not the sensor S3 is turned off is executed (Step S212). When the sensor S3 is turned off (see FIG. 14), a process of completing the measurement of the temporary diameter of the log PW is executed (Step S214). The "completing the measurement of the temporary diameter of the log PW" in this embodiment means the pulses integration ends, the pulses being to be output by a rotary encoder (not shown) of a motor (not shown) that drives the second loading conveyor 4b. When it is determined in Step S212 that the sensor S3 is not turned off, the process of Step S212 is repeatedly executed until the sensor S3 is turned off.

A processing is executed to calculate the temporary diameter of the log PW is calculated using the integrated value of pulses from the turning on of the sensor S3 to the turning off therefrom and to calculate the distance L1 from the center point of the temporary diameter of the log PW to the virtual vertical line VVL (Step S216). It is then determined whether or not the center point of the temporary diameter of the log PW has reached the virtual vertical line VVL (Step S218). The determination determined whether or not the center point of the temporary diameter of the log PW has reached the virtual vertical line VVL can be performed by integrating the pulses since the sensor S3 has turned off and determining whether or not the travel distance of the log PW reached the distance L1, the travel distance being calculated by using the integrated pause value.

When the center point of the temporary diameter of the log PW reaches the virtual vertical line VVL (see FIG. 16), the loading completion flag Fvv1 is set to 1 (Step S220), driving of the second loading conveyor 4b is stopped (Step S222), and the present routine ends. In Step S218, when it is determined that the center point of the temporary diameter of the log PW has not reached the virtual vertical line VVL yet, Step S218 is repeatedly executed until the center point of the temporary diameter of the log PW reaches the virtual vertical line VVL. When the center point of the temporary diameter of the log PW reaches the virtual vertical line VVL (see FIG. 16), the loading completion flag Fvv1 is set to 1 (Step S220), driving of the second loading conveyor 4b is stopped (Step S222), and the present routine ends.

When it is determined in Step S200 that the transport flag Fs of the second loading conveyor is not 1, or when it is determined in Step S202 that the first receiving position setting flag Frp1 is not 1, when it is determined that the loading completion flag Fvv1 is not 0 in Step S204, when it is determined in Step S208 that the sensor S3 is not turned on, the present routine ends without doing anything. Here, the electronic control unit 8 that executes the processing routine for driving the second loading conveyor is an example of an implementation configuration corresponding to the "control unit" in the present disclosure.

[Process of Driving the Transport Apparatus for Temporary Centering]

In the process of driving the transport apparatus for temporary centering, the CPU of the electronic control unit 8 executes a process to determine whether or not the first receiving position setting flag Frp1 is 1 (Step S300), and when the first receiving position setting flag Frp1 is 1, that is, when the placing sections 42, 42 of the transport apparatus for temporary centering 40 are at the first receiving position RP1, the CPU executes a process to determine whether or not the loading completion flag Fvv1 is 1 (Step S302). When the loading completion flag Fvv1 is 1, that is, when the center point of the temporary diameter of the log PW has reached the virtual vertical line VVL (see FIG. 16), the CPU executes a process to determine whether or not a centering spindle holding flag Fcs is 1 (Step S304). Here the centering spindle holding flag Fcs is set in a process of driving the log rotation apparatus which is described later, and is set to 1 when the log PW is held at the cut surfaces (both end surfaces in the longitudinal direction) between the centering spindles 24a, 24b, and is set to 0 when the holding is released.

When the centering spindle holding flag Fcs is 1, that is, when the log PW is held at the cut surfaces (both end surfaces in the longitudinal direction) between the centering spindles 24a, 24b, the CPU executes a process to determine whether or not a second delivering position setting flag Frp2 is 1 (Step S306). Here the second delivering position setting flag Frp2 is set in a process of driving the log rotation apparatus which is described later, and is set to 1 when the shaft bearing housings 22a, 22b of the log rotation apparatus 20 has reached the second delivery position DP2 where the centering spindles 24a, 24b delivers the log PW to the clamping arms 56, 56, of the pendular transport apparatus 50, and is set to 0 when the shaft bearing housings 22a, 22b leaves the second delivery position DP2.

When it is determined that the centering spindle holding flag Fcs is not 1 in Step S304, that is, when the holding of the log PW at the cut surfaces (both end surfaces in the longitudinal direction) between the centering spindles 24a, 24b is released, or when it is determined that the second delivery position setting flag Fdp2 is set to 1 in Step S306, that is when the shaft bearing housings 22a, 22b of the log rotation apparatus 20 has reached the second delivery position DP2, that is, when the centering spindles 24a, 24b (the shaft bearing housings 22a, 22b) holding the log PW at the cut surfaces (both end surfaces in the longitudinal direction) therebetween is away from the second receiving position RP2 by a distance equal to or greater than the assumed maximum diameter of the diameters of the log PW to be fed to the log processing apparatus 1, a process is executed for raising the placing sections 42, 42 of the transport apparatus for temporary centering 40 and resetting the first receiving position setting flag Frp1 and the loading completion flag Fvv1 to be 0 (Step S308).

In other words, the placing sections 42, 42 of the transport apparatus for temporary centering 40 that has the log PW thereon are raised only when the raising of the placing sections 42, 42 does not causes the log PW under transportation by the placing sections 42, 42 to be brought in contact with the log PW under transportation by the shaft bearing housings 22a, 22b of the log rotation apparatus 20. In this way, in the present embodiment, the log PW is transported to the first delivery position DP1 only based on the determination whether or not the log PW under transportation by the placing sections 42, 42 is brought in contact with the log PW under transportation by the shaft bearing housings 22a, 22b even when the placing sections 42, 42 having the log PW are raised before the shaft bearing housings 22a, 22b of the log rotation apparatus 20 (the centering spindles 24a, 24b) reaches the second receiving position RP2. As a result, the time required to transport the log PW to the cutting spindles 72a, 72b can be reduced.

Subsequently, a process of determining whether or not the sensors S1, S1 are turned on is executed (Step S310). When the sensors S1, S1 are turned on (see FIG. 17), a process of calculating the distance L2 is executed (Step S312), the distance L2 being the distance required to move the placing sections 42, 42 to the first delivery position DP1, that is, the distance by which the placing sections 42, 42 need to be moved to align the temporary rotating axis center line of the log PW located at the first receiving position RP1 with the rotation axis center lines of the centering spindles 24a, 24b of the log rotation apparatus 20 located at the second receiving position RP2. If it is determined in Step S310 that the sensors S1, S1 are not turned on, the process of Step S310 is repeatedly executed until the sensors S1, S1 are turned on, and when the sensors S1, S1 are turned on (see FIG. 17), the process of calculating the distance L2 necessary for moving the placing sections 42, 42 to the first delivery position DP1 is executed (Step S312).

Here, in this embodiment, the distance L2 is calculated by integrating the pulses output from the rotary encoders of the motors M2 and M2 that reciprocate the placing sections 42, 42, and using the integrated value of the pulses. Specifically, as shown in FIG. 15, a height Hs1 in the vertical direction from the reference line Bp set on the placing sections 42, 42 at the first receiving position RP1 to the sensors S1, S1, a height Hss in the vertical direction from the sensors S1, S1 to the rotation axis center line of the centering spindles 24a, 24b when the shaft bearing housings 22a, 22b are in the second receiving position RP2, and an opening angle 2θ between the placement surfaces 42a, 42a of the placing sections 42, 42 are measured in advance and stored in the ROM of the electronic control unit 8. When the log PW is detected by the sensors S1, S1, a height Hbp by which the reference line Bp has moved is calculated, and the distance L2 is obtained using the equations (1) and (3). Here in this embodiment, the height Hbp is obtained by using an integrated value of pulses output from the rotary encoders of the motors M2 and M2 until the log PW is detected by the sensors S1, S1 after the placing sections 42, 42 start to rise. In the equations, r is the radius of the virtual circle VC that is in contact with the two placement surfaces 42a, 42a and the optical axis of the light emitted from the sensors S1, S1, and is defined as the virtual radius of the log PW; and Hbc is the height from the reference line Bp on the placing sections 42, 42 to the temporary rotation axis center line of the log PW when the sensors S1, S1 detect the log PW. Here, the height Hs1 corresponds to the "sixth distance" in the present disclosure, the height Hss corresponds to the "seventh distance" in the present disclosure, and the opening angle 2θ corresponds to the "geometric shape of the placing section" in the present disclosure. The height Hbp corresponds to the "movement amount" in the present disclosure, and the distance L2 is an example of an implementation configuration corresponding to the "eighth distance" in the present disclosure. An embodiment in which the distance L2 is calculated using the equations (1) to (3) is an example of the implementation structure corresponding to "the controller calculates a virtual radius of the log along the direction from the first receiving position to the first delivery position, using a sixth distance from the reference portion to the log detection sensor when the log feeding unit is at the first receiving position, a displacement of the reference portion when the log feeding unit moves from the first receiving position to the position where the log is detected by the log detection sensor, and the geometric shape of the placing section, and the controller further calculates an eighth distance from the sum of the virtual radius and a seventh distance to the rotation axis center line of the first and second centering spindles when the centering unit is at the second receiving position, so as to cause the log feeding unit to move by the eighth distance after the log detection sensor has detected the log" of the present disclosure.

[Mathematical 1]

$$L2 = r + Hss \quad (1)$$

$$r = Hbc \cdot \cos\theta \quad (2)$$

$$Hbc = Hs1 - Hbp - r \quad (3)$$

Thus, when the distance L2 is obtained, a process of determining whether or not the placing sections 42, 42 have reached the first delivery position DP1, that is, the placing sections 42, 42 has been raised so that the temporary center axis of the log PW has been aligned with the center axis center line of the centering spindles 24a, 24b (Step S314). When the placing sections 42, 42 have reached the first delivery position DP1, that is, the placing sections 42, 42 have been raised so that the temporary center axis center line of the log PW has been aligned with the center axis center line of the centering spindles 24a, 24b, driving of the placing sections 42, 42 is stopped (Step S316). In Step S314, when it is determined that the placing sections 42, 42 have not reached the first delivery position DP1, that is, the placing sections 42, 42 have not been raised so that the temporary center axis center line of the log PW has been aligned with the center axis center line of the centering spindles 24a, 24b, Step S314 is repeatedly executed until the placing sections 42, 42 reach the first delivery position DP1, that is, until the placing sections 42, 42 have been raised so that the temporary center axis center line of the log PW has been aligned with the center axis center line of the centering spindles 24a, 24b, driving of the placing sections 42, 42 is stopped (Step S316). Then, the first delivery position setting flag Fdp1 is set to 1, and an elapsed descending time flag Ftd is set to 0 (Step S318). Here, the first delivery position setting flag Fdp1 is set to 1 when the placing sections 42, 42 reaches the first delivery position DP1 (see FIG. 18), that is, when the placing sections 42, 42 have been raised so that the temporary center axis center line of the log PW has been aligned with the center axis center line of the centering spindles 24a, 24b, otherwise it is set to 0. The elapsed descending time flag Ftd is set in the process of the present routine which is described later: it is set to 1 when a predetermined period of time Td* has elapsed since the placing sections 42, 42 have been driven toward the first receiving position RP1; and it is set to 0 when placing sections 42, 42 have been reached the first delivery position DP1.

In this way, in the present embodiment, before a later-described process of measuring the cutting axis center line of the log PW by the log rotation apparatus 20, that is, before the log PW is delivered to the centering spindles 24a, 24b, the temporary rotation axis center line of the log PW is obtained, and the temporary rotation axis center line is aligned with the rotation axis center line of the centering spindles 24a, 24b. Thus, when both cut faces (both end surfaces in the longitudinal direction) of the log PW are held between the centering spindles 24a, 24b, the deviation (deviation in axial centerline) between the cutting axis center line of the log PW and the rotation axis center line of the centering spindles 24a, 24b can be reduced. Thereby, it is possible to decrease the swinging of the log PW during the rotation of the log PW (Step S410) by the centering spindles 24a, 24b executed in the processing routine of driving the log rotation apparatus, which is described later. Note that the cutting axis center line of the log PW is defined as the rotation axis center line of the log PW when both cut faces (both end surfaces in the longitudinal direction) of the log PW are held between the cutting spindles 72a, 72b.

Subsequently, a process of determining whether or not the centering spindle holding flag Fcs is 1 is executed (Step S320). When it is determined that the centering spindle holding flag Fcs is not 1, that is, when the centering spindles 24a, 24b has released the cut ends (both end surfaces in the longitudinal direction) of the log PW, the process of Step S320 is repeatedly executed until the centering spindle holding flag Fcs is tuned to 1, that is, until the cut ends (both end surfaces in the longitudinal direction) of the log PW are held between the centering spindles 24a, 24b. When the centering spindle holding flag Fcs is 1, a processing is executed for driving the placing sections 42, 42 to return to the first receiving position RP1 (see FIG. 19), and for counting the elapsed descending time Td from the driving toward the first receiving position RP1 using a timer (not shown) (Step S322).

Next, the set flag Fdp1 of the first delivery position is reset to 0 (Step S324), and a process of determining whether or not the elapsed descending time Td has reached the predetermined period of time Td* is executed (Step S326). Here the predetermined period of time Td* is set as a period of time in which the placing sections 42, 42 could be descended to a position where the log PW if rotated does not interfere with the placing sections 42, 42.

When the elapsed descending time Td has reached the predetermined period of time Td*, that is, when the placing sections 42, 42 were descended to a position where the log PW if rotated does not interfere with the placing sections 42, 42, the elapsed descending time flag Ftd is set to 1 (Step S328). When it is determined that the elapsed descending time Td has not reached the predetermined period of time Td*, that is, when the placing sections 42, 42 have not yet descended to a position where the log PW if rotated does not interfere with the placing sections 42, 42, the process of Step S326 is repeatedly executed until the elapsed descending time Td reaches the predetermined period of time Td*, and when the elapsed descending time Td reaches the predetermined period of time Td*, the elapsed descending time flag Ftd is set to 1 (Step S328). Then, the process of determining whether or not the placing sections 42, 42 have reached the first receiving position RP1 is executed (Step S330). When the placing sections 42, 42 have reached the first receiving position RP1, the first receiving position setting flag Frp1 is set to 1, and the transport flag Fs of the second loading conveyor is reset to 0 (Step S332), and the present routine ends. In contrast, when it is determined that the placing sections 42, 42 have not yet reached the first receiving position RP1, the process of Step S330 is repeated until the placing sections 42, 42 reach the first receiving position RP1. When the placing sections 42, 42 have reached the first receiving position RP1, the first receiving position setting flag Frp1 is set to 1, and the transport flag Fs of the second loading conveyor is reset to 0 (Step S332), and the present routine ends.

Note that when the first receiving position setting flag Frp1 is not 1 in Step S300, that is, when the placing sections 42, 42 of the transport apparatus for temporary centering 40 are not at the first receiving position RP1, or when the loading completion flag Fvv1 is not 1 in Step S302, that is when the loading of the log PW by the second loading conveyor 4b has not completed so that the placing sections 42, 42 of the transport apparatus for temporary centering 40 can transport the log PW, or when the second delivery position setting flag Fdp2 is not 1 in Step S306, that is, when the shaft receiving houses 22a, 22b are not at the second delivery position DP2, the present routine is terminated without doing anything.

[Process of Driving the Log Rotation Apparatus]

In the process of driving the log rotation apparatus, the CPU of the electronic control unit 8 determines whether or not the second receiving position setting flag Frp2 is 1 (Step S400) and whether or not the first delivery position setting flag Fdp1 is 1 (Step S402). When both of the second receiving position setting flag Frp2 and the first delivery position setting flag Fdp1 are 1, that is, the centering spindles 24a, 24b (shaft receiving houses 22a, 22b) have reached the second receiving position RP2 and also the placing sections 42, 42 have reached the first delivery position DP1, the fluid cylinders CL1a, CL1b (see FIGS. 2 and 3) are driven to approach the centering spindles 24a, 24b to each other, so that the log PW is held between the centering spindles 24a, 24b at the cut surfaces (both end surfaces in the longitudinal direction) of the log PW (Step S404), and the centering spindle holding flag Fcs is set to 1 (Step S406). At this point of time, the temporary rotation axis center line of the log PW is aligned with the rotation axis center line of the centering spindles 24a, 24b.

Subsequently, a process of determining whether or not the elapsed descending time flag Ftd is 1 is executed (Step S408). When the elapsed descending time flag Ftd is 1, that is, when the placing sections 42, 42 are lowered to a position where the log PW if rotated does not interfere with the placing sections 42, 42, the motor M1 is driven, and the centering spindles 24a, 24b are rotated one time while the log PW is held therebetween, so that the outer peripheral shape of the log PW is measured (Step S410). Here, in the present embodiment, the measurement of the outer peripheral shape of the log PW is performed by using the distance from the plurality of laser measuring instruments 17a to the outer peripheral surface of the log PW and a pulse output from a rotary encoder (not shown) of the motor M1, and measuring the distance to the outer peripheral surface of the log PW at a certain angle around the rotation axis center line of the centering spindles 24a, 24b.

Thus, based on the measured outer shape of the log PW, the cutting axis center line of the log PW is calculated (Step S412), and the spindles 24a, 24b are rotated to align the log PW in the rotational direction at a rotation angle α corresponding to the calculated cutting axis center line of the log PW (Step S414). Here, the cutting axis center line of the log PW is defined as the rotation axis center line of the log PW from which a veneer sheet can be obtained with a highest yield from the log PW. In the state where the centering spindles 24a, 24b are at the second delivery position DP2, when the two intersections P1 and P2 between the cutting axis center line of the raw wood PW and the both mouth surfaces (both longitudinal end faces in the longitudinal direction) of the raw wood PW are viewed from one side in the direction along the rotational axis of the centering spindles 24a, 24b, the rotation angle α corresponding to the cutting axis center line of the log PW is defined, as shown in FIG. 20, as a rotation angle of the log PW by which the virtual line VL1 between the two intersections P1, P2 moves to pass the rotation axis center line 52a' of the rotation axis 52a of the rotary frame 52 of the pendular transport apparatus 50, that is, the virtual line VL1 moves to be aligned with one of the countless radiation lines around the rotation axis center line 52a'.

At the same time as aligning the log PW at the rotation angle α corresponding to the center line of the cutting axis, the fluid cylinders CL2a, CL2b are driven to move the shaft bearing housings 22a, 22b toward the second delivery position DP2 (Step S416, see FIG. 21), and the second receiving position setting flag Frp2 is reset to 0 (Step S418). Here, the second receiving position setting flag Frp2 is set to 1 when the shaft bearing housings 22a, 22b are at the second receiving position RP2, and is reset to 0 when the shaft bearing housings 22a, 22b leave the second receiving position RP2.

Subsequently, a process of determining whether or not the shaft bearing housings 22a, 22b have reached the second delivery position DP2 is executed (Step S420), and when the shaft bearing housings 22a, 22b have reached the second delivery position DP2, movement of the shaft bearing housings 22a, 22b is stopped (Step S422), and the second delivery position setting flag Fdp2 is set to 1 (Step S424). At this time, the shaft bearing housings 22a, 22b are located at a position away from the assumed maximum diameter among the diameters of the log PW to be fed to the log processing apparatus 1 with respect to the second receiving position RP2. In the present embodiment, when the sensor S4 is turned off after being turned on, it is determined that the shaft bearing housings 22a, 22b have reached the second delivery position DP2. In contrast, when it is determined in Step S420 that the shaft bearing housings 22a, 22b have not yet reached the second delivery position DP2, the processes in Steps S416 to S420 are repeatedly executed until the shaft bearing housings 22a, 22b reach the second delivery position DP2.

Next, a process of determining whether or not the clamping arm holding flag Fsa is 1 is executed (Step S426). Here, the clamping arm holding flag Fsa is set in the routine of the process of driving the a pendular transport apparatus which will be described later: it is set to 1 when the clamping arms 56, 56 hold the log PW therebetween at the cut ends of the (both end surfaces in the longitudinal direction) of the log PW; and it is set to 0 when the holding is released.

When the clamping arm holding flag Fsa is 1, that is, when the clamping arms 56, 56 are holding the log PW therebetween at the cut ends of the (both end surfaces in the longitudinal direction) of the log PW (see FIG. 22), holding of the log PW between the centering spindles 24a, 24b at the cut ends of the (both end surfaces in the longitudinal direction) is released (Step S428). In contrast, when the clamping arm holding flag Fsa is not 1, that is, when the clamping arms 56, 56 are not holding the log PW therebetween at the cut ends of the (both end surfaces in the longitudinal direction) of the log PW, the process of Step S426 is repeatedly executed until the clamping arms 56, 56 hold the log PW therebetween at the cut ends of the (both end surfaces in the longitudinal direction) of the log PW. When the clamping arm holding flag Fsa turns 1, that is, the clamping arms 56, 56 hold the log PW therebetween at the cut ends of the (both end surfaces in the longitudinal direction) of the log PW, holding of the log PW between the centering spindles 24a, 24b at the cut ends of the (both end surfaces in the longitudinal direction) is released (Step S428). Then, the centering spindle holding flag Fcs is reset to 0 (Step S430), and the shaft bearing housings 22a, 22b are moved and returned to the second receiving position RP2 (Step S432, see FIG. 23), and the second delivery position setting flag Fdp2 is rest to 0 (Step S434). That is, when the log PW is delivered from the centering spindles 24a, 24b to the clamping arms 56, 56 (Step S428), simultaneously the shaft bearing housings 22a, 22b are moved toward the second receiving position RP2 (Step S432).

Then, a process of determining whether or not the shaft bearing housings 22a, 22b have reached the second receiving position RP2 is executed (Step S436), and when the shaft bearing housings 22a, 22b have reached the second receiving position RP2 (FIG. 24), the second receiving position setting flag Frp2 is set to 1 (Step S438), and the present routine ends. In contrast, when it is determined in Step S436 that the shaft bearing housings 22a, 22b have not reached the second receiving position RP2, the processes in Steps S432 to S436 are repeated until the shaft bearing housings 22a, 22b reach the second receiving position RP2.

According to the present embodiment, the log PW is delivered from the centering spindles 24a, 24b to the clamping arms 56, 56 (Step S428), and simultaneously, the shaft bearing housings 22a, 22b are moved toward the second receiving position RP2 (Step S432). In addition, when the shaft bearing housings 22a, 22b returned to the second receiving position RP2, if the placing sections 42, 42 have reached the first delivery position DP1 (Step S402), that is if a new log PW is set to the second receiving position RP2, the new log PW is held between both centering spindles 24a, 24b (at both end faces in the longitudinal direction) (Step S404), and the new log PW is rotated to measure the outer peripheral shape (Step S410), and the cutting axis center line of the new log PW is calculated (Step S412), so that the new log PW is aligned at a rotation angle α corresponding to the cutting axis center line of the new log PW (Step S414). Also the shaft bearing housings 22a, 22b are moved to the second delivery position DP2 (Steps S416 to S424) for preparing delivery of the new log PW to the clamping arms 56, 56. That is, the new log PW can be prepared for delivery to be held between the clamping arms 56, 56 without waiting for the process of delivering a log PW from the clamping arms 56, 56 to the cutting spindles 72a, 72b (Step S518) which is executed by a processing routine of driving the pendular transport apparatus to be described later. As a result, it is possible to further reduce the time required for transporting the log PW to the cutting spindles 72a, 72b.

When it is determined in Step S400 that the second delivery position setting flag Fdp2 is not 1, that is, when the shaft bearing housings 22a, 22b have not reached the second receiving position RP2 or when it is determined that the first delivery position setting flag Fdp1 is not 1 in Step S402, that is, when the placing sections 42, 42 have not reached the first delivery position DP1, if the elapsed descending time flag Ftd is determined not to be 1 in Step S408, that is, when the predetermined period of time Td* has not elapsed since the placing sections 42, 42 were driven toward the first receiving position RP1, the present routine ends without doing anything.

[Process of Driving the Pendular Transport Apparatus]

In the process of driving the pendular transport apparatus, the CPU of the electronic control unit 8 executes a process of determining whether or not the second delivery position setting flag Fdp2 is 1 (Step S500). When the second delivery position setting flag Fdp2 is 1, that is, when the shaft bearing housings 22a, 22b of the log rotation apparatus 20 have reached the second delivery position DP2, The postures of the arms 56, 56 are set according to the cutting axis center line of the log PW (Step S502). The "postures of the arms 56, 56 are set according to the cutting axis center line of the log PW" is defined as a state where, as shown in FIG. 20, the sliding axis center lines 56c, 56c of clamping arms 56, 56 (the center line in the swinging direction of the clamping arms 56, 56 passing through the rotation shaft 52a) are aligned with the virtual line VL1 connecting two intersections P1 and P2 of the log PW positioned at the rotation angle α (a virtual line VL1 passing through the rotation axis center line 52a' when the centering spindles 24a, 24b are at the second delivery position DP2), and where the relative positional relationship between one clamping arm 56 and the intersection P1 is the same as the relative positional relationship between the other clamping arm 56 and the intersection P2.

Thus, when the postures of the clamping arms 56, 56 corresponding to the cutting axis center line of the log PW are set, the motor M3 is driven to rotate the rotary frame 52 so as to be in the set posture (rotation angle β, see FIGS. 20 and 22), and the motors M4 and M4 are driven to slide the clamping arms 56, 56 (Step S504). Then, the fluid cylinders CL3a, CL3b (see FIGS. 2 and 3) are driven so that the clamping arms 56, 56 approach to each other, and the cut surfaces (both end surfaces in the longitudinal direction) of the log PW are held by the clamping arms 56, 56 respectively (Step S506), and the clamping arm holding flag Fsa is set to 1 (Step S508).

Subsequently, a process of determining whether or not the centering spindle holding flag Fcs is 0 (Step S510), and when the centering spindle holding flag Fcs is 0, that is, when the holding of the log PW at the cut ends (both end surfaces in the longitudinal direction) of the log PW by the centering spindles 24a, 24b is released, a process of determining whether or not the preparation of the veneer lathe 6 is completed (Step S512). When the preparation of veneer lathe 6 has been completed, a process of delivering the log PW to the cutting spindles 72a, 72b is executed (see Step S518, FIGS. 23 and 24). In contrast, when it is determined in Step S512 that the preparation of veneer lathe 6 is not completed, the process of Step S512 is repeatedly executed until the preparation of veneer lathe 6 is completed, and when the preparation of veneer lathe 6 is completed, the processing to deliver the log PW to cutting spindles 72a, 72b is executed (see Step S518, FIGS. 23 and 24).

Then, a process of determining whether or not the delivery of the log PW to the cutting spindles 72a, 72b is completed (Step S520). When the delivery of the log PW to the cutting spindles 72a, 72b is completed, the holding of the log PW at the cut ends (both end surfaces in the longitudinal direction) of the log PW by the clamping arms 56, 56 is released (Step S522), the clamping arm holding flag Fsa is reset to 0 (Step S524), and the present routine ends. In contrast, in Step S520, when it is determined that the delivery of the log PW to the cutting spindles 72a, 72b has not yet completed, the process of Step S520 is repeatedly executed until the delivery of the log PW to the cutting spindles 72a, 72b is completed. When delivery of the log PW to the cutting spindles 72a, 72b is completed, the clamping arms 56, 56 release the log PW at the cut ends (both end surfaces in the longitudinal direction) of the log PW (Step S522), and the clamping arm holding flag Fsa is reset to 0 (Step S524), and this routine ends.

In contrast, when it is determined in Step S500 that the second delivery position set flag Fdp2 is not a value 1, that is, when the shaft bearing housings 22a, 22b of the log rotation apparatus 20 have not reached the second delivery position DP2, or when in Step S510 it is determined that the centering spindle holding flag Fcs is not 0, that is, when the holding of the log PW at the cut ends (both end surfaces in the longitudinal direction) of the log PW by the centering spindles 24a, 24b has not yet released, the present routine ends without doing anything.

In the present embodiment, the second delivery position DP2 and the sensor S4 are configured to be arranged at the same position, but the present disclosure is not limited to thereto. For example, the second delivery position DP2 may be arranged downstream of the position where the sensor 4 is located in the direction of log transport. In the case of this configuration, before the shaft bearing housings 22a, 22b reach the second delivery position DP2, a new log PW can be prepared at the first delivery position DP1 (the second receiving position RP2) by the transport apparatus for temporary centering 40.

In the present embodiment, whether or not the placing sections 42, 42 have descended to a position where the rotated log PW does not interfere with the placing sections 42, 42 is determined by performed by means of measuring the elapsed time from when the placing sections 42, 42 are driven toward the first receiving position RP1, but the present disclosure is not limited to thereto. For example, it may be configured to determine whether or not the log PW has reached the that does not interfere with the placing sections 42, 42 by measuring the movement distance of the placing sections 42, 42 from when the placing sections 42, 42 are driven toward the first receiving position RP1 and determining whether or not the measured movement distance is long enough for the log PW not to interfere with the placing sections 42, 42 even if rotated.

In the present embodiment, the sensor S4 is configured to determine whether or not the shaft bearing housings 22a, 22b have reached the second delivery position DP2, but the present disclosure is not limited thereto. For example, it may be configured to determine whether or not the movement distance is equal to or larger than the assumed maximum diameter of the diameters of logs PW to be fed to the log processing apparatus 1 by measuring the movement distance of the shaft bearing housings 22a, 22b. The movement distances of the shaft bearing housings 22a, 22b can be measured, for example, by detecting the strokes of the fluid cylinders CL2a, CL2b.

In the present embodiment, the sensor S4 detects whether the log PW transported by the placing sections 42, 42 is not brought into contact with the log PW transported by the shaft bearing housings 22a, 22b of the log rotation apparatus 20 when the placing sections 42, 42 of the transport apparatus for temporary centering 40 having the log PW are raised, but the present disclosure is not limited thereto. For example, a configuration may be adopted in which a temporary diameter of the log PW transported by the second loading conveyor 4b is stored in a predetermined area of the ROM of the electronic control unit 8 and the calculated temporary diameter of the log PW is used to detect whether the log PW transported by the placing sections 42, 42 is not in a state to contact the log PW transported by the shaft bearing housings 22a, 22b even if the placing sections 42, 42 are raised. In this case, the process of driving the second loading conveyor in FIG. 25 and the process of driving the transport apparatus for temporary centering in FIG. 26 can be performed instead of the process of driving the second loading conveyor in FIG. 6 and the process of driving the transport apparatus for temporary center in FIG. 7. In the case of this configuration, the sensor S4 is used only to detect whether or not the shaft bearing housings 22a, 22b have reached the second delivery position DP2.

The process of driving the second loading conveyor in FIG. 25 is the same as the process in FIG. 6 except that the process of Step S216 is changed to the process of Step S1216. The process of driving the transport apparatus for temporary centering in FIG. 26 is the same as the process in FIG. 7 except that the process of Step S306 is changed to the processes of Steps S1306 and S1307. Therefore, hereinafter, only the portions of the driving process of FIG. 25 and the driving process of FIG. 26 that are different from the process of driving the second loading conveyor of FIG. 6 and the process of driving the transport apparatus for temporary centering of FIG. 7 will be described.

When the process of driving the second loading conveyor in FIG. 25 is executed, the CPU of the electronic control unit 8 executes the processes similar to those from Steps S200 to S214 of the processing routine for driving the second loading conveyor in FIG. 6. Here, the electronic control unit 8 that executes the processes from Steps S208 to S214 to calculates the temporary diameter of the log PW using the integrated value of the pulses from when the sensor S3 is turned on to when it is turned off is an example of the implementation configuration corresponding to a "measuring unit."

Then, a temporary diameter of the log PW is calculated using the integrated value of the pulses from when the sensor S3 is turned on to when it is turned off, and the calculated temporary diameter of the log PW is stored in a predetermined area of the ROM, so that a process of calculating the distance L1 from the center point of the temporary diameter of the log PW to the virtual vertical line VVL is executed (Step S1216). Subsequently, the processes similar to those from Steps S218 to S222 of the processing routine for driving the second loading conveyor in FIG. 6 is executed, and the present routine ends. Here, The electronic control unit 8 that calculates the temporary diameter of the log PW using the integrated value of the pulses from when the sensor S3 is turned on to when it is turned off and that stores the calculated log PW temporary diameter in a predetermined area of the ROM is an example of an implementation configuration corresponding to the "storage unit" in the present disclosure.

When the process of driving the transport apparatus for temporary centering in FIG. 26 is executed, the CPU of the electronic control unit 8 executes processes similar to those in Steps S300 to S304 in the processing routine for driving the transport apparatus for temporary centering in FIG. 7. Then, when it is determined in Step S304 that the centering spindle holding flag Fcs is 1, a process of calculating a placing section raising acceptable distance d* is executed (Step S1305). Here, the placing section raising acceptable distance d* is defined as a movement distance from the second receiving position RP2 of the shaft receiving houses 22a, 22b, and with the distance, even if the placing sections 42, 42 are raised, the log PW transported by the placing sections 42, 42 is not brought in contact with the log PW transported by the shaft receiving houses 22a, 22b. The placing section raising acceptable distance d* can be obtained, from: the temporary diameter $d_{i-1}$ of the log PW transported to the second receiving position RP2 out of the temporary diameters of the log PW stored in the storage area of the ROM of the electronic control unit 8; a temporary diameter $d_i$ of the log PW transported from the second loading conveyor 4b to the placing sections 42, 42; and a safety value Sv, by $d^*=(d_{i-1}+d_i)/2+Sv$. The safety value Sv is a value that is set as the maximum value that can be assumed among the differences between the maximum diameter and the minimum diameter that can occur in one log PW. Here, the electronic control unit 8 that executes Step S1305 for calculating the placing section raising acceptable distance d* is an example of an implementation configuration corresponding to the "calculation unit" in the present disclosure. Here, the placing section raising acceptable distance d* corresponds to the "safe distance" in the present disclosure, the temporary diameter $d_{i-1}$ of a log corresponds to the "first temporary diameter" in the present disclosure, and the temporary diameter $d_i$ of a log corresponds to the "second temporary diameter" in this invention, these all being examples of the implementation configuration.

Subsequently, a process of determining whether or not the movement distance BL of the shaft bearing housings 22a, 22b from the second receiving position RP2 is larger than the placing section raising acceptable distance d* is executed (Step S1306). Here, the movement distance BL can be measured, for example, by reading a value of a stroke sensor (not shown) disposed in the fluid cylinders CL2a, CL2b. When the movement distance BL is larger than the placing section raising acceptable distance d*, processes similar to Steps S308 to S314 of the processing routine for driving the transport apparatus for temporary centering in FIG. 7 and Steps S316 to S332 branched from the processing routine for driving the transport apparatus for temporary centering in FIG. 8 are executed, and this routine ends. In this configuration also, it is possible to achieve the same effect as that of the log processing apparatus 1 according to the present embodiment: for example, the time for transporting the log PW to the cutting spindles 72a, 72b can be reduced. Here, the electronic control unit 8 that executes Step S1306 for determining whether or not the movement distance BL of the shaft bearing housings 22a, 22b from the second receiving position RP2 is larger than the placing section raising acceptable distance d* and the Step S308 for raising the placing sections 42 is an example of an implementation configuration corresponding to the "control unit" in the present disclosure.

In the modification illustrated in FIG. 26 described above, when the movement distance BL from the second receiving position RP2 of the shaft bearing housings 22a, 22b becomes larger than the placing section raising acceptable distance d*, the placing sections 42, 42 are moved toward the second receiving position RP2 to supply a log PW at the second receiving position RP2, but the present disclosure is not limited thereto. For example, configuration may be adopted in which, before the movement distance BL of the shaft bearing housings 22a, 22b becomes larger than the placing section raising acceptable distance d*, the placing sections 42, 42 are moved toward the second receiving position RP2 within the range that does not cause contact with the log PW held between the first and second centering spindles 24a, 24b. In this configuration, the process of driving the transport apparatus for temporary centering in FIG. 27 may be performed instead of that in FIG. 26.

The process of driving the transport apparatus for temporary centering in FIG. 27 is the same with the process of driving the transport apparatus for temporary centering in FIG. 26 except that Steps S1305 to S312 are replaced with Steps S2305 to S2308. Therefore, hereinafter, only the portions of process of driving the transport apparatus for temporary centering in FIG. 27 that are different from the process of driving the transport apparatus for temporary centering in FIG. 26 will be described.

When the process of driving the transport apparatus for temporary centering in FIG. 27 is performed, the CPU of the electronic control unit 8 executes the processes similar to Steps S300 to S304 in the processing routine for driving the transport apparatus for temporary centering in FIG. 26. When it is determined in Step S304 that the centering spindle holding flag Fcs is 1, the process of calculating a safety distance ds is executed (Step S2305), the process of calculating the placing section raising acceptable distance dc* is executed (Step S2306). Here, the safety distance ds is defined as a distance in which the log PW transported by the placing sections 42, 42 is not brought into contact with the log PW transported by the shaft bearing housings 22a, 22b, and is calculated using the accumulated value of pulses from when the sensor S3 is turned on and to when the sensor S3 is turned off. The safety distance ds can be obtained, from: the temporary diameter $d_{i-1}$ of the log PW transported to the second receiving position RP2 out of the temporary diameters of the log PW stored in the storage area of the ROM of the electronic control unit 8; a temporary diameter $d_i$ of the log PW transported from the second loading conveyor 4b to the placing sections 42, 42; and a safety value Sv, by ds=(d$_{t-1}$+d$_t$)/2+Sv. Here, the safety value Sv is a value that is set as the maximum value that can be assumed among the differences between the maximum diameter and the minimum diameter that can occur in one log PW.

In addition, the placing section raising acceptable distance dc* is set as a distance by which the ascendable are the placing sections 42, 42 ascendable while keeping the above described safety distance ds. The placing section raising acceptable distance dc* is calculated as a movement distance of the placing sections 42, 42 from the first receiving position RP1, and if the placing sections 42, 42 holding the log PW is raised by the placing section raising acceptable distance dc*, the log PW on the placing sections 42, 42 is not brought into contact with the log PW transported by the shaft bearing housings 22a, 22b. In the present embodiment, the placing section raising acceptable distance dc* is calculated, as shown in FIG. 28, using a height Hbs from the reference line Bp on the placing sections 42, 42 at the first receiving position RP1 to the rotation axis center line of the first and second centering spindles 24a, 24b at the second receiving position RP2, an opening angle 2θ of the placement surfaces 42a, 42a of the placing sections 42, 42, a movement distance BL of the shaft bearing housings 22a, 22b from the second receiving position RP2, and a safety distance ds, by the equations (4) and (5), the height Hbs and the opening angle 2θ being measured in advance and stored in the ROM of the electronic control unit 8.

The height Hbc is a height between the reference line Bp and the temporary rotation axis center line of the log PW placed on the placing sections 42, 42. The height Hc is a height between the temporary rotation axis center line of the log PW placed on the placing sections 42, 42 and the rotation axis center line of the centering spindles 24a, 24b at the second receiving position RP2 when the distance between the axial center line of the first and second centering spindles 24a, 24b holding the log and the temporary rotational axis center line of the log PW transported by the placing sections 42, 42 becomes equal to the safe distance ds.

Here, the height Hbc corresponds to the "first distance" in the present disclosure, the movement distance BL corresponds to the "second distance" in the present disclosure, and the height Hc corresponds to the "third distance" in the present disclosure. The height Hbs corresponds to the "fourth distance" in the present disclosure, the opening angle 2θ corresponds to the "geometric shape of the placing section" in the present disclosure, and the placing section raising acceptable distance dc* is an example of the implementation configuration corresponding to the "5th distance" in the present disclosure. The embodiment for obtaining the placing section raising acceptable distance dc* using the equations (4) and (5) is an example of the implementation configuration corresponding to "the controller calculates a first distance from the reference portion to a temporary rotation axis center line of the new log placed on the placing section, using the second temporary diameter and a geometric shape of the placing section when the first and second centering spindles are holding the log, the controller further uses the safe distance and the second distance by which the centering unit has moved from the second receiving position to the second delivery position, so as to calculate a third distance from a temporary rotation axis center line of the new log to the rotation axis center line of the first and second centering spindles with the centering unit being located at the second receiving position, when an axial distance between the rotation axis center line of the first and second centering spindles while the centering unit is moving from the second receiving position toward the second delivery position and the temporary rotation axis center line of the new log is the safe distance, and the controller further calculates a fifth distance by subtracting the first and third distances from a fourth distance, so as to cause the log feeding unit to move by the fifth distance, the fourth distance being a distance from the reference portion when the log feeding unit is at the first receiving position to the rotation axis center line of the first and second centering spindles when the centering unit is at the second receiving position."

[Mathematical 2]

$$dc^* = Hbs - Hc - Hbc \qquad (4)$$

$$Hc = \sqrt{(ds^2 - BL^2)} \qquad (5)$$

Thus, when the placing section raising acceptable distance dc* is obtained, the placing sections 42, 42 are raised by the placing section raising acceptable distance dc*, and the first receiving position setting flag Frp1 and the loading completion flag Fvv1 are reset to 1 (Step S2308). Then, processes similar to those in Step S314 of the process routing for driving the transport apparatus for temporary centering in FIG. 7 and Steps S316 to S328 of the portion branched from processing routine for driving the transport apparatus for temporary centering in FIG. 8, and the present routine ends. According to this configuration, the placing sections 42, 42 are moved toward the first delivery position DP1 to feed a new log PW to the second receiving position RP2, before the log PW held between the centering spindles 24a, 24b reaches a position away from the second delivery position DP2, that is, the second receiving position RP2 by a distance larger than the assumed maximum diameter of the diameters of logs PW to be fed to the log processing apparatus 1, or a position away from the second receiving position RP2 by the placing section raising acceptable distance d*. As a result, the time for transporting the log PW to the cutting spindles 72a, 72b can be further reduced. Here, the electronic control unit 8 that executes Steps S2305 to S2308 is an example of an implementation configuration corresponding to the "control unit" in the present disclosure.

In the present embodiment, when the second loading conveyor transport flag Fs is 1, that is, when the log PW has already been loaded onto the second loading conveyor 4b (Step S200), and the first receiving position setting flag Frp1 is 1, that is, when the placing sections 42, 42 of the transport apparatus for temporary centering 40 are at the first receiving position RP1 (Step S202), and the loading completion flag Fvv1 is 0, that is, when the second loading conveyor 4b has not completed loading of the log PW to be transported by the placing sections 42, 42 of the transport apparatus for temporary centering 40 (Step S204), the second loading conveyor 4b is driven (Step S206) so that the log PW is fed to the placing sections 42, 42, but the present disclosure is not limited thereto. For example, a configuration may be adopted in which, in addition to the above conditions (steps S200 to S204), a log PW is supplied to the placing sections 42, 42 when the second delivery position set flag Fdp2 is 1, that is, when the centering spindles 24a, 24b (shaft bearing housings 22a, 22b) holding the log PW therebetween at the cut ends (both end surfaces in the longitudinal direction of the log PW are at a position away from the second receiving position RP2 by the assumed maximum diameter of the diameters of the logs PW to be fed to the log processing apparatus 1. In this case, the process of driving the second loading conveyor driving process of FIGS. 29 and 30 can be performed instead of the process of driving the second loading conveyor driving process of FIG. 6. In the process of driving the second loading conveyor driving process of FIGS. 29 and 30, the same processes as those of FIG. 6 are executed except for the addition of Step S205 for determining whether or not the second delivery position set flag Fdp2 is 1, Step S205 being performed between Step S204 and Step S206 of the process of driving the second loading conveyor driving process of FIG. 6.

According to this configuration, inconvenience can be satisfactorily prevented, for example, when the first receiving position RP1 and the first delivery position (second receiving position) are arranged close to each other, if a new log PW is fed to the first receiving position RP1 while the first and second centering spindles 24a, 24b are holding another log PW, the new log PW fed to the first receiving position RP1 is brought in contact with the log PW held between 24a, 24b.

In the present embodiment, the sensors S1, S1 are arranged so that the optical axis of the light emitted from the sensors S1, S1 is at a position that intersects the virtual vertical lines VVL, VVL passing through the reference lines Bp, Bp set on the respective placing sections 42, 42, but the present invention is not limited to thereto. For example, a configuration may be adopted in which only one sensor S1 is disposed at substantially the center portion of the coupling beam 13 in the longitudinal direction.

In the present embodiment, the placing sections 42, 42 are driven so that the temporary rotation axis center line of the log PW is obtained using the log PW detection by sensors S1, S1, and the temporary rotation axis center line of the log PW is aligned with the rotation axis center line of centering spindles 24a, 24b, but the present invention is not limited to thereto. For example, a configuration may be adopted in which the temporary rotation axis center line of the log PW is aligned with the rotation axis center lines of the centering spindles 24a, 24b without using the sensors S1, S1 by the transport apparatus for temporary centering 140 of the modification illustrated in FIGS. 31 and 32.

The transport apparatus for temporary centering 140 of the modification has the same configuration as that of the transport apparatus for temporary centering 40 according to the present invention, except that it includes upper placing sections 132, 132 as shown in FIGS. 31 and 32. The upper placing sections 132, 132 are disposed to face the placing sections 42, 42 in the vertical direction. The upper placing sections 132, 132 basically have the same shape as those of the placing sections 42, 42. That is, the upper placing sections 132, 132 have generally V-shaped placement surfaces 42a, 42a and the reference lines Bp2 on the placement surfaces 42a, 42a respectively. The transport apparatus for temporary centering 140 is an example of implementation configuration corresponding to the "log feeding unit" of the present invention.

The upper placing sections 132, 132 are each threadedly engaged with a male thread rod (not shown) arranged to extend in the vertical direction, and the male thread rod is connected to one end of the male thread rod (not shown) by a motor (not shown). By rotating forward and backward the male thread rod (not shown), the upper placing sections 132, 132 are moved closer to and away from the placing sections 42, 42.

The electronic control unit 8 controls motors M4, M4 (not shown) so that a distance B1 from the reference line Bp2 of the upper placing sections 132, 132 to the center axis of the centering spindles 24a, 24b that are assumed to be at the second receiving position RP2 is always the same with the distance B2 from the reference line Bp of the placing sections 42, 42 to the rotation axis center line of the spindles 24a, 24b that are assumed to be at the second receiving position RP2.

The transport apparatus for temporary centering 140 in the modification drives the placing sections 42, 42 and the upper placing sections 132, 132 to approach to each other when the log PW transported by the transport apparatus for temporary centering 140 is not brought into contact with the log PW transported by the shaft bearing housings 22a, 22b of the log rotation apparatus 20 even if the log PW is set at the first receiving position RP1 and also the log PW is moved to the first delivery position DP1 by the transport apparatus for temporary centering 140, so that, as shown in FIG. 32, the log PW is held between the placing sections 42, 42 and the upper placing sections 132, 132. Here, determination whether or not the log PW is held between the placing sections 42, 42 and the upper placing sections 132, 132 can be done with load fluctuation of the motors M4, M4 and motors not shown.

In this way, when the log PW is held between the placing sections 42, 42 and the upper placing sections 132, 132, the temporary rotation axis center line of the log PW (the center of the log PW in the vertical direction) is aligned with the rotation axis center line of the centering spindles 24a, 24b.

In the present embodiment, the log PW is detected by the sensors S1, S1 arranged between the first receiving position RP1 and the first delivery position DP1 toward downstream in the horizontal direction in the transport direction of the log PW, and the temporary rotation axis center line of the log PW is obtained using the detection of the log PW by the sensors S1, S1, so that the temporary rotation axis center line of the log PW is aligned with the rotation axis center line of the centering spindles 24a, 24b, but the present invention is not limited thereto. For example, a configuration may be adopted in which the temporary rotation axis center line of the log PW is obtained using the log PW detection by measurement sensors 230 instead of the sensors S1, S1, so that the temporary rotation axis center line is aligned with the centering spindles 24a, 24b as shown in FIG. 33.

In the present modification, as shown in FIG. 33, fixed V-shaped tables 262 are disposed on the downstream end portion of the second loading conveyor 4b, and the disposed positions are defined as the first receiving position RP1. The fixed V-shaped tables 262 include V-shaped placement surfaces 262a, 262a that open upward in the vertical direction. In the present modification, the intersection line between the two planes that constituted the V shape of the placement surfaces 262a, 262a is used as a reference line Bpf for obtaining the temporary rotation axis center line of the log PW, and the virtual vertical line VVL is defined as a straight line that passes the rotation axis center line of the centering spindles 24a, 24b, the reference line Bpf, and the reference line Bp of the placing section 42.

As shown in FIG. 33, the measurement sensor 230 is arranged on the upper frames 18 so that the laser emitted from the measurement sensor 230 passes through the virtual vertical line VVL.

In the present modification, as shown in FIG. 33, a height Hfs in the vertical direction from the reference line Bpf set on the fixed V-shaped tables 262 and 262 to the axial center line of the centering spindles 24a, 24b, a height Hbs in the vertical direction from the reference line Bpf to the measurement sensor 230, an opening angle 2θ of the placement surface 262a, 262a of the V-shaped tables 262 and 262, and a distance Hbb between the reference line Bp on the placing sections 42, 42 at the initial position and the reference line Bpf are measured in advance and stored in the ROM of the electronic control unit 8. When the measurement sensor 230 detects the log PW, using the equations (6) to (8), a distance L2 by which the placing sections 42, 42 need to be raised is obtained so that the temporary rotation axis center line of the log PW is aligned with the centering spindles 24a, 24b.

[Mathematics 3]

$$L2 = Hfs + Hbb - Hfc \quad (6)$$

$$r = (Hbs - Hp) \cdot \cos\theta/(1 + \cos\theta) \quad (7)$$

$$Hfc = r/\cos\theta \quad (8)$$

In the equations, r is a virtual radius of the log PW (or a virtual circle corresponding to the log PW) that in contact with the two placement surfaces 262a and 262a and passes through a point at the top of the log PW detected by the measurement sensor 230 (intersection of the optical axis emitted from the measurement sensor 230 and the log PW); Hfc is the height from the reference line Bpf to the temporary rotation axis center line of the log PW: and Hp is the distance to the log PW measured by the measurement sensor 230 (distance in the direction along the virtual vertical line VVL).

In the present modified example also, it is possible that, before passing the log PW to centering spindles 24a, 24b, the temporary rotation axis center line of the log PW is obtained and the temporary rotation axis center line is aligned with the centering spindles 24a, 24b. Thus, when the log PW is held between the centering spindles 24a, 24b at the cut ends (both end surfaces in the longitudinal direction) of the log PW, the deviation (deviation in axial centerline) between the cutting axis center line of the log PW and the rotation axis center line of the centering spindles 24a, 24b can be reduced, and the fluctuation of the log PW can be reduced during rotation of the log PW by the centering spindles 24a, 24b.

In the present embodiment, the pendular transport apparatus 50 is used to transport the log PW from the centering spindles 24a, 24b to the cutting spindles 72a, 72b, but the present invention is not limited to thereto. For example, as shown in the lathe charger 302 of the modification in FIG. 34, a running transport apparatus 350 may be used instead of the pendular transport apparatus 50. Alternatively, as shown in the lathe charger 402 of the modification in FIG. 35, a fixed transport apparatus 450 may be used instead of the pendular transport apparatus 50. The lathe charger 302, 402 are examples of implementation configuration corresponding to the "log feeding apparatus" in the present invention.

As shown in FIG. 34, the running transport apparatus 350 of the modification has the same configuration as that of the pendular transport apparatus 50 of the above embodiment, except the moving beam 352 is supported, instead of the rotary frame 52, by the rails R5, R5 by means of the guided sliding members 352a, 352a, and that male thread rods 355, 355 threadedly engaged with the moving beam 352 and motors M5, M5 for driving the male thread rods 355, 355 to rotate are included. Hence, among the components of the running transport apparatus 350, the same components as those of the pendular transport apparatus 50 are denoted by the same reference numerals, and detailed description thereof is omitted to avoid duplication. The running transport apparatus 350 is an example of an implementation configuration corresponding to the "transport unit" in the present invention.

The running transport apparatus 350 includes elongated moving beam 352 supported at both ends in the longitudinal direction by rails R5, R5 installed on the upper surfaces of the upper frames 18, 18 via sliding members 352a, 352a with guides, male threaded rods 355, 355 threadedly engaged with the moving beam 352, holders 54, 54 attached to the moving beam 352 slidably in the longitudinal direction of the moving beam 352, and clamping arms 56, 56 movably supported to the holders 54, 54.

The attachment of the holders 54, 54 to the moving beam 352 is performed in a similar manner to that of the pendular transport apparatus 50 of the present embodiment described above. That is, the holders 54, 54 are attached to rails (not shown) located along the longitudinal direction of the moving beam 352 using the guided sliding portions 54a, 54a (see FIG. 3), the rails being disposed on the lower surfaces of both ends excluding the central portion in the longitudinal direction of the moving beam 352. The holders 54, 54 are also connected to cylinder rods (not shown) of the fluid cylinders CL3a, CL3b (see FIG. 3) that are supported by a support wall (not shown) protruding downward toward the generally central lower surface of the moving beam 352 in the longitudinal direction. The holders 54, 54 are further supported slidably in the longitudinal direction of the moving beam 352 in response to appearance of a cylinder rod (not shown).

As shown in FIG. 34, the male thread rods 355, 355 are rotatably supported by the mount bases 357, 357, 357, 357 through bearings (not shown). The mount bases 357, 357, 357, 357 are fixed onto the upper surface of the upper frames 18, 18 at the both ends in the horizontal direction in the transport direction of the log PW. One end of the male thread rods 355, 355 in the axial center line direction is connected to a rotation shaft (not shown) of the motors M5, M5.

The running transport apparatus 350 thus configured can reciprocate the moving beam 352 in the axial center line direction of the male thread rods 355, 355 by rotating the male thread rods 355, 355 forward and backward by the motors M5, M5. The motors M5, M5 have a rotary encoder (not shown) and can move the moving beam 352 to a desired position.

In the present modification, in the processing routine in Step S414 for driving the log rotation apparatus in FIG. 9, the log PW is rotated until the virtual line VL1 (FIG. 20) connecting the two intersections P1 and P2 faces the vertical direction, when the two intersections P1 and P2 (FIG. 20) between the cutting axis center line of the log PW and the cut ends (both end surfaces in the longitudinal end faces in the longitudinal direction) of the log PW are viewed in the direction along the rotation axis center lines of the centering spindles 24a, 24b.

In the processing routine in Step S504 for driving the pendular transport apparatus in FIG. 11, the motors M5, M5 are driven to move the moving beam 352 in the axial center line direction of the male thread rods 355 and 355 so that the clamping arms 56, 56 are in the posture as set, and also the motors M4, M4 (see FIG. 3) are driven to slide the clamping arms 56, 56.

As shown in FIG. 35, the modified fixed transport apparatus 450 has the same configuration as the pendular transport apparatus 50 of the present embodiment described above except that the rotary frame 52 is changed to a fixed beam 452. Accordingly, the same components as those of the pendular transport apparatus 50 among the components of the fixed transport apparatus 450 are denoted by the same reference numerals, and the detailed description thereof is omitted to avoid duplication. The fixed transport apparatus 450 is an example of an implementation configuration corresponding to the "transport section" in the present invention.

The fixed transport apparatus 450 includes an elongated fixed beam 452 whose longitudinal ends in the longitudinal direction are fixed to the upper frames 18, 18, holders 54, 54 attached to the fixed beam 452 so as to be slidable in the longitudinal direction of the fixed beam 452, and clamping arms 56, 56 slidably supported by the holders 54, 54.

As shown in FIG. 35, the fixed beam 452 includes a lower surface having an upward slope in the direction along the horizontal direction in the conveyance direction of the log PW. As a result, the holders 54, 54 and the clamping arms 56, 56 are supported by the fixed beam 452 in an inclined state with respect to the vertical direction. The clamping arms 56, 56 have sliding axis center lines 56c, 56c (straight lines parallel to the direction of sliding of the clamping arms 56, 56, and the center in the width direction of the clamping arms 56, 56 (left-right direction in FIG. 35)), and the sliding axis center lines 56c, 56c coincide with an arbitrary straight line passing through the rotation axis center line of the cutting spindles 72a, 72b.

Note that the holders 54, 54 are attached to the fixed beam 452 is the same manner as that of the pendular transport apparatus 50 of the present embodiment described above. That is, the holders 54, 54 are attached to rails (not shown) located along the longitudinal direction of the fixed beam 452 using the guided sliding portions 54a, 54a (see FIG. 3), the rails being disposed on the lower surfaces of both ends excluding the central portion in the longitudinal direction of the fixed beam 452. The holders 54, 54 are also connected to cylinder rods (not shown) of the fluid cylinders CL3a, CL3b (see FIG. 3) that are supported by a support wall (not shown) protruding downward toward the generally central lower surface of the fixed beam 452 in the longitudinal direction. The holders 54, 54 are further supported slidably in the longitudinal direction of the fixed beam 452 in response to appearance of a cylinder rod (not shown).

In the lathe charger 402 of the present modification, instead of the configuration where the shaft bearing housings 22a, 22b are reciprocated between the second receiving position RP2 and the second delivery position DP2 by the fluid cylinders CL2a, CL2b (see FIG. 1) connected to the shaft bearing housings 22a, 22b, a configuration is adopted where the shaft bearing housings 22a, 22b are screw-engaged to the male thread rods 455, 455 that are rotatably supported by the upper frames 18, 18 to extend in the direction along the horizontal direction among the transport directions of the log PW, so that, by rotating the male thread rods 455, 455 forward and reverse by motors M6, M6 connected to one end of the male thread rods 455, 455 in the axial center line direction, the shaft bearing housings 22a, 22b are moved between the second receiving position RP2 and the second delivery position DP2. The motors M6, M6 have a rotary encoder (not shown). As a result, the positions of the shaft bearing housings 22a, 22b can be known, and the shaft bearing housings 22a, 22b can be moved to desired positions. Therefore, the sensor S4 is not necessary in this modification.

In the present modification, the second delivery position DP2 is defined as a position where the shaft bearing housings 22a, 22b are moved until the virtual line VL1 connecting the two intersections P1 and P2 of the log PW positioned in the rotational direction at an angle equal to the inclination angle of the clamping arms 56, 56 (inclination angle with respect to the vertical line) coincides with the sliding axis center lines 56c and 56c of the clamping arms 56, 56.

Therefore, the determination whether or not the second delivery position setting flag Fdp2 is 1 in Step S306 in the processing routine for driving the transport apparatus for temporary centering that is executed by the electronic control unit 8 of the log processing apparatus 1 of the above described embodiment is performed by determining whether or not the moving distance of the shaft bearing housings 22a, 22b is greater than or equal to the assumed maximum diameter of diameters of the log PW to be fed to the log processing apparatus 1, the moving distance being obtained using the integrated value of pulses output from the rotary encoders of motors M6, M6.

In the present modification, in Step S414 in the processing routine for driving the log rotation apparatus in FIG. 9, the log PW is rotated by a rotation angle so that the virtual line VL1 lies parallel to the sliding axis center lines 56c, 56c of the clamping arms 56, 56. Further, in the processing routine of Step S504 for driving the pendular transport apparatus in FIG. 11, the clamping arms 56, 56 are driven by driving the motors M4, M4 (see FIG. 3) so that the clamping arms 56, 56 have the posture set by Step S502.

In the present embodiment, the shaft bearing housings 22a, 22b are reciprocated between the second receiving position RP2 and the second delivery position DP2 by the fluid cylinders CL2a, CL2b (see FIG. 1), but the present invention is not limited thereto. For example, as shown in the log rotation apparatus 520, 620 of the modification illustrated in FIGS. 36 and 37, the screw mechanisms 530, 630 may be used to move the shaft bearing housings 22a, 22b between the second receiving position RP2 and the second delivery position DP2.

The log rotation apparatus 520 of the modified example is the same as the log rotation apparatus 20 of the present embodiment except that the fluid cylinders CL2a, CL2b (see FIG. 1) are replaced with screw mechanisms 530 as shown in FIG. 36 It has a configuration.

Therefore, the same components as those of the log rotation apparatus 20 in the log rotation apparatus 520 are denoted by the same reference numerals, and detailed description thereof is omitted because it is duplicated.

The screw mechanism 530 includes male thread rods 555, 555 that are rotatably supported by the lower frame 12 so as to extend in the direction along the horizontal direction among the transport directions of the log PW, and Motors M7, M7 connected to the ends on one side of the male thread rods 555, 555. The male thread rods 555 and 555 are threadedly engaged with the shaft bearing housings 22a, 22b. Thus, the shaft bearing housings 22a, 22b can be reciprocated between the second receiving position RP2 and the second delivery position DP2 by rotating the male thread rods 555, 555 forward and backward by the motors M7, M7. The motors M7, M7 have a rotary encoder (not shown), and are able to recognize the positions of the shaft bearing housings 22a, 22b and to move the shaft bearing housings 22a, 22b to desired positions.

Further, as shown in FIG. 37, in the log rotation apparatus 620 of the modification, the shaft bearing housings 22a, 22b are disposed on the rails R1 via the mount bases 634a, 634b, and are engaged with the male thread rods 555, 555. Except for this point, it has the same configuration as the log rotation apparatus 520 of the modified example described above. Therefore, among the components of the log rotation apparatus 620, the same components as those of the log rotation apparatus 520 are denoted by the same reference numerals, and detailed description thereof is omitted because it is duplicated.

As shown in FIG. 37, the mount bases 634a, 634b have a generally L shape when viewed from the side (when viewed in a direction orthogonal to both the axial center line direction of the male thread rods 555. 555 and the vertical direction). The mount bases 634a, 634b are disposed on the rails R1 via the guided sliding portions 633a, 633b. The mount bases 634a, 634b have rails R6, R6 extending in the vertical direction. The shaft bearing housings 22a, 22b are engaged with the rails R6, R6 via the guided sliding portions 623a, 623b. The shaft bearing housings 22a, 22b are threadedly engaged with male thread rods 655 and 655 that are integrally connected to a rotation shaft (not shown) of the motor M9 fixed to the mount bases 634a, 634b. That is, the shaft bearing housings 22a, 22b are installed on the mount bases 634a and 634b in such a manner that when the motor M9 rotates the male thread rods 655, 655 forward and backward, the shaft bearing housings 22a, 22b can reciprocate in the vertical direction with respect to the mount bases 634a, 634b. The shaft bearing housings 22a, 22b are threadedly engaged with male thread rods 555, 555 that are integrally connected to a rotation shaft (not shown) of the motors M8, M8 installed on the front frame 14, and are reciprocated in the axial center line direction of the male thread rods 555, 555 on the mount bases 634a, 634b when the motors M8, M8 rotate the male thread rods 555, 555 forward and backward. The motors M8, M8, M9, and M9 have a rotary encoder (not shown) so as to be able to recognize positions of the shaft bearing housings 22a, 22b, and to move the shaft bearing housings 22a, 22b in the horizontal direction (direction of the axial center line of the male thread rods 555, 555) and the vertical direction (direction of the axial center line of the male thread rods 655 and 655) to desired positions.

According to the log rotation apparatus 620 of the modification, the shaft bearing housings 22a, 22b are not only reciprocated between the second receiving position RP2 and the second delivery position DP2 but are also capable of reciprocating in the vertical direction. Therefore, when the log PW is delivered from the centering spindles 24a, 24b to the clamping arms 56, 56 of the pendular transport apparatus 50, it is not necessary to slide the clamping arms 56, 56. For this reason, the clamping arms 56, 56 can be fixed with respect to the holders 54, 54 so as not to be slidable.

In the present embodiment, the outer peripheral surface of the log PW is measured by measuring the distance to outer peripheral surface with a plurality of laser measuring instruments 17a arranged at equal intervals in the longitudinal direction of the coupling beam 17, but the present disclosure is not limited to thereto. For example, as shown in FIG. 38, a configuration may be adopted in which a plurality of laser measuring instruments 17a may be replaced with one line laser 717 and a camera 718 that captures an image the log PW irradiated by the line laser 717, so that the outer peripheral shape of the log PW is measured based on the image taken by the camera 718.

In the present embodiment, the transport apparatus for temporary centering 40 is located below the log rotation apparatus 20 in the vertical direction, but the present disclosure is not limited thereto. For example, the transport apparatus for temporary centering 40 may be located above the log rotation apparatus 20 in the vertical direction, or located upstream in the transport direction of the log PW in the horizontal direction of the log rotation apparatus 20.

In the present embodiment, the log PW is rotated one time by the centering spindles 24a, 24b to calculate the cutting axis center line of the log PW, and the log PW is set to the rotation angle α corresponding to the calculated cutting axis center line (Steps S406 to S410) and then the shaft bearing housings 22a, 22b are moved toward the second delivery position DP2 (Step S412). However, the shaft bearing housings 22a, 22b may be moved toward the second delivery position DP2 while the log PW is rotated one time by the centering spindles 24a, 24b to calculate the cutting axis center line of the log PW and the log PW is set to the rotation angle α corresponding to the calculated cutting axis center line. In this configuration, the number of logs to be fed per unit time to the first and second cutting spindles can be increased further.

In the present embodiment and the above-described modifications, the log processing apparatus 1 includes the veneer lathe 6 for peeling a veneer sheet from the log PW, but the present disclosure is not limited thereto. For example, instead of the veneer lathe 6, the log processing apparatus 1 may be configured to include a processing implement for eliminating the uneven portion on the outer periphery of the log PW. In this case, the processing implement includes a cutter that is driven to rotate, instead of the knife 74.

This embodiment shows an exemplary form for carrying out the present disclosure. Therefore, the present disclosure is not limited to the configuration of the present embodiment. The correspondence between each component of the present embodiment and each component of the present disclosure is shown below.

REFERENCE SIGNS LIST

1 Log processing apparatus (log processing apparatus)
2 Lathe charger (log feeding apparatus)
4a First loading conveyor (loading apparatus)
4b Second loading conveyor (loading apparatus)
6 Veneer lathe (processor)
8 Electronic control device (control unit, measuring unit, storage unit,
calculating unit)
10 Frame
11 Extending piece
12 Lower frame
13 Coupling beam
14 Front frame
14a Bottom wall
14b Vertical wall
14c Vertical wall
Rear frame
15a Bottom wall
15b Vertical wall
15c Vertical wall
16 Intermediate frame
17 Coupling beam
17a Laser length measuring device
18 Upper frame
Log rotation apparatus
22a Shaft bearing housing (centering unit)
22b Shaft bearing housing (centering unit)
23a Sliding portion with guide
23b Sliding portion with guide
24a Centering spindle (first centering spindle, second centering spindle)
24b Centering spindle (second centering spindle, first centering spindle)
Transport apparatus for temporary centering (log feeding unit)
42 Placing section (placing section)
42a Placement surface
43 Sliding portion with guide 44 Male thread rod
50 Pendulum transport apparatus (transport unit)
52 Rotation frame
52a Rotation axis
52a' Rotation axis center line
53 Shaft bearing housing
54 Holder
54a Sliding portion with guide
56 Clamping arm (first clamping arm, second clamping arm)
56a Sliding portion with guide
56b Claw
56c Sliding axis center line
62 Sprocket
64 Claw
72a Cutting spindle (first cutting spindle, second cutting spindle)
72b Cutting spindle (second cutting spindle, first cutting spindle)
74 Knife (blade)
132 Upper placing section
140 transport apparatus for temporary centering (log feeding unit)
230 Measurement sensor
262 Fixed V-shaped table
262a Placement surface
302 Lathe charger (log feeding apparatus)
350 Running transport apparatus (transport unit)
352 Movable beam
352a Sliding member with guide
355 Male thread rod
357 Mount base
402 Lathe charger (log feeding apparatus)
450 Fixed transport apparatus (transport unit)
452 Fixed beam
455 Male thread rod
520 Log rotation apparatus
530 Thread mechanism
555 Male thread rod
620 Log rotation apparatus
623a Sliding portion with guide
623b Sliding portion with guide
630 Thread mechanism
633a Sliding portion with guide
633b Sliding portion with guide
634a Mount base
634b Mount base
655 Male thread rod
717 Line laser
718 Camera
PW Log (log)
S1 Sensor (log detection sensor)
S2 Sensor
S3 Sensor (measurement unit)
S4 Sensor
RP1 First receiving position (first receiving position)
RP2 Second receiving position (second receiving position, receiving position)
DP1 First delivery position (first delivery position)
DP2 Second delivery position (second delivery position, delivery position)
R1 Rail
R2 Rail
R3 Rail
R4 Rail
R5 Rail
CL1a Fluid cylinder
CL1b Fluid cylinder
CL2a Fluid cylinder (driving unit)
CL2b Fluid cylinder (driving unit)
CL3a Fluid cylinder
CL3b Fluid cylinder
CL4a Fluid cylinder
CL4b Fluid cylinder
M1 Motor
M2 Motor
M3 Motor
M4 Motor
M5 Motor
M6 Motor
M7 Motor
M8 Motor
M9 Motor
Bp Reference line (Reference portion)
Bp2 Reference line
Bpf Reference line
VVL Virtual vertical line
CH Chain
P1 Intersection
P2 Intersection
Hss Height in a vertical direction from Sensor S1 to rotation axis center line of centering spindle (seventh distance)
Hbp Height by which a reference line Bp has moved (movement amount)
Hs1 Height in a vertical direction from reference line Bp to Sensor S1 (sixth distance)
Hbc Height from reference line Bp to a temporary rotation axis center line of log PW
L1 Distance from the center point of temporary diameter of log to virtual vertical line
L2 Distance by which placing sections are required to move so that a temporary rotation axis center line of log PW is aligned with the rotation axis center line of centering spindles
2θ Opening angle of placement surface of placing section (geometric shape of placing section)
r Virtual diameter of log (virtual diameter of log)
VC Virtual circle
α Rotation angle
β Rotation angle
VL1 Virtual vertical line
Fs Second loading conveyor delivery flag
Frp1 First receiving position setting flag
Fvv1 Lading completion flag
Fcs Centering spindle holding flag
Fdp2 Second delivery position setting flag
Fdp1 First delivery position setting flag
Frp2 Second receiving position setting flag
Fsa Clamping arm holding flag
Hfs Height in a vertical direction from a reference line Bpf to the rotation axis center line of the centering spindle
Hbb Distance between a reference line Bpf and a reference line Bp on a placing section at an initial position
Hbs Height in a vertical direction from a reference line Bpf to a measurement sensor (fourth distance)
Hbc Height from a reference line Bp to a temporary rotation axis center line of log PW (first distance)
Hfc Height from a reference line Bpf to a temporary rotation axis center line of log
Hp Distance to log measured by measurement sensor
d* Placing section raising acceptable distance (safe distance)

$d_{i-1}$ Temporary diameter of log transported to second receiving position (first temporary diameter)

$d_i$ Temporary diameter of log transported from a second loading conveyor to a placing section (second temporary diameter)

Sv Safe value

BL Movement distance (Second distance)

ds Safe distance (safe distance)

dc* Placing section raising acceptable distance (five distance)

Hc Height (third distance) from a temporary rotation axis center line of log PW to rotation axis center line of centering spindles 24a, 24b at second receiving position RP2

B1 Distance

B2 Distance

The invention claimed is:

1. A log feeding apparatus for feeding a log to first and second cutting spindles that are capable of holding the log therebetween at first and second end surfaces of the log in a longitudinal direction of the log, the log feeding apparatus comprising:
    a centering unit located upstream of the first and second cutting spindles in a transport direction of the log, the centering unit including first and second centering spindles that are capable of holding the log therebetween at the first and second end surfaces;
    a log feeding unit located upstream of the centering unit in the transport direction of the log, the log feeding unit being reciprocally movable between a first receiving position to receive the log and a first delivery position located downstream of said first receiving position in the transport direction to deliver the log to the first and second centering spindles;
    a transport unit including first and second clamping arms configured to clamp the log, the transport unit being disposed between the first and second centering spindles and the first and second cutting spindles such that the log is transported from the first and second centering spindles to the first and second cutting spindles;
    a drive unit that is connected to the centering unit and causes the centering unit to move reciprocally between a second receiving position where the centering unit receives the log from the log feeding unit and a second delivery position where the first and second centering spindles delivers the log to the first and second clamping arms, the second delivery position being away from the second receiving position by a distance equal to or greater than a maximum diameter of the log in the transport direction; and
    a controller configured to, when the first and second centering spindles are holding no log, drive control the log feeding unit toward the first delivery position to feed a new log to the first and second centering spindles regardless of the position of the centering unit,
    the controller further configured to, when the first and second centering spindles are holding the log, drive control the log feeding unit toward the first delivery position to feed a new log to the first and second centering spindles after the centering unit has moved a distance equal to or greater than the maximum diameter of the log from the second receiving position downstream in the transport direction of the log.

2. The log feeding apparatus according claim 1, further comprising
    a log detection sensor located between the first receiving position and the first delivery position, wherein
    the controller calculates a position of the temporary rotation axis center line of the log based on detection of the log by the log detection sensor, sets the first delivery position as a position where the temporary rotation axis center line is aligned with a rotation axis center line of the first and second centering spindles located at the second receiving position, and causes the log feeding unit to move accordingly.

3. The log feeding apparatus according to claim 2, wherein the log feeding unit includes a placing section on which the log is placed, said placing section having a reference portion that serves as a reference for calculating the temporary rotation axis center line of the log, and
    the controller calculates a virtual radius of the log along a direction from the first receiving position to the first delivery position, using a sixth distance from the reference portion to the log detection sensor when the log feeding unit is at the first receiving position, a displacement of the reference portion when the log feeding unit moves from the first receiving position to the position where the log is detected by the log detection sensor, and a geometric shape of the placing section, and
    the controller further calculates an eighth distance from a sum of the virtual radius and a seventh distance to the rotation axis center line of the first and second centering spindles when the centering unit is at the second receiving position, so as to cause the log feeding unit to move by the eighth distance after the log detection sensor has detected the log.

4. The log feeding apparatus according to claim 1, further comprising
    a log loading unit configured to drive control the log loading unit to load the log to the log feeding unit, wherein
    the controller is configured, when the first and second centering spindles are holding no log, to load a log onto the log feeding unit located at the first receiving position regardless of the position of the centering unit, and is configured to, when the first and second centering spindles are holding the log, control the log loading unit to load the log onto the log feeding unit located at the first receiving position after the centering unit has moved a distance equal to or greater than the maximum diameter of the log from the second receiving position downstream in the transport direction of the log.

5. The log feeding apparatus according to claim 1, wherein
    the first receiving position and the first delivery position are located below the second receiving position in the vertical direction.

6. A log processing apparatus, comprising
    the log feeding apparatus according to claim 1; and
    a processor including the first and second cutting spindles and a blade for processing the log, the processor located downstream from the log feeding apparatus in a transport direction of the log.

7. A log feeding apparatus for feeding a log to first and second cutting spindles that are capable of holding the log therebetween at first and second end surfaces of the log in a longitudinal direction of the log, the log feeding apparatus comprising:
    a centering unit located upstream of the first and second cutting spindles in a transport direction of the log, the centering unit including first and second centering spindles that are capable of holding the log therebetween at the first and second end surfaces;

a log feeding unit located upstream of the centering unit in the transport direction of the log, the log feeding unit being reciprocally movable between a first receiving position to receive the log and a first delivery position located downstream of said first receiving position in the transport direction to deliver the log to the first and second centering spindles;

a transport unit including first and second clamping arms configured to clamp the log, the transport unit being disposed between the first and second centering spindles and the first and second cutting spindles such that the log is transported from the first and second centering spindles to the first and second cutting spindles;

a drive unit that is connected to the centering unit and causes the centering unit to move reciprocally between a second receiving position where said centering unit receives the log from the log feeding unit and a second delivery position where the first and second centering spindles delivers the log to the first and second clamping arms, the second delivery position being away from the second receiving position by a distance equal to or greater than a maximum diameter of the log in the transport direction; and a measuring unit disposed upstream of the first receiving position in the transport direction of the log and configured to measure a temporary diameter of the log; and a controller including a storage unit for storing the measured temporary diameter of the log and a calculation unit for calculating a safety distance that is equal to or greater than a value that is obtained by dividing by two the sum of a first temporary diameter of the log currently held between the first and second centering spindles and a second temporary diameter of a new log to be fed to the first receiving position among the temporary diameters stored in said storage unit, the controller configured to, when the first and second centering spindles are holding no log, drive control the log feeding unit toward the first delivery position to feed a new log to the first and second centering spindles regardless of the position of the centering unit, the controller further configured to, when the first and second centering spindles are holding the log, drive control the log feeding unit toward the first delivery position based on the distance the centering unit has moved from the second receiving position toward the second delivery position and also based on the safety distance.

8. The log feeding apparatus according to claim 7, wherein the controller drive controls the log feeding unit toward the first delivery position, when the first and second centering spindles are holding the log, after the centering unit has moved by the safety distance from the second receiving position to the second delivery position.

9. The log feeding apparatus according to claim 7, wherein the log feeding unit includes a placing section on which the log is placed, said placing section having a reference portion that serves as a reference for calculating a temporary rotation axis center line of the log, and the controller calculates a first distance from the reference portion to a temporary rotation axis center line of the new log placed on the placing section, using the second temporary diameter and a geometric shape of the placing section when the first and second centering spindles are holding the log, the controller further uses the safe distance and the second distance by which the centering unit has moved from the second receiving position to the second delivery position, so as to calculate a third distance from a temporary rotation axis center line of the new log to the rotation axis center line of the first and second centering spindles with the centering unit being located at the second receiving position, when an axial distance between the rotation axis center line of the first and second centering spindles while the centering unit is moving from the second receiving position toward the second delivery position and the temporary rotation axis center line of the new log is the safe distance, the controller further calculates a fifth distance by subtracting the first and third distances from a fourth distance, so as to cause the log feeding unit to move by the fifth distance, the fourth distance being a distance from the reference portion when the log feeding unit is at the first receiving position to the rotation axis center line of the first and second centering spindles when the centering unit is at the second receiving position.

10. The log feeding apparatus according to claim 7, further comprising a log loading unit configured to load the log onto the log feeding unit, wherein the controller controls the log loading unit to load the log onto the log feeding unit located at the first receiving position, regardless of the position of the centering unit, when the first and second centering spindles are holding no log, and the controller controls the log loading unit to load a log onto the log feeding unit located at the first receiving position after the centering unit has moved by the safety distance from the second receiving position downstream in the transport direction of the log when the first and second centering spindles are holding the log.

11. A method for controlling a log feeding apparatus, the apparatus including a centering unit having first and second centering spindles that are capable of holding a log therebetween at the first and second end faces of the log in a longitudinal direction of the log, a transport unit including first and second clamping arm that are capable of holding the log therebetween, and first and second cutting spindles that are capable of holding the log therebetween, wherein the log fed to the centering unit is fed to the first and second cutting spindles by the log transport unit, the method comprising:

(a) feeding the log to the centering unit located at a receiving position;

(b) holding the fed log between the first and second centering spindles;

(c) calculating a cutting axis center line of the log by rotating the first and second centering spindles, and positioning the log at a rotational angle corresponding to the calculated cutting axis center line;

(d) moving the centering unit from the receiving position to a delivery position where the log is delivered from the first and second centering spindles to the first and second clamping arms, the delivery position being away from the receiving position downstream in a transport direction of the log by a distance equal to or greater than a maximum diameter of the log;

(e) feeding a new log to the receiving position after the centering unit has moved from the receiving position by the distance that is equal to or greater than the maximum diameter of the log;

(f) when the centering unit has reached the delivery position, delivering the log from the first and second centering spindles to the first and second clamping arms; and (g) feeding the log from the first and second clamping arms to the first and second cutting spindles.

12. The method of controlling a log feeding apparatus according to claim 11, further comprising a step of calculating a cutting axis center line of the log by moving the centering unit from the delivery position to the receiving position, holding the new log fed to the receiving position between the first and second centering spindles, and rotating the first and second centering spindles, while the step (g) is performed.

13. The method of controlling a log feeding apparatus according to claim 12, further comprising a step of moving the new log to the delivery position by the centering unit while the step (g) is performed.

14. A method for controlling a log feeding apparatus, the apparatus including a centering unit having first and second centering spindles that are capable of holding a log therebetween at the first and second end faces of the log in a longitudinal direction of the log, a transport unit having first and second clamping arms to hold the log therebetween, and first and second cutting spindles that are capable of holding the log therebetween, wherein the log fed to the centering unit is fed to first and second cutting spindles by the transport unit, the method comprising:

measuring a temporary diameter of the log and storing the measured temporary diameter;

feeding the log to the centering unit located at a receiving position;

holding the fed log between first and second centering spindles;

calculating a cutting axis center line of the log by rotating the first and second centering spindles, and positioning the log at a rotational angle corresponding to the calculated cutting axis center line;

moving the centering unit from the receiving position to a delivery position where the log is delivered from the first and second centering spindles to the first and second clamping arms, the delivery position being away from the receiving position by a distance equal to or greater than a maximum diameter of the log downstream in the direction of log transport;

calculating a safe distance that is equal to or greater than a value obtained by dividing by two the sum of the temporary diameter of the log currently held between the first and second centering spindles among the stored temporary diameters and a temporary diameter of a new log to be fed to the receiving position;

feeding the new log to receiving position based on the movement distance by which the centering unit has moved from the receiving position to the delivery position and also based on the safe distance;

when the centering unit has reached the delivery position, delivering the log from the first and second centering spindles to the first and second clamping arms; and feeding the log from the first and second clamping arms to first and second cutting spindles.

* * * * *